United States Patent
Park et al.

(10) Patent No.: US 11,601,675 B2
(45) Date of Patent: Mar. 7, 2023

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC, Seoul (KR)

(72) Inventors: Yousun Park, Seoul (KR); Sejin Oh, Seoul (KR); Hyejung Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/953,964

(22) Filed: Nov. 20, 2020

(65) Prior Publication Data

US 2021/0211721 A1    Jul. 8, 2021

Related U.S. Application Data

(60) Provisional application No. 62/958,270, filed on Jan. 7, 2020.

(30) Foreign Application Priority Data

Mar. 16, 2020   (KR) ........................ 10-2020-0032136

(51) Int. Cl.
*H04N 19/597* (2014.01)
*H04N 19/46* (2014.01)
(Continued)

(52) U.S. Cl.
CPC ......... *H04N 19/597* (2014.11); *H04N 19/119* (2014.11); *H04N 19/174* (2014.11);
(Continued)

(58) Field of Classification Search
CPC .... H04N 19/597; H04N 19/46; H04N 19/174; H04N 19/119; G06T 9/40; G06T 17/005
See application file for complete search history.

(56) References Cited

U.S. PATENT DOCUMENTS

2008/0238919 A1    10/2008  Pack
2016/0086353 A1*   3/2016   Lukac ....................... G06T 9/00
                                                                345/419
(Continued)

FOREIGN PATENT DOCUMENTS

| KR | 10-2019-0089115 A |   | 7/2019 |           |
|----|-------------------|---|--------|-----------|
| KR | 20190082065 A     | * | 7/2019 | G01S 17/89 |
| WO | 2018127547 A1     |   | 7/2018 |           |

OTHER PUBLICATIONS

Khaled Mammou et al "G-PCC codec description v2" ISO/IEC JTC1/SC29/WG11, N18189, Jan. 2019. See abstract, section 10.3.1 and Figure 33-34. (Year: 2019).*

(Continued)

*Primary Examiner* — Nasim N Nirjhar
(74) *Attorney, Agent, or Firm* — Dentons US LLP

(57) ABSTRACT

Disclosed herein is a method for transmitting point cloud data, including encoding point cloud data, and/or transmitting a bitstream containing the point cloud data and signaling information about the point cloud data. Disclosed herein is a method for receiving point cloud data, including receiving a bitstream containing point cloud data, and/or decoding the point cloud data in the bitstream.

12 Claims, 40 Drawing Sheets

(51) Int. Cl.
*H04N 19/174* (2014.01)
*H04N 19/119* (2014.01)
*G06T 9/40* (2006.01)
*G06T 17/00* (2006.01)

(52) U.S. Cl.
CPC ............... H04N 19/46 (2014.11); *G06T 9/40* (2013.01); *G06T 17/005* (2013.01)

(56) References Cited

U.S. PATENT DOCUMENTS

| | | | |
|---|---|---|---|
| 2017/0347122 A1* | 11/2017 | Chou | .................... H04N 19/36 |
| 2019/0007684 A1* | 1/2019 | Van Der Auwera | ......................... H04N 19/172 |
| 2019/0080483 A1 | 3/2019 | Mammou et al. | |
| 2019/0318488 A1 | 10/2019 | Lim et al. | |
| 2019/0325614 A1* | 10/2019 | Melkote Krishnaprasad | .............. G06T 9/40 |
| 2020/0275132 A1* | 8/2020 | Kanoh | ................... H04N 19/66 |
| 2020/0314435 A1* | 10/2020 | Tourapis | ................... G06T 7/74 |
| 2020/0413096 A1* | 12/2020 | Zhang | ................. H04N 19/176 |
| 2021/0067805 A1* | 3/2021 | Vosoughi | ............... H04N 19/70 |

OTHER PUBLICATIONS

Khaled Mammou et. al., "G-PCC codec description v2," N18189—ISO/IEC JTC1/SC29/WG11 Jan. 2019, Marrakech, MA, 3DG, (40 Pages).

Shao et al., "G-PCC TMC13 CE 13.2 report on point cloud tile and slice based coding", ISO/IEC JTC1/SC29/WG11, m45867, Jan. 2019., Morocco, Peking University Shenzhen Graduate School; (11 Pages).

* cited by examiner

FIG. 6
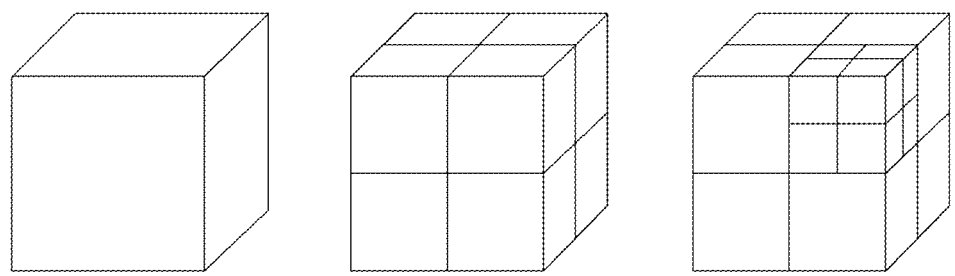
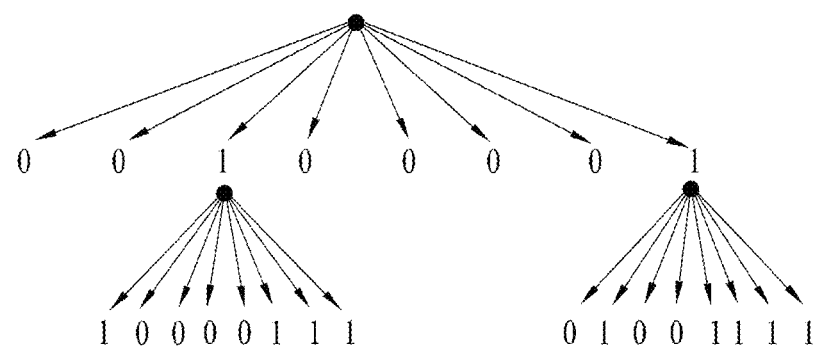

FIG. 7
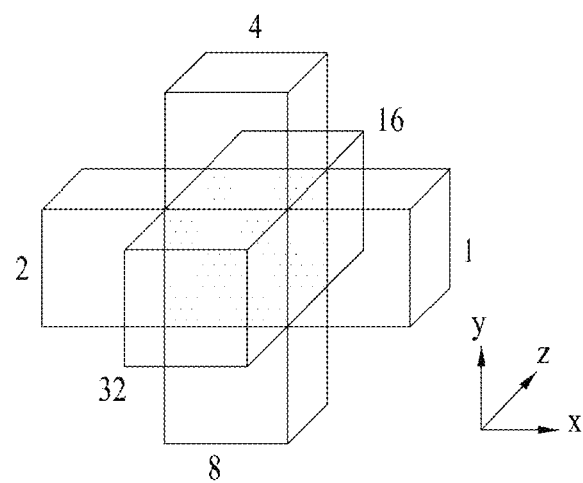
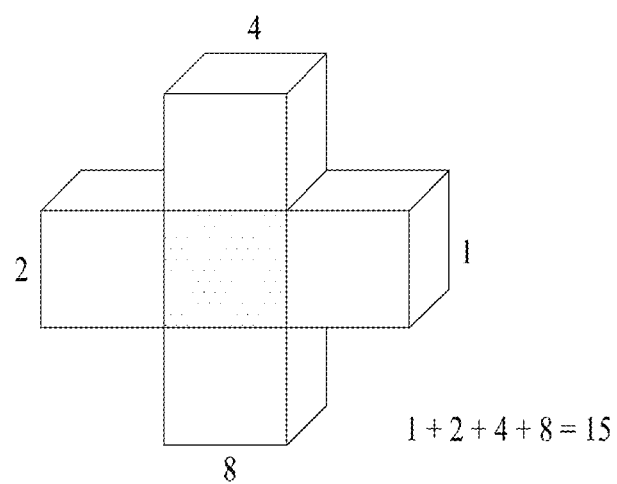
1 + 2 + 4 + 8 = 15

(b)

(a)

FIG. 22
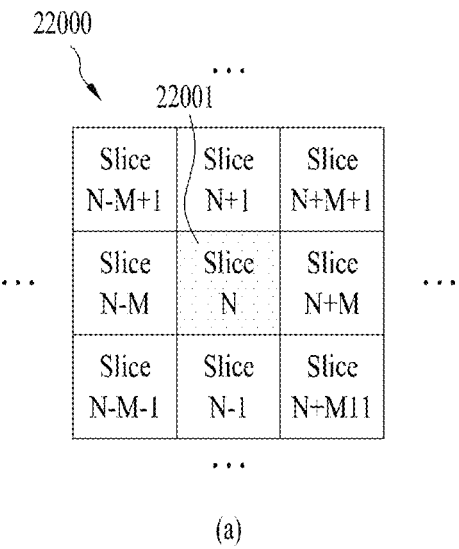
(a)
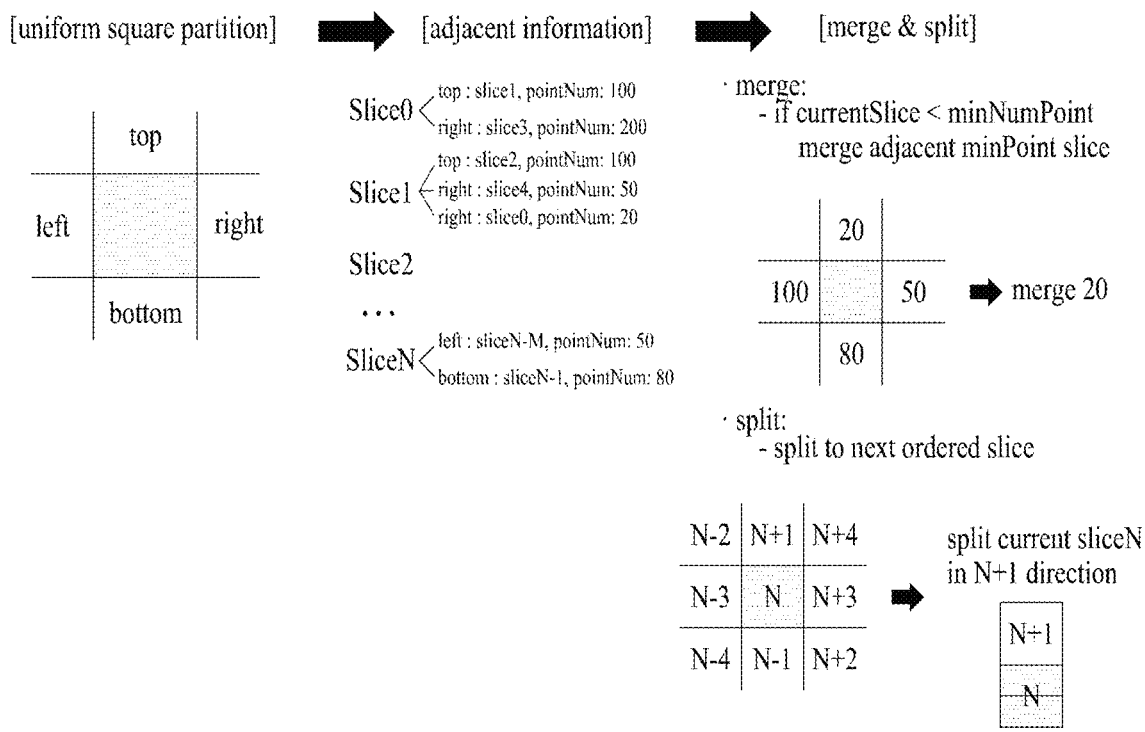
(b)

FIG. 27

[Slice index and point count information]

| [1] 40 | [3] 30 | [5] 150 |
|---|---|---|
| [0] 10 | [2] 50 | [4] 100 |

[Four-way adjacency information about a slice]

[0] → [1] [2]
[1] → [0] [3]
[2] → [0] [3] [4]
[3] → [1] [2] [5]
[4] → [2] [5]
[5] → [3] [4]

(a)

[Slice index and point count information]

| [1] 40 | [3] 30 | [5] 150 |
|---|---|---|
| [0] 10 | [2] 50 | [4] 100 |

[Tree-type adjacency information about a silce]

| seq_parameter_set_rbsp( ) { | Descriptor |
|---|---|
| profile_idc | u(8) |
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor | u(32) |
| sps_seq_parameter_set_id | ue(v) |
| sps_num_attribute_sets | ue(v) |
| for( i = 0; i < sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| partitioning_enabling_flag { | u(1) |
| if( partitioning_enabling_flag ) { | |
| Partitioning_method | ue(v) |
| } | |
| refine_slice_method_flag | u(1) |
| if( refine_slice_method_flag ) { | |
| refine_method | ue(v) |
| refine_method_condition | |
| if( refine_method_condition == '0' ) { | |
| distance_point_to_point_location | ue(v) |
| } else if( refine_method_condition == '1' ) { | |
| neighbours_order_to_merge | ue(v) |
| } | |
| } | |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 32

| tile_parameter_set( ) { | Descriptor |
|---|---|
| num_tiles | ue(v) |
| for( i = 0; i < num_tiles; i++ ) { | |
|    tile_bounding_box_offset_x[ i ] | se(v) |
|    tile_bounding_box_offset_y[ i ] | se(v) |
|    tile_bounding_box_offset_z[ i ] | se(v) |
|    tile_bounding_box_scale_factor[ i ] | ue(v) |
|    tile_bounding_box_size_width[ i ] | ue(v) |
|    tile_bounding_box_size_height[ i ] | ue(v) |
|    partitioning_enabling_flag { | u(1) |
|      if (partitioning_enabling_flag) { | |
|        Partitioning_method | ue(v) |
|      } | |
|    refine_slice_method_flag | u(1) |
|    if (refine_slice_method_flag) { | |
|      refine_method | ue(v) |
|      refine_method_condition | |
|      if(refine_method_condition == '0') { | |
|        distance_point_to_point_location | ue(v) |
|      } else if(refine_method_condition == '1') { | |
|        neighbours_order_to_merge | ue(v) |
|      } | |
|    } | |
|   } | |
| } | |
| } | |

FIG. 33

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| child_neighbours_enabled_flag | u(1) |
| geom_occupancy_ctx_reduction_factor | ue(v) |
| log2_neighbour_avail_boundary | ue(v) |
| log2_intra_pred_max_node_size | ue(v) |
| log2_trisoup_node_size | ue(v) |
| partitioning_enabling_flag { | u(1) |
|   if (partitioning_enabling_flag) { | |
|     Partitioning_method | ue(v) |
|   } | |
|   refine_slice_method_flag | u(1) |
|   if (refine_slice_method_flag) { | |
|     refine_method | ue(v) |
|     refine_method_condition | |
|     if(refine_method_condition == '0') { | |
|       distance_point_to_point_location | ue(v) |
|     } else if(refine_method_condition == '1') { | |
|       neighbours_order_to_merge | ue(v) |
|     } | |
|   } | |
| } | |
| gps_extension_present_flag | u(1) |
| if( gps_extension_present_flag ) | |
|   while( more_data_in_byte_stream( ) ) | |
|     gps_extension_data_flag | u(1) |
| byte_alignment( ) | |
| } | |

FIG. 34

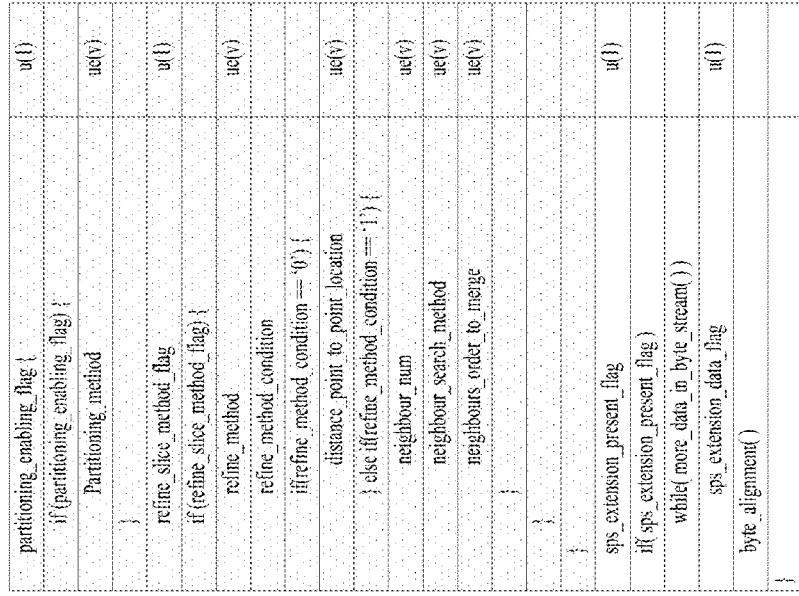

| seq_parameter_set_rbsp( ) { | Descriptor |
|---|---|
| profile_idc | u(8) |
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor | u(32) |
| sps_seq_parameter_set_id | ue(v) |
| sps_num_attribute_sets | ue(v) |
| for( i = 0; i < sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| partitioning_enabling_flag { | u(1) |
| if (partitioning_enabling_flag) { | |
| Partitioning_method | ue(v) |
| } | |
| refine_slice_method_flag | u(1) |
| if (refine_slice_method_flag) { | |
| refine_method | ue(v) |
| refine_method_condition | |
| if(refine_method_condition == 0) { | |
| distance_point_to_point_location | ue(v) |
| } else if(refine_method_condition == '1') { | |
| neighbour_num | ue(v) |
| neighbour_search_method | ue(v) |
| neighbours_order_to_merge | ue(v) |
| } | |
| } | |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 35

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| partitioning_enabling_flag { | u(1) |
| if (partitioning_enabling_flag) { | |
| Partitioning_method | ue(v) |
| } | |
| refine_slice_method_flag | u(1) |
| if (refine_slice_method_flag) { | |
| refine_method | ue(v) |
| refine_method_condition | |
| if(refine_method_condition == '0') { | |
| distance_point_to_point_location | ue(v) |
| } else if(refine_method_condition == '1') { | |
| neighbour_num | ue(v) |
| neighbour_search_method | ue(v) |
| neighbours_order_to_merge | ue(v) |
| } | |
| } | |
| } | |
| } | |
| } | |

FIG. 36

| | Descriptor |
|---|---|
| geometry_parameter_set( ) { | |
| gps_geom_parameter_set_id | ue(v) |
| gps_seq_parameter_set_id | ue(v) |
| gps_box_present_flag | u(1) |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| child_neighbours_enabled_flag | u(1) |
| geom_occupancy_ctx_reduction_factor | ue(v) |
| log2_neighbour_avail_boundary | ue(v) |
| log2_intra_pred_max_node_size | ue(v) |
| log2_trisoup_node_size | ue(v) |
| partitioning_enabling_flag { | u(1) |
| if (partitioning_enabling_flag) { | |
| Partitioning_method | ue(v) |
| } | |
| refine_slice_method_flag | u(1) |
| if (refine_slice_method_flag) { | |
| refine_method | ue(v) |
| refine_method_condition | |
| if(refine_method_condition == '0') { | |
| distance_point_to_point_location | ue(v) |
| } else if(refine_method_condition == '1') { | |
| neighbour_num | ue(v) |
| neighbour_search_method | ue(v) |
| neighbours_order_to_merge | ue(v) |
| } | |
| } | |
| gps_extension_present_flag | u(1) |
| if( gps_extension_present_flag ) | |
| while( more_data_in_byte_stream( ) ) | |
| gps_extension_data_flag | u(1) |
| byte_alignment( ) | |
| } | |

FIG. 37

| geometry_slice_header( ) { | Descriptor |
|---|---|
| gsh_geometry_parameter_set_id | ue(v) |
| gsh_tile_id | ue(v) |
| gsh_slice_id | ue(v) |
| if( gps_box_present_flag ) { | |
| gsh_box_log2_scale | ue(v) |
| gsh_box_origin_x | ue(v) |
| gsh_box_origin_y | ue(v) |
| gsh_box_origin_z | ue(v) |
| } | |
| gsh_log2_max_nodesize | ue(v) |
| gsh_points_number | ue(v) |
| partitioning_enabling_flag { | u(1) |
| if (partitioning_enabling_flag) { | |
| Partitioning_method | ue(v) |
| } | |
| refine_slice_method_flag | u(1) |
| if (refine_slice_method_flag) { | |
| refine_method | ue(v) |
| refine_method_condition | |
| if(refine_method_condition == '0') { | |
| distance_point_to_point_location | ue(v) |
| } else if(refine_method_condition == '1') { | |
| neighbour_num | ue(v) |
| neighbour_search_method | ue(v) |
| neighbours_order_to_merge | ue(v) |
| } | |
| } | |
| } | |
| } | |

FIG. 38

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| partitioning_enabling_flag { | u(1) |
| if (partitioning_enabling_flag) { | |
| Partitioning_method | ue(v) |
| } | |
| refine_slice_method_flag | u(1) |
| if (refine_slice_method_flag) { | |
| refine_method | ue(v) |
| refine_method_condition | |
| if(refine_method_condition == '0') { | |
| distance_point_to_point_location | ue(v) |
| } else if(refine_method_condition == '1') { | |
| neighbour_num | ue(v) |
| neighbour_search_method | ue(v) |
| neighbours_order_to_merge | ue(v) |
| } | |
| } | |
| geometry_filter_index | ue(v) |
| } | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application claims the benefit of U.S. Provisional Application No. 62/958,270, filed on Jan. 7, 2020 and Korean Patent Application No. 10-2020-0032136, filed on Mar. 16, 2020, which is hereby incorporated by reference as if fully set forth herein.

BACKGROUND

Field

Embodiments provide a method for providing point cloud contents to provide a user with various services such as virtual reality (VR), augmented reality (AR), mixed reality (MR), and self-driving services.

Discussion of the Related Art

Point cloud data is a set of points in a three-dimensional (3D) space. It is difficult to generate point cloud data because the number of points in the 3D space is large.

A point cloud frame or point cloud data may be divided into tiles or slices to meet the demand for transmission, encoding, decoding, and rendering processing that is to be performed with low latency in real time.

SUMMARY OF THE DISCLOSURE

An object of the embodiments devised to solve the above-described problem is to provide a point cloud data transmission device, a point cloud data transmission method, a point cloud data reception device, and a point cloud data reception method for efficiently transmitting and receiving a point cloud.

Another object of the embodiments is to provide a point cloud data transmission device, a point cloud data transmission method, a point cloud data reception device, and a point cloud data reception method for addressing latency and encoding/decoding complexity.

Another object of the embodiments is to provide a method of splitting point cloud data for encoding and decoding point cloud data.

Another object of the embodiments is to improve encoding of attribute information of geometry-point cloud compression (G-PCC) to improve performance of point cloud compression.

The technical scope of the embodiments is not limited to the aforementioned technical objects, and other objects may be inferred by those skilled in the art based on the entire contents of this document.

To achieve these objects and other advantages and in accordance with the purpose of the disclosure, as embodied and broadly described herein, a method for transmitting point cloud data may include encoding the point cloud data, and/or transmitting a bitstream containing the point cloud data and/or signaling information about the point cloud data.

The transmission method may further include partitioning the point cloud data based on slices, and/or merging a slice of the slices with an adjacent slice when a number of points in the slice is less than a minimum number of points or splitting the slice when the number of points in the slice is greater than a maximum number of points.

Furthermore, according to embodiments, the partitioning of the point cloud data may be performed based on at least one of a first method, a second method or a third method. The first method may include dividing a 3-dimensional space including the point cloud data into 8 to the power of a depth of an octree slices, wherein the depth of the octree is evaluated based on a ratio of a number of points of the slices. The second method may include dividing a longest edge in the 3-dimensional space by a shortest edge in the 3-dimensional space. The third method may include dividing the 3-dimensional space into slices in uniform squares by segmenting a first axis and a second axis of the 3-dimensional space by a length of a third axis of the 3-dimensional space.

According to embodiments, the adjacent slice may be one of a left slice of the slice, a right slice of the slice, a top slice of the slice, or a bottom slice of the slice.

According to embodiments, the adjacent slice may be one of a left slice of the slice, a right slice of the slice, a top slice of the slice, and a bottom slice of the slice, a front slice of the slice, and/or a back slice of the slice.

According to embodiments, the merging or the splitting may be performed based on a data structure representing adjacency between the slices. In addition, according to embodiments, the data structure for determining the adjacency may be a tree-based data structure or a list-based data structure.

Furthermore, the signaling information may include information representing a method of partitioning the point cloud data.

It is to be understood that both the foregoing general description and the following detailed description of the present disclosure are exemplary and explanatory and are intended to provide further explanation of the disclosure as claimed.

A point cloud data transmission method, a point cloud data transmission device, a point cloud data reception method, and a point cloud data reception device according to embodiments may provide a good-quality point cloud service.

The point cloud data transmission method, point cloud data transmission device, point cloud data reception method, and point cloud data reception device according to the embodiments may achieve various video codec methods.

The point cloud data transmission method, point cloud data transmission device, point cloud data reception method, and point cloud data reception device according to the embodiments may provide general-purpose point cloud content such as a self-driving service.

The point cloud data transmission method, point cloud data transmission device, point cloud data reception method, and point cloud data reception device according to the embodiments may implement a partitioning method of brick tiling and signal data necessary therefor, thereby improving performance of coding of a point cloud.

The point cloud data transmission method, point cloud data transmission device, point cloud data reception method, and point cloud data reception device according to the embodiments may perform spatial adaptive partitioning for independent encoding and decoding of point cloud data, thereby improving parallel processing and providing scalability.

With the point cloud data transmission method, point cloud data transmission device, point cloud data reception method, and point cloud data reception device, re-partitioning of spatially close points may be performed in performing independent data partitioning.

The point cloud data transmission/reception device according to the embodiments may partition point cloud data into one or more tiles and/or slices, and encode/decode the point cloud data in parallel based thereon.

The point cloud data transmission device according to the embodiments may partition point cloud data and encode each of the partitioned point cloud data independently. Thereby, random access (random access) and parallel encoding in the three-dimensional space occupied by the point cloud data may be performed. Therefore, the point cloud data reception device according to the embodiments may quickly decode such point cloud data.

The point cloud data transmission device according to the embodiments may generate slices according to the above-described method. Accordingly, as the slices are generated without querying the attributes of individual points, a delay occurring in the slice generation process may be reduced.

The transmission device according to the embodiments may generate a different slice configuration header unit for each tile or for each slice in order to signal the configuration of a duplicated slice according to the embodiments.

The point cloud data transmission/reception method according to the embodiments may provide such a bitstream structure as described above. Accordingly, performance of the receiver in decoding attribute information about the point cloud data may be improved.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 22 illustrates an embodiment of a method of refining slices according to embodiments;

FIG. 27 illustrates an example of a method of refining slices using adjacent slices according to embodiments;

FIG. 31 illustrates an example of a sequence parameter set (SPS) in a bitstream according to embodiments;

FIG. 32 illustrates an example of a tile parameter set (TPS) in a bitstream according to embodiments;

FIG. 33 illustrates an example of a geometry parameter set (GPS) in a bitstream according to embodiments;

FIG. 34 illustrates an example of an SPS in a bitstream according to embodiments;

FIG. 35 illustrates an example of a TPS in a bitstream according to embodiments;

FIG. 36 illustrates an example of a GPS in a bitstream according to embodiments;

FIG. 37 illustrates an example of a geometry slice header (GSH) of a bitstream according to embodiments;

FIG. 38 illustrates an example of an attribute slice header (ASH) of a bitstream according to embodiments;

DETAILED DESCRIPTION OF THE DISCLOSURE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
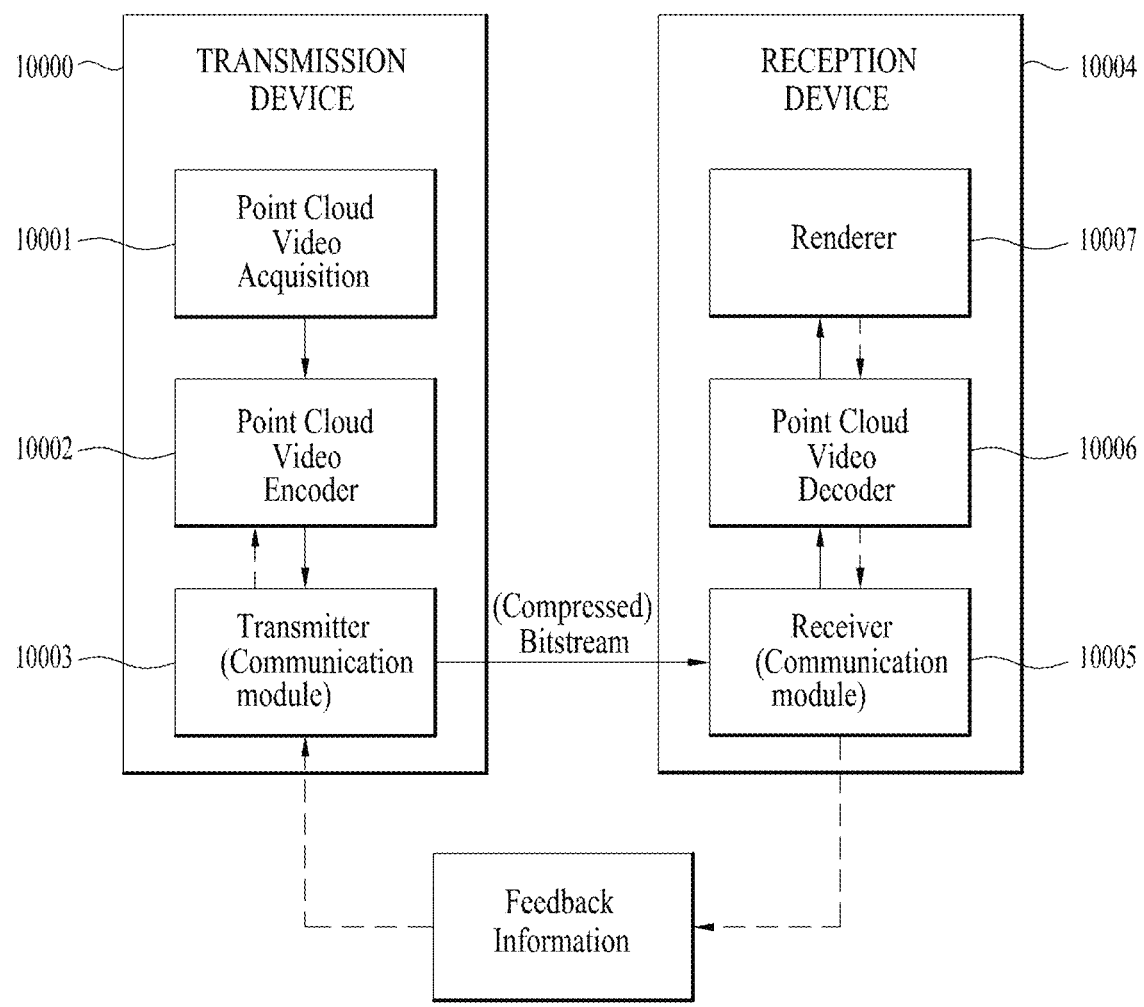
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
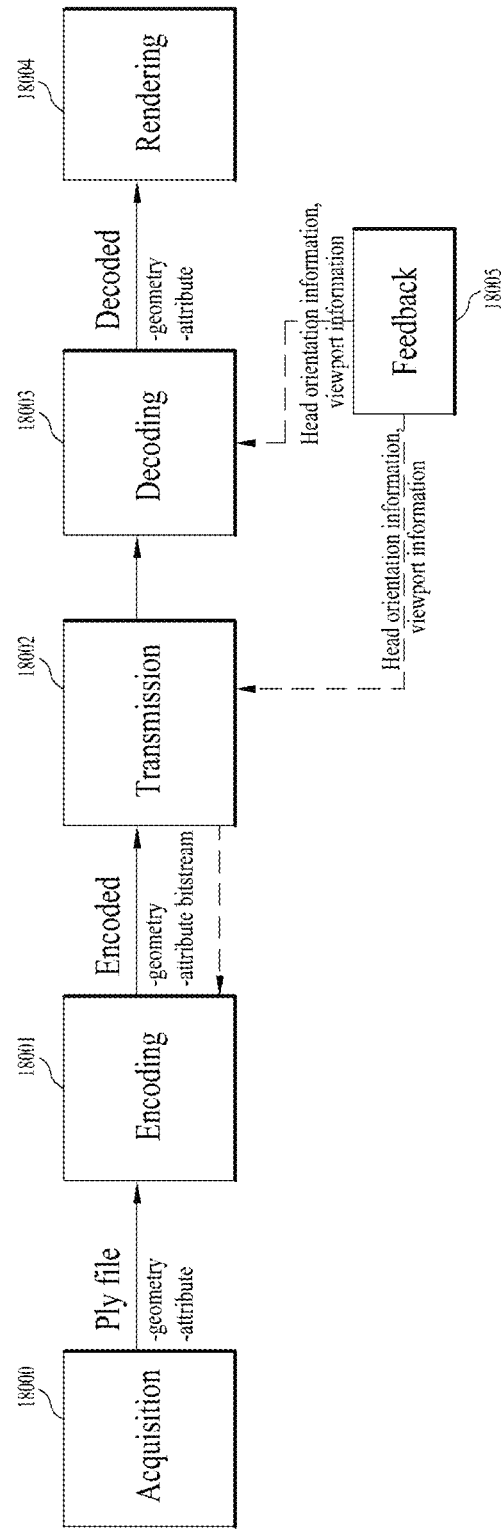
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
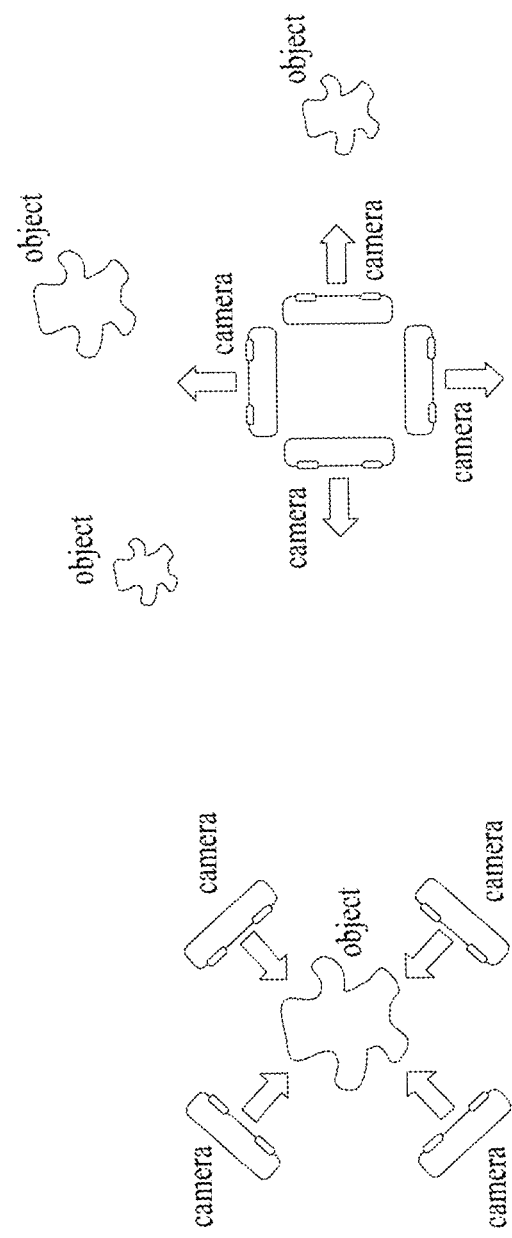
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user.

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
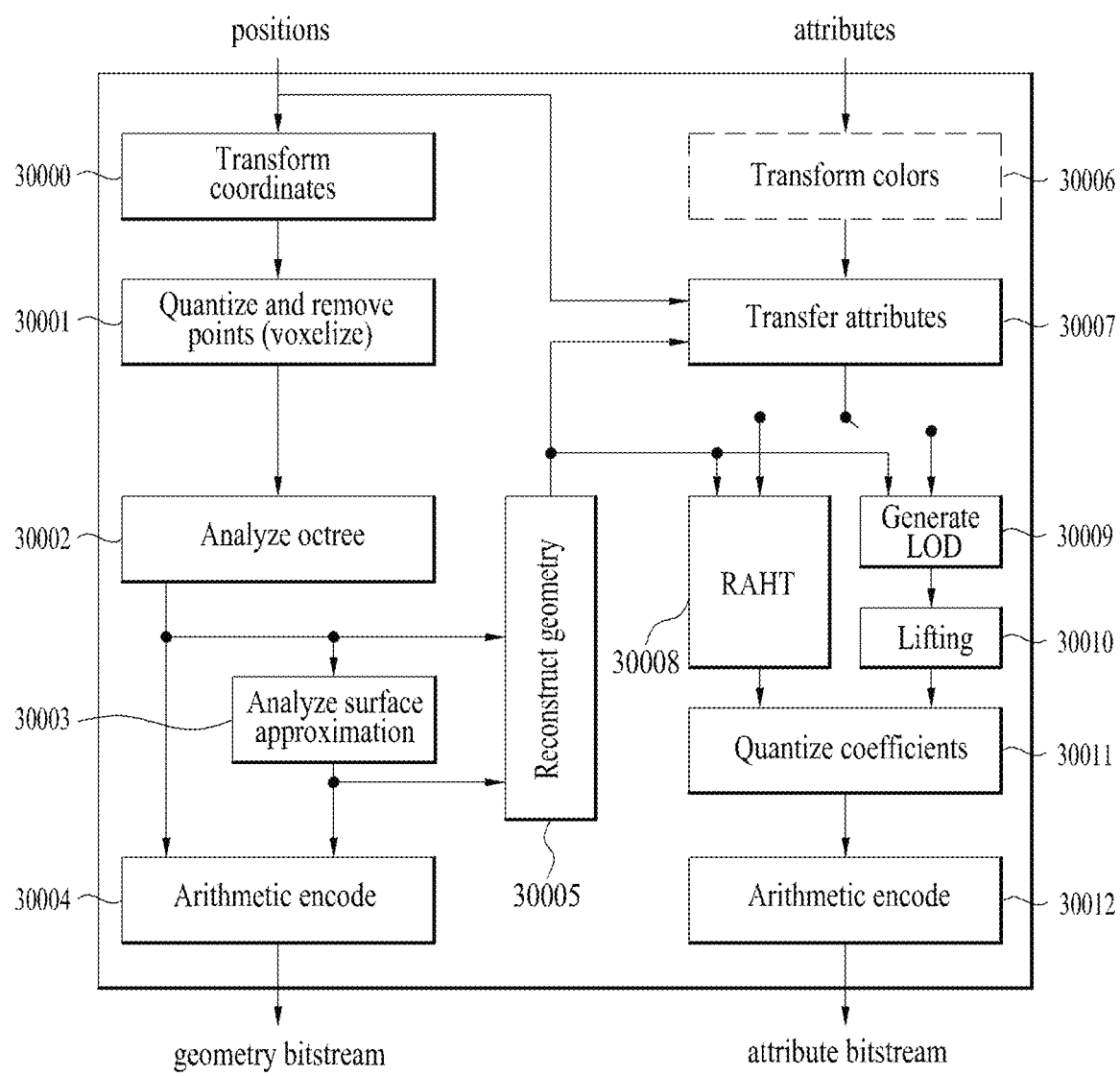
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points present within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
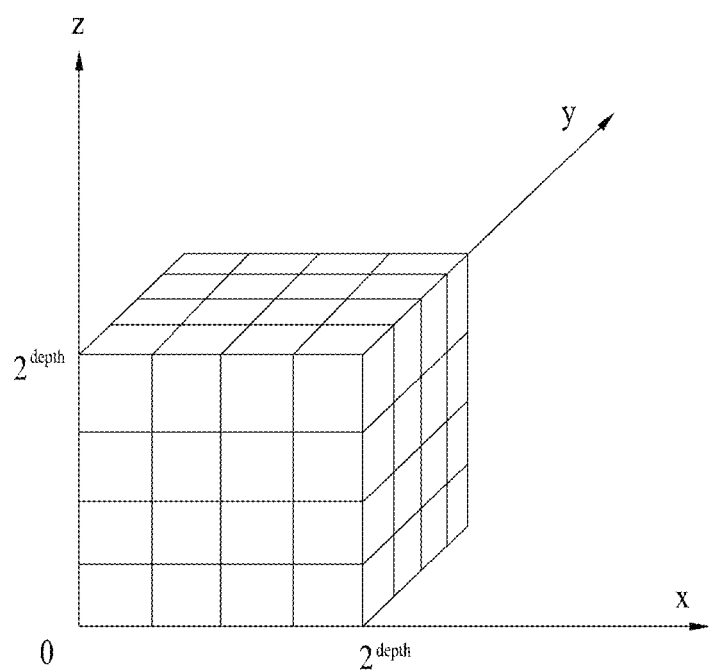
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in the following equation. In the following equation, ($x_n^{int}$, $y_n^{int}$, $z_n^{int}$) denotes the positions (or position values) of quantized points.

$$d = \mathrm{Ceil}(\mathrm{Log}\,2(\mathrm{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix} \qquad \text{i)}$$

-continued $$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1 Triangles formed from vertices ordered 1, . . . , n n triangles
3 (1,2,3)
4 (1,2,3), (3,4,1)
5 (1,2,3), (3,4,5), (5,1,3)
6 (1,2,3), (3,4,5), (5,6,1), (1,3,5)
7 (1,2,3), (3,4,5), (5,6,7), (7,1,3), (3,5,7)
8 (1,2,3), (3,4,5), (5,6,7), (7,8,1), (1,3,5), (5,7,1)
9 (1,2,3), (3,4,5), (5,6,7), (7,8,9), (9,1,3), (3,5,7), (7,9,3)
10 (1,2,3), (3,4,5), (5,6,7), (7,8,9), (9,10,1), (1,3,5), (5,7,9), (9,1,5)
11 (1,2,3), (3,4,5), (5,6,7), (7,8,9), (9,10,11), (11,1,3), (3,5,7), (7,9,11), (11,3,7)
12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
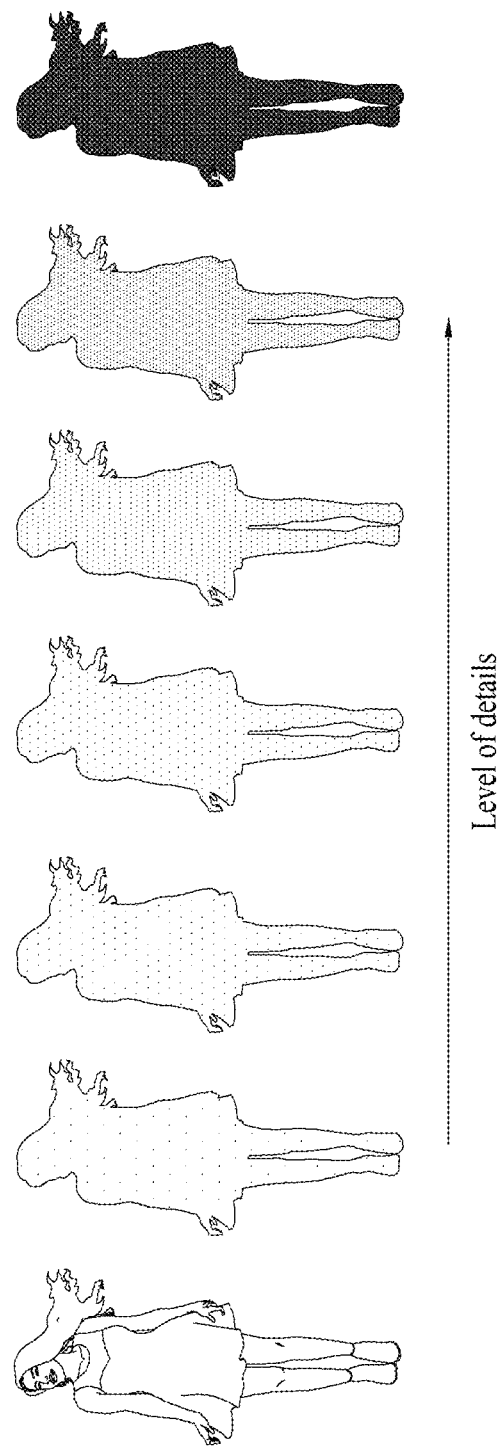
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
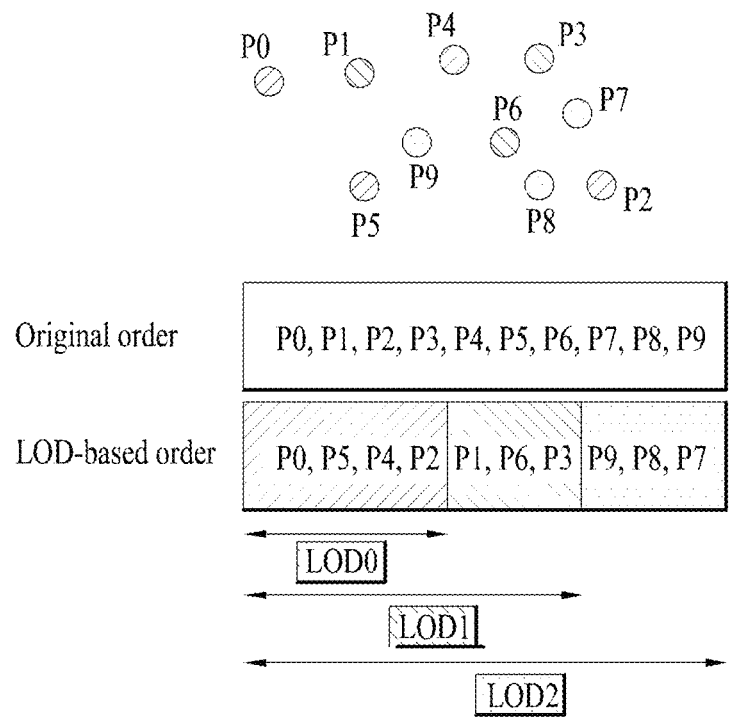
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute Prediction Residuals Quantization Pseudo Code

```
int PCCQuantization(int value, int quantStep) {
  if( value >=0) {
    return floor(value / quantStep + 1.0 / 3.0);
  } else {
    return -floor(-value / quantStep + 1.0 / 3.0);
  }
}
```

TABLE Attribute Prediction Residuals Inverse Quantization Pseudo Code

```
int PCCInverseQuantization(int value, int quantStep) {
  if( quantStep ==0) {
    return value;
  } else {
    return value * quantStep;
  }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the present attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the present attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
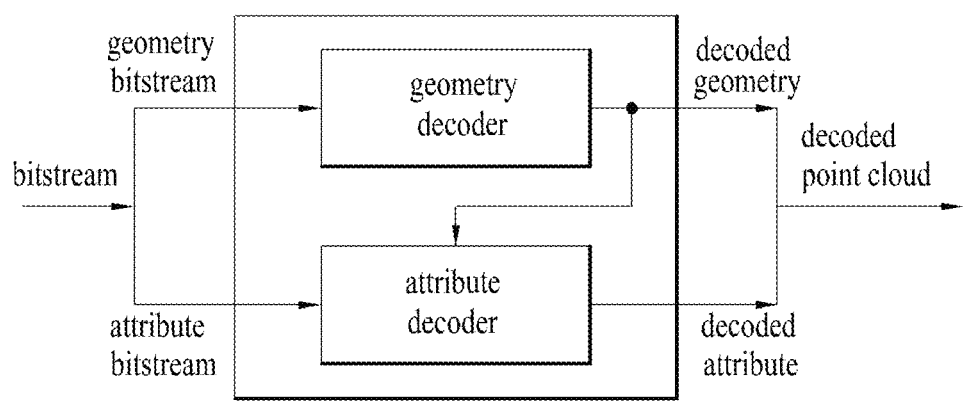
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream included in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
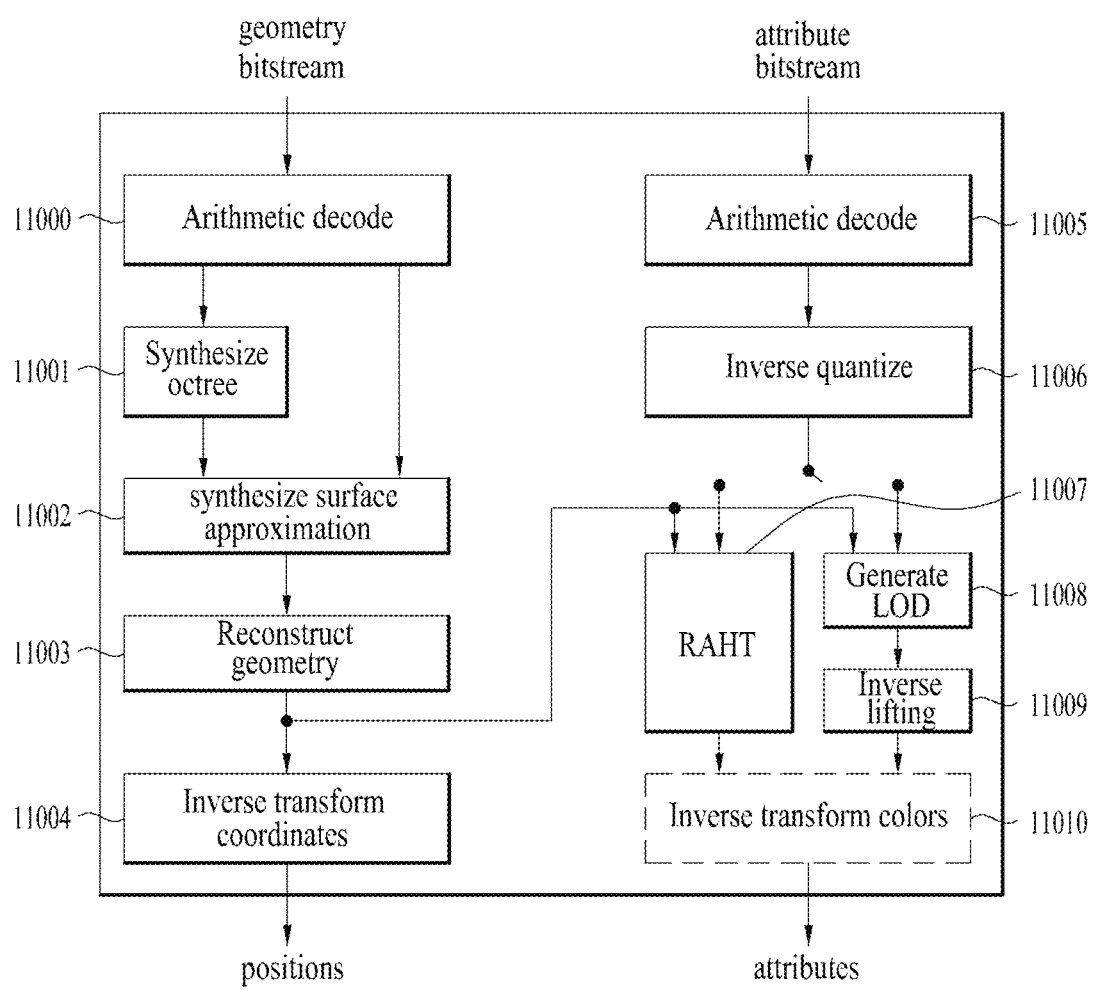
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing apparatus, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
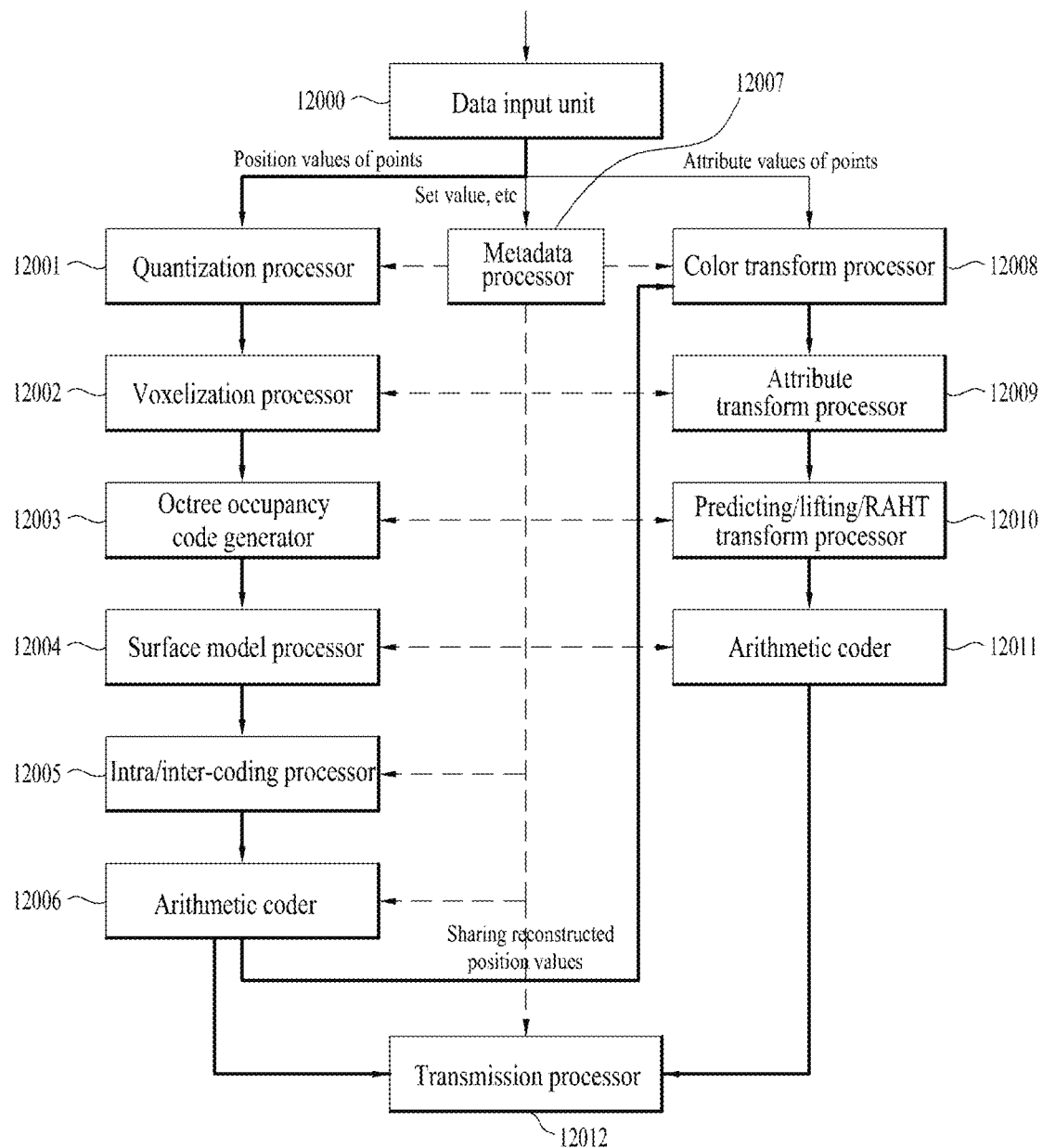
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
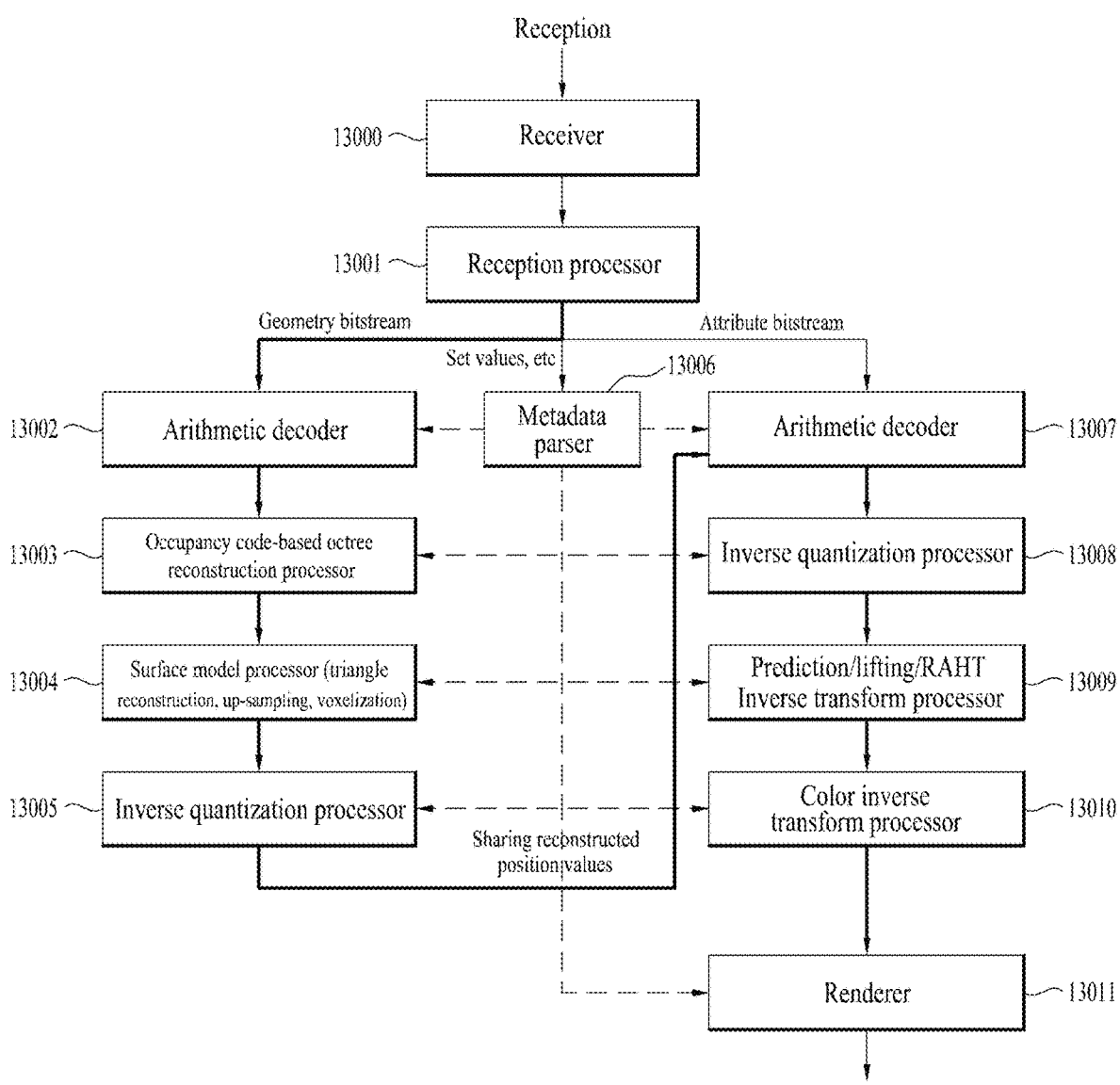
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
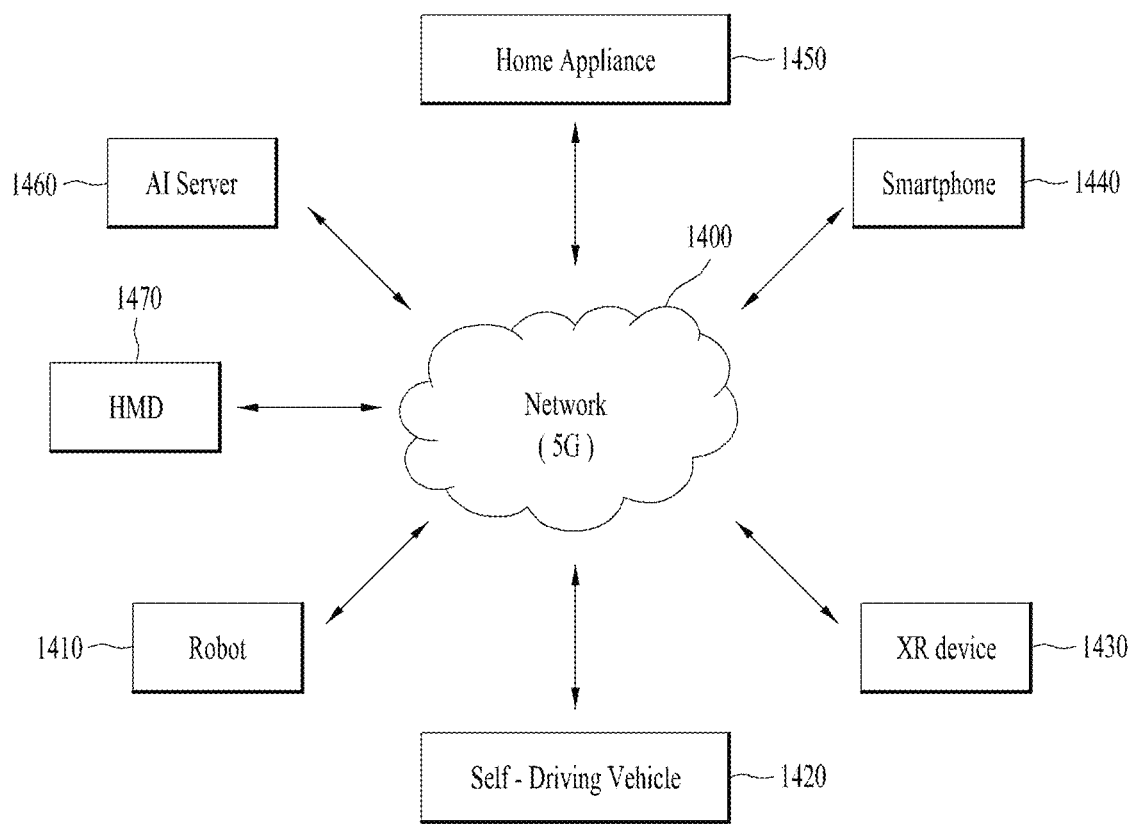
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile phone>

The XR/PCC device 1430 may be implemented as a mobile phone 1440 by applying PCC technology.

The mobile phone 1440 may decode and display point cloud content based on the PCC technology.

<PCC+Self-driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristic as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
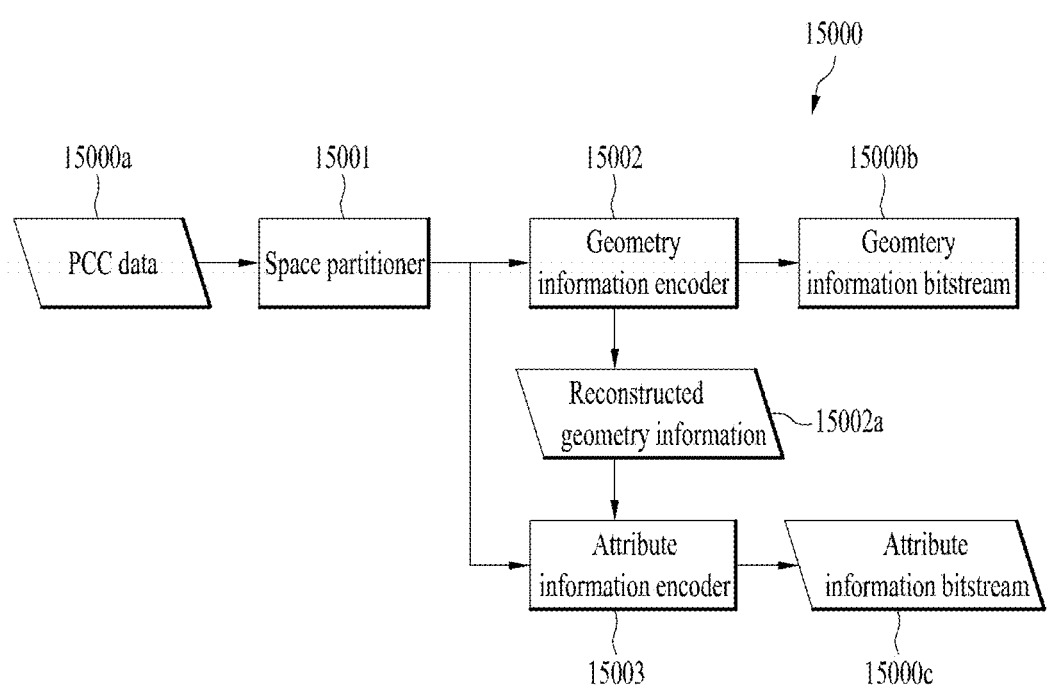
FIG. 15 illustrates a point cloud encoder according to embodiments.

FIG. 15 illustrates a point cloud encoder according to embodiments.

A point cloud encoder 15000 according to the embodiments receives point cloud data (PCC data) 15000a and encodes the same. The point cloud encoder according to the embodiments outputs a geometry information bitstream 15000b and an attribute information bitstream 15000c. The point cloud encoder 15000 according to the embodiments may include a space partitioner 15001, a geometry information encoder 15002 and/or an attribute information encoder 15003.

The point cloud encoder of FIG. 15 may correspond to or be combined the transmission device 1000 of FIG. 1, the point cloud video encoder 10002 of FIG. 1, the encoding 18001 of FIG. 2, the encoder of FIG. 4, the transmission device of FIG. 12, and the XR device 1430 of FIG. 14.

The space partitioner 15001 of the point cloud encoder may receive the point cloud data (PCC data) 15000a, and partition the point cloud data into one or more 3D spaces. The space partitioner 15001 may receive point cloud data and spatially partition the point cloud data into 3D blocks. The point cloud data may contain geometry information and/or attribute information about a point (or points). The space partitioner 15001 may spatially partition the point cloud data (PCC data) based on a bounding box and/or a sub-bounding box. The method/device according to the embodiments may perform encoding/decoding based on a partitioned unit (box).

The transmission device (e.g., the space partitioner) according to the embodiments may partition point cloud data in a 3D space into units that can be processed in parallel in order to compress the point cloud data. The space partitioner 15001 according to embodiments may partition the point cloud data into slices in order for the reception device to support scalability and/or region of interest (ROI) functions for the user.

The transmission device according to the embodiments may partition the point cloud data according to the embodiments into slices (which may be referred to as bricks) or tiles to achieve low latency, low complexity, temporal scalability, spatial scalability, ROI-based spatial scalability, quality scalability, parallel encoding, and parallel decoding of the reception device. Accordingly, the transmission device according to the embodiments needs to perform an operation supporting scalability adjustment and quantum value adjustment in units of slices. Accordingly, the point cloud data transmission device according to the embodiments may configure an overlapping slice such that an overlapping region between the slices is included. A method of partitioning the point cloud data into one or more slices (or overlapping slices) by the point cloud data transmission device according to the embodiments will be described in detail below.

A slice may represent a unit (or a minimum unit) for encoding and/or decoding point cloud data by the point cloud data transmission device according to the embodiments, and the point cloud data transmission device and/or the reception device may independently encode and/or decode the point cloud data on a slice-by-slice basis. A slice according to embodiments may also be referred to as a brick, a block, or a macroblock.

The space partitioner 15001 may perform some/all of the point cloud acquisition 10001 of FIG. 1, the acquisition 18000 of FIG. 2, the operations of FIGS. 3 to 5, and the operation of the data input unit 12000 of FIG. 12.

A geometry information encoder 15002 receives geometry information of the point cloud data (PCC data) according to embodiments and encodes the same. The geometry information may represent position information about the points included in the point cloud data. The geometry information encoder 15002 encodes the geometry information and outputs a geometry information bitstream. The geometry information encoder 15002 may reconstruct the position information about the points and output the reconstructed geometry information 15002a. The geometry information encoder 15002 may transmit the reconstructed geometry information to an attribute information encoder 15002.

The geometry information encoder 15002 may perform some/all of the operations of the point cloud video encoder 10002 of FIG. 1, the encoding 18002 of FIG. 2, the coordinate transformer 40000 of FIG. 4, the quantizer 30001, and the octree analyzer 30002, the surface approximation analyzer 30003, the arithmetic encoder 30004, the geometry reconstructor 30005, the quantization processor 12001 of FIG. 12, the voxelization processor 12002 of FIG. 12, the octree occupancy code generator 12003 of FIG. 12, the surface model processor 12004 of FIG. 12, the intra/inter-coding processor 12005 of FIG. 12, and/or the arithmetic coder 12006 of FIG. 12.

An attribute information encoder 15003 may receive attribute information of the point cloud data according to embodiments, and encode the attribute information based on the reconstructed geometry information received from the geometry information encoder 15002. The attribute information encoder 15003 encodes the attribute information and outputs an attribute information bitstream 15000c. The attribute information encoder 15003 may perform, for example, prediction transform, lifting transform, and/or region adaptive hierarchical transform (RAHT) according to embodiments. The attribute information encoder 15003 may perform, for example, prediction lifting transform. The prediction lifting transform may mean a combination of some or all of the detailed operations of the prediction transform and/or the lifting transform according to the embodiments.

The point cloud encoder according to the embodiments may perform some, all and/or a combination of prediction transform, lifting transform, and/or RAHT according to the embodiments.

The attribute information encoder 15003 may perform all/some of the operations of the point cloud video encoder 10002 of FIG. 1, the encoding 20001 of FIG. 2, the color transformer 30006, attribute transformer 30007, RATH transformer 30008, LOD generator 30009, lifting transformer 30010, coefficient quantizer 30011, and/or arithmetic encoder 40012 of FIG. 4, the color transform processor 12008, attribute transform processor 12009, prediction/lifting/RAHT transform processor 12010 and arithmetic coder 12011 of FIG. 12.

Here, the reconstructed geometry information 15002c may represent an octree reconstructed by the geometric reconstructor (Reconstruct geometry) 40005 described with reference to FIG. 4 and/or an approximated octree. The reconstructed geometry information may represent the occupancy code described with reference to FIG. 6 or represent an octree structure. The reconstructed geometry information may represent an octree occupancy code generated by the octree occupancy code generator 12003 described with reference to FIG. 12.

The attribute information encoder 15003 may encode the attribute information of the point cloud data according to embodiments. Here, the encoder 15003 according to the embodiments may encode the attribute information based on the reconstructed geometry information according to the embodiments. The attribute information encoder 15003 may generate a bitstream containing the attribute information by encoding the received data.

The attribute information encoder 15003 according to the embodiments may include the color transformer 30006, the attribute transformer 30007, RAHT transformer 40008, LOD generator 30009, lifting transformer 30010, and coefficient quantizer 30011, and/or arithmetic encoder 30012 of FIG. 4.

Point cloud data according to embodiments may be classified into category 1 and category 3 according to the characteristic of the data. Category 1 data may be static data and be composed of one frame. Category 3 data may be dynamic data and be composed of N frames. A ply file, which is in a file format of point cloud data, may be composed of multiple points according to a data acquisition method.

A point according to embodiments may include attribute information including position information (geometry information), color information, reflectance information, time information, and normal vector information about the point. A point according to embodiments may include various kinds of information depending on the condition to be presented. Category 1 data and Category 3 data composed of points may include a frame including a large quantity of points. However, when the point cloud data transmission device according to the embodiments receives and encodes a frame including points, latency and unnecessary use of resources may be caused.

Accordingly, for the point cloud data transmission device according to the embodiments, the operations of transmitting and encoding point cloud data, the decoding operation of the reception device, and the operation of rendering processing of the reception device may be performed in real time, and the point cloud data may be partitioned into a plurality of regions so as to be processed with low latency. The point cloud data transmission device according to the embodiments may partition a frame of point cloud data into tiles, slices, and/or bricks.

Accordingly, the point cloud data transmission device according to the embodiments may partition the point cloud data according to an independent data partitioning method for improving parallel processing capability and scalability for 3D point cloud data. The independent data partitioning may include a spatial adaptive partitioning method for supporting re-partitioning of points spatially close to each other.

According to embodiments, point cloud data may be divided into Category 1 and Category 3 according to, for example, characteristics of the data. For example, data of Category 1 may be a static point cloud, and may be composed of one frame. For example, data of Category 3 may refer to dynamic data (dynamically acquired point cloud data), and may be composed of N frames.

A frame according to embodiments may include tiles and/or slices according to the embodiments. A tile and/or slice according to embodiments may include one or more points. One point may be composed of position information, color information, reflectance information, time information, and normal large terrain map (fused) data. According to embodiments, a ply file, which is a file format of point cloud data, may contain various kinds of information according to conditions to be expressed, such as normal vector information about the data.

The data of Categories 1 and 3 consisting of such points may configure a large number of points in one frame. It takes a lot of time and resources to encode/decode one piece of data. For example, Category 3—fused data, which is a large point cloud, is compressed into one piece of data, and thus requires a lot of memories to process. Accordingly, a lot of resources and time may be consumed in the encoding process. In addition, a unit in which one event of encoding/decoding is to be processed, such as calculation of neighbor nodes and generation of a level of detail (LoD) in one frame, may become large.

Accordingly, the point cloud data transmission/reception device according to the embodiments may partition point cloud data into one or more tiles and/or slices, and encode/decode the point cloud data in parallel based thereon. In order to perform the transmission, encoding/decoding, and rendering of the point cloud in real time and with low latency, the transmission device and/or the reception device may divide one point cloud frame into units of tiles, slices, or bricks. This configuration enables the transmission device and/or the reception device to perform spatial random access and parallel encoding/decoding. Accordingly, the point cloud data transmission device (or the space partitioner 15001) according to the embodiments may partition 3D point cloud data before encoding and/or compression of the point cloud data to support the functions of parallel processing and spatial random access.

A slice according to the embodiments is a set of points that can be independently encoded by the point cloud data transmission device or decoded by the point cloud data reception device. A slice comprises one geometry data unit and zero or more attribute data units. Attribute data units depend upon the corresponding geometry data unit within the same slice. Within a slice, the geometry data unit may appear before any associated attribute units. The data units of a slice may be contiguous. The order of slices within a frame may be arbitrarily determined.

A group of slices may be identified by a common tile identifier. Accordingly, the point cloud data transmission device according to the embodiments may further transmit signaling information including a tile inventory (or tile parameter set). A tile inventory describes a bounding box for each tile. A tile may overlap another tile in the bounding box. Each slice may include an index for identifying a tile in which the slice is included.

The point cloud data transmission device according to the embodiments may partition point cloud data and encode each of the partitioned point cloud data independently. Thereby, random access (random access) and parallel encoding in the three-dimensional space occupied by the point cloud data may be performed. Therefore, the point cloud data reception device according to the embodiments may quickly decode such point cloud data.

Figure 16:
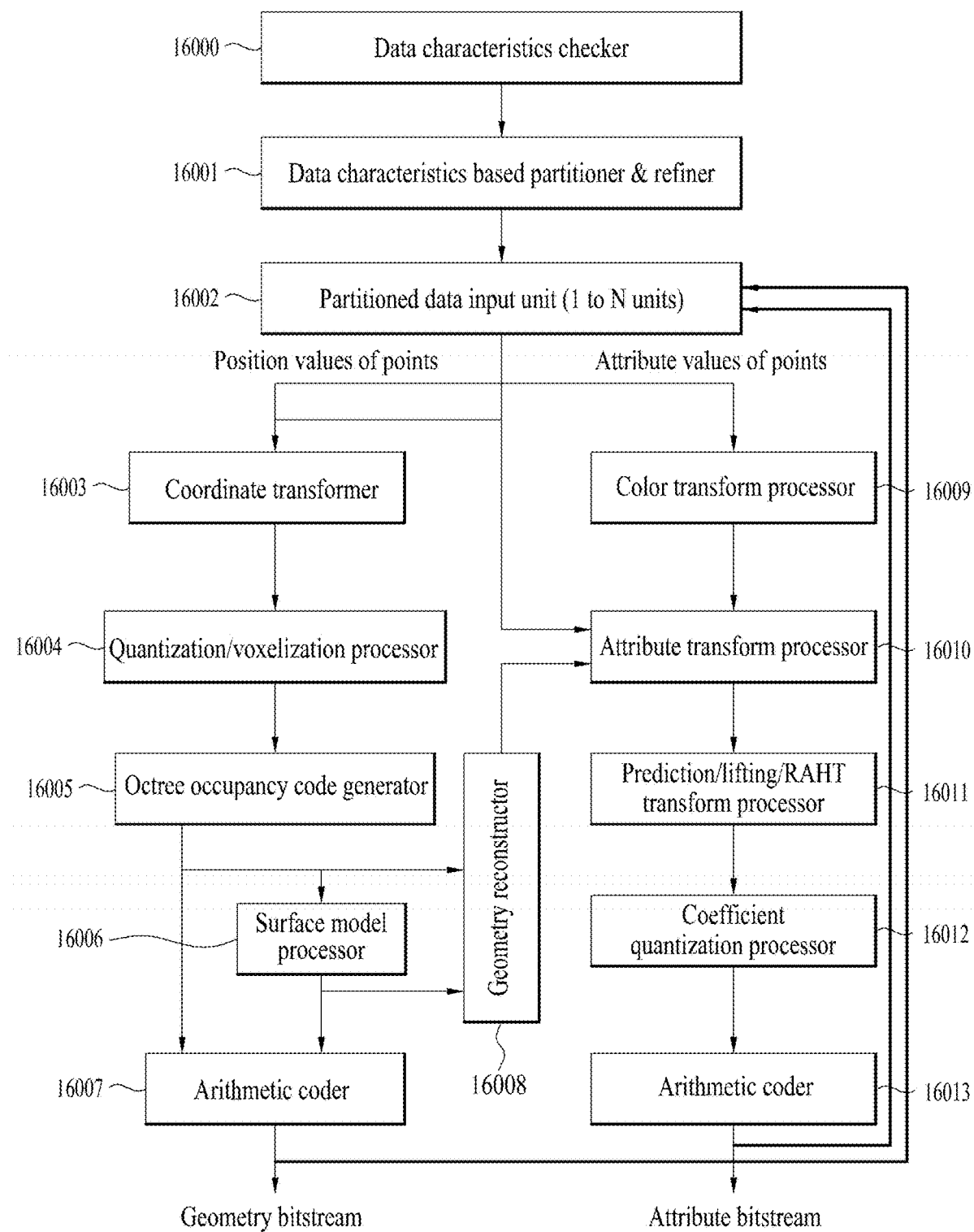
FIG. 16 illustrates a point cloud data transmission device according to embodiments.

FIG. 16 illustrates a point cloud data transmission device according to embodiments.

The point cloud data transmission device according to the embodiments shown in FIG. 16 includes some or all of the point cloud video acquisition 10001 of FIG. 1, the point cloud video encoder 10002 of FIG. 1, the acquisition unit 18000 of FIG. 2, and the encoding unit 18001 of FIG. 2. Components according to the embodiments shown in FIG. 16 may be included in some or all of the space partitioner 15001, the geometry information encoder 15002, and/or the attribute information encoder 15003 of FIG. 15.

The point cloud data transmission device according to the embodiments shown in FIG. 16 may be combined with the XR device 1430 of FIG. 14 or the like.

The point cloud data transmission device according to the embodiments may include a data characteristic checker 16000, a partitioner & refiner 16001, a partitioned data input unit 16002, a coordinate transformer 16003, a quantization/voxelization processor 16004, an octree occupancy code generator 16005, a surface model processor 16006, a first arithmetic coder 16007, a geometry reconstructor 16008, a color transform processor 16009, an attribute transform processor 16010, a prediction/lifting/RAHT transform processor 16011, a coefficient quantization processor 16012, and/or a second arithmetic coder 16013.

The data characteristics checker 16000 checks the characteristics of the point cloud data according to embodiments. The data characteristics checker 16000 may perform the operation of the point cloud video acquisition 10001 of FIG. 1 or the operation illustrated FIG. 3.

The partitioner and/or refiner 16001 partitions and/or refines the point cloud data according to the embodiments. The partitioner and/or refiner 16001 may include a partitioner and/or a refiner.

The partitioner according to the embodiments may partition the point cloud data into one or more tiles. The partitioner according to the embodiments may partition the point cloud data into one or more slices (which may be referred to as bricks or blocks).

For example, the partitioner may partition the point cloud data into one or more tiles, and may partition each tile into one or more slices. A slice may include points of the point cloud data.

The refiner according to the embodiments refines the one or more slices (or tiles) generated by partitioning the point cloud data. Refining refers to creating a merged slice by merging one or more slices, splitting a slice to generate a plurality of slices or redistribute the slice to an adjacent slice.

Merging refers to an operation of generating one slice including all points included in two or more slices.

Splitting refers to re-partitioning a slice such that the points included in the slice are included in two or more slices, or redistributing points included in a slice such that the points are divided into the slice and adjacent slices.

The partitioner and/or refiner 16001 may be included in the space partitioner 15001 shown in FIG. 15.

The data input unit 16002 receives slices generated by the partitioner and/or refiner 16001 according to the embodiments. The data input unit 16002 transfers the received slices to an encoder (e.g., a geometry encoder and/or an attribute encoder) according to embodiments. For example, the data input unit 16002 according to the embodiments transmits position information (position values) about the points included in each slice to the coordinate transformer 16003 according to the embodiments. For example, the data input unit 16002 according to the embodiments transmits attribute information (position values) about the points included in each slice to the color transform processor 16009 according to the embodiments.

In order for the point cloud data transmission device to independently encode each slice, the data input unit 16002 according to the embodiments may receive the point cloud data on a slice-by-slice basis and deliver the point cloud data to the encoder according to the embodiments on the slice-by-slice basis.

The data input unit 16002 may be included in the space partitioner 15001 shown in FIG. 15.

The coordinate transformer 16003 may receive the position information about points (position values of the points) according to the embodiments and transform the coordinates thereof. The coordinate transformer 16003 may perform the operation of the point cloud video encoder 10002 of FIG. 1, the encoding 18001 of FIG. 2, the operation of the coordinate transformer 30000 of FIG. 4, or the operation of FIG. 5.

The quantization/voxelization processor 16004 quantizes and/or voxelizes the point cloud data according to the embodiments. The quantization/voxelization processor 16004 may perform the operation of the point cloud video encoder 10002 of FIG. 1, the encoding 18001 of FIG. 2, the operation of the quantization and voxelization unit 30001 of FIG. 4, the operation of FIG. 5, or the operation of FIG. 6.

The octree occupancy code generator 16005 generates an octree occupancy code based on the quantized and/or voxelized point cloud data. The quantization/voxelization processor 16004 may perform the operation of the point cloud video encoder 10002 of FIG. 1, the encoding 18001 of FIG. 2, the operation of the octree analysis unit 30002 of FIG. 4, the operation of FIG. 6, or the operation of FIG. 7.

The surface model processor 16006 may perform the operation of the surface model processor 30003 of FIG. 4 or the operation of the surface model processor 12004 of FIG. 12.

The first arithmetic coder 16007 arithmetically codes the octree occupancy code according to the embodiments. The first arithmetic coder 16007 may perform the operation of the arithmetic encoding unit 30004 of FIG. 4.

The geometry reconstructor 16008 reconstructs geometry information using the octree occupancy code generated by the octree occupancy code generator 16005 and/or the octree occupancy code obtained by surface model processing by the surface model processor 16006. The geometry reconstructor 16008 performs the operation of the geometry reconstruction unit 30005 of FIG. 4.

The color transform processor 16009 performs color transform coding to transform color values (or textures) included in attributes. The color transform processor 16009 may represent the color transform unit 30006 described in FIG. 4.

The attribute transform processor 16010 performs attribute transformation to transform attributes based on positions on which geometry encoding has not been performed and/or the reconstructed geometry. The attribute transform processor 16010 may represent the attribute transform unit 30007 described in FIG. 4.

The prediction/lifting/RAHT transform processor 16011 may represent the RAHT transform unit 30008, the LOD generation unit 30009, and/or the lifting transform unit 40010 of FIG. 4.

The coefficient quantization processor 16012 may represent the coefficient quantization unit 40011 of FIG. 4.

The second arithmetic coder 16013 may represent the arithmetic coder 40012 of FIG. 4 and the arithmetic coder 12011 of FIG. 12.

The point cloud data transmission device according to the embodiments may further include a combiner configured to combine the encoded geometry bitstream and the encoded attribute bitstream.

Figure 17:
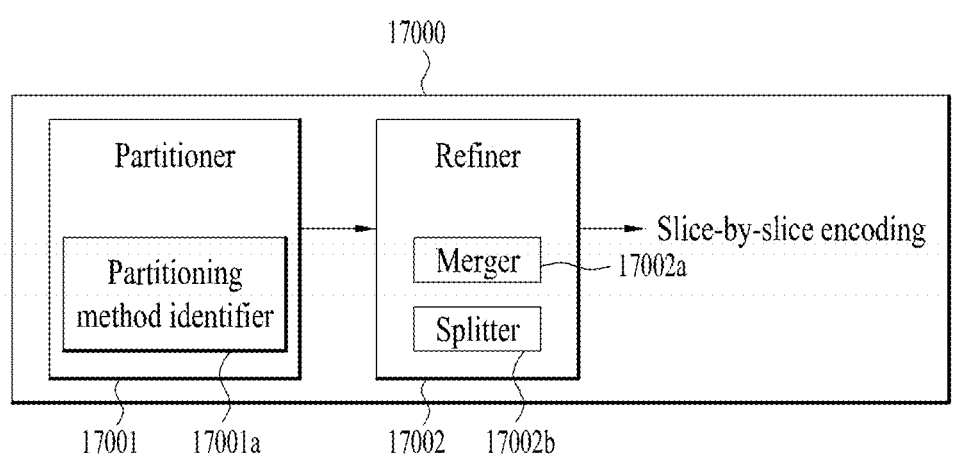
FIG. 17 illustrates a point cloud data transmission device according to embodiments.

FIG. 17 illustrates a point cloud data transmission device according to embodiments.

The elements shown in FIG. 17 may represent, for example, the space partitioner 15001 of FIG. 15, the data characteristics checker 16000 of FIG. 16, and the partitioner and/or refiner 16001 of FIG. 16. The elements shown in FIG. 17 may be the point cloud video acquisition 10001 and/or the point cloud video encoder 10002 of FIG. 1. The elements shown in FIG. 17 may be the acquisition unit 18000 and/or the encoding unit 18001 of FIG. 2 and the data input unit 12000 of FIG. 12.

The point cloud data transmission device according to the embodiments shown in FIG. 17 may be combined with the XR device 1430 of FIG. 14 or the like.

The point cloud data transmission device 17000 (for example, the space partitioner 15001) according to the embodiments may include a partitioner 17001 and a refiner 17002.

The partitioner 17001 according to the embodiments receives point cloud data and preprocesses and/or partitions the same. For example, the partitioner partitions a frame into one or more tiles and/or slices. The partitioner 17001 according to the embodiments may partition the point cloud data according to various partitioning methods. Accordingly, the partitioner 17001 may include a partitioning method identifier 17001*a* according to embodiments.

The partitioning method identifier 17001*a* according to the embodiments may determine a partitioning method based on the characteristics of the point cloud data. The partitioning method according to the embodiments may be one of timestamp partitioning, Morton order partitioning, uniform square partitioning, and octree partitioning.

The partitioner 17001 according to the embodiments (or the partitioning method identifier 17001*a*) may generate signaling information (for example, a parameter partitioning_method, which will be described later) indicating a partitioning method by which the partitioner according to the embodiments partitions point cloud data. The transmission device (or partitioner) according to the embodiments may partition the point cloud data based on one of the above-described partitioning methods or may partition the point cloud data based on multiple partitioning methods.

The partitioner 17001 according to the embodiments may perform some or all of the operations of the data characteristics checker 16000 and the data characteristics based partitioner & refiner 16001 of FIG. 16. The partitioner 17001 according to the embodiments may perform some or all of the operations of the space partitioner 15001 of FIG. 15. The partitioner 17001 according to the embodiments may be included in the point cloud video encoder 10002 of FIG. 1 and the encoding 18001 of FIG. 2.

The refiner 17002 according to the embodiments merges or splits some of the slices generated by the partitioner according to the embodiments. The refiner refines the slices already partitioned by the partitioner according to specific criteria (the number of points in one slice, the volume of the space, and the density of the points).

Merging is to merge some of the slices generated by the partitioning operation of the partitioner 17001 into one slice. For example, when merging a first slice and a second slice among the slices, the refiner 17002 generates one slice including all points included in the first slice and the second slice.

Splitting is to split some of the slices generated by the partitioner 17001 into a plurality of slices, or distribute points included in one slice to adjacent slices (or reset the slice boundary). For example, splitting a first slice may mean subdividing points included in the first slice such a second slice, a third slice, and the like include the points. For example, splitting the first slice may mean resetting the boundary between the first slice and the second slice such that the points included in the first slice are divided into the first slice and the second slice adjacent to the first slice.

The refiner 17002 according to the embodiments may include a merger unit 17002*a* configured to perform the merging operation according to the embodiments and a splitter 17002*b* configured to perform the splitting operation.

When the number of points included in a slice is less than the minimum number of points, the refiner 17002 (or the merger 17002a) according to the embodiments may merge the slice with another slice. The minimum number of points may be preset by the system or set by the user.

When the number of points included in a slice is greater than the maximum number of points, the refiner 17002 (or the merger 17002a) according to the embodiments may split the slice. The maximum number of points may be preset by the system or set by the user.

The refiner 17002 may perform a one-dimensional search, a two-dimensional search, a three-dimensional search, or the like according to an index of a slice positioned in the space within the bounding box according to the embodiments.

A partitioning method according to the embodiments may be transmitted by the transmission device through signaling information in order to transmit a geometry bitstream and an attribute bitstream. The transmission device according to the embodiments may further include a combiner configured to combine the encoded geometry bitstream and the encoded attribute bitstream. In this case, the combiner may determine the order in which the geometry bitstream and the attribute bitstream are to be combined, and may transmit information indicating the order through signaling information.

The refiner 17002 may perform the refining operation (e.g., the merging operation of the merger unit 17002 and/or the splitting operation of the splitter 17002b) according to the embodiments based on a data structure for refinement. The data structure for refinement includes a data structure configured to indicate adjacency between slices partitioned by the partitioner 17001.

The data structure for refinement may be, for example, a data structure of a list type (1D array, 1D linked list, 2D array, 2D linked list, or the like), or a tree type (binary tree, k-one tree, b-tree, or the like).

For example, the refiner may determine whether to use a list refine method employing the list type data structure or a tree refine method employing the tree type data structure. The list refine method may signal an ascending order (list_point_num_ascending_order) or descending order (list_point_num_descending_order) for the number of points belonging to split slices in a list.

The refinement method for the refinement operation of the refiner according to the embodiments may include a method of distance-based refinement and a method of 2/4/6-way refinement. The distance-based refinement method may have, for example, a distance between minimum points (minPoint_distance), a distance between maximum points (maxPoint_distance), and a distance between midpoints (midpoint_distance) as criteria for refinement. The 2/4/6-way refinement may merge n slices adjacent to a specific slice, for example, in ascending order of the number of points (minPointNum_order), descending order of the number of points (maxPointNum_order), or user-defined order (left_right_bottom_top_order).

An example of the partitioning method performed by the partitioner 17001 according to the embodiments will be described in detail with reference to FIGS. 18 to 21 and 24 to 25.

An example of the operation of the refiner 17002 according to the embodiments will be described with reference to FIGS. 22, 23, 26, and 27.

Accordingly, the point cloud data transmission/reception device according to the embodiments may partition point cloud data into one or more tiles and/or slices, and encode/decode the point cloud data in parallel based thereon. This configuration enables the transmission device and/or the reception device to perform spatial random access and parallel encoding/decoding.

Figure 18:
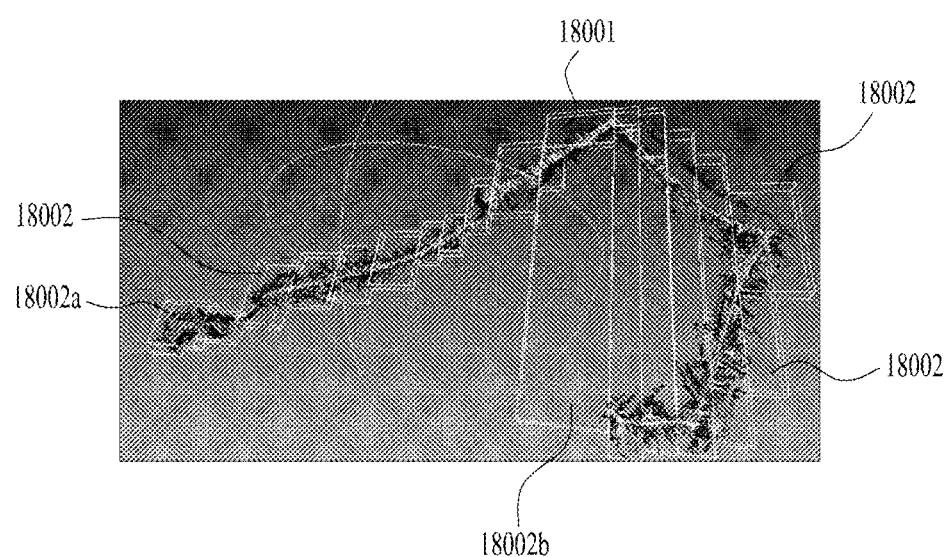
FIG. 18 illustrates an example of partitioning of point cloud data by a point cloud data transmission device according to embodiments.

FIG. 18 illustrates an example of partitioning of point cloud data by a point cloud data transmission device according to embodiments.

Specifically, FIG. 18 illustrates that point cloud data is partitioned into a plurality of slices within one frame carrying the point cloud data. That is, FIG. 18 illustrates the point cloud data 18001 and a plurality of slices 18002 for partitioning the same. The operations illustrated in FIG. 18 may be performed by the partitioner 17001 of FIG. 17, the data characteristics checker 16000 of FIG. 16, part or all of the data characteristics based partitioner & refiner 16001, or the space partitioner 15001 of FIG. 15.

Some or all of the operations illustrated in FIG. 18 may be combined and performed by the XR device 1430 of FIG. 14 or the like.

The point cloud data 18001 according to the embodiments represents the point cloud data described with reference to FIGS. 1 to 16, and may represent one Category 1 data and/or Category 3 data. The point cloud data shown in FIG. 18 may be, for example, Category 3 data.

The plurality of slices 18002 may represent the slices (or bricks) described with reference to FIGS. 15 to 17. A slice may contain points.

The point cloud data transmission device according to embodiments may partition the point cloud data into a plurality of slices as illustrated in FIG. 18. However, when the point cloud data is partitioned into slices, encoding/decoding efficiency may decrease depending on the size of the slice and the density of the slices.

For example, the slice indicated by 18002a in FIG. 18 includes multiple points, and thus the density of the points is high. When the point cloud data of 18002a of FIG. 18 is independently encoded, a large amount of memory resources and high processing operations may be required. As another example, the slice indicated by 18002b in FIG. 18 has a small number of points, and thus encoding efficiency thereof may be lowered. When the point cloud data of 18002b of FIG. 18 is independently encoded, unnecessary delay may occur.

For example, if the transmission device only partitions slices equally or according to a certain criterion, the transmission device should encode all portions present in 18001, and the reception device should decode all the portions even when a person using the reception device according to the embodiments views the portion 18002b. This may cause unnecessary delays in the transmission device and/or the reception device.

Accordingly, the transmission device may split the slice 18002a into a plurality of slices by the splitting operation described with reference to FIGS. 15 to 17. In addition, the transmission device may merge the slice 18002b with other slices by the merging operation described with reference to FIGS. 15 to 17. In addition, the transmission device according to the embodiments may efficiently improve encoding performance by performing partitioning based on the partitioning method of FIGS. 19 to 21, 24, and 25. The partitioning method includes methods such as, for example, timestamp partitioning, Morton order partitioning, uniform square partitioning, and octree partitioning.

Accordingly, the point cloud data transmission/reception device according to the embodiments may partition point cloud data into one or more tiles and/or slices, and encode/decode the point cloud data in parallel based thereon. This configuration enables the transmission device and/or the reception device to perform spatial random access and parallel encoding/decoding.

Figure 19:
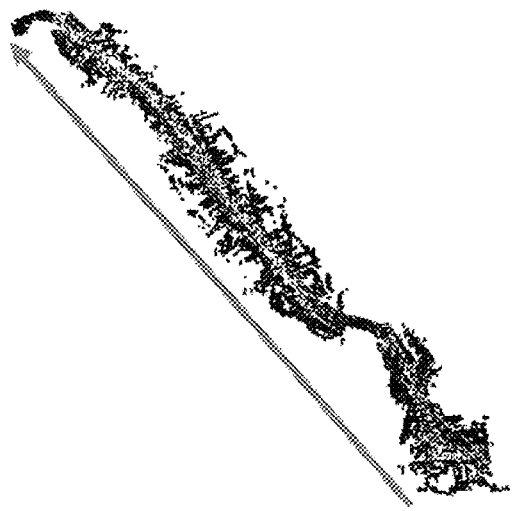
FIG. 19 illustrates an embodiment of a method of partitioning point cloud data according to embodiments.

FIG. 19 illustrates an embodiment of a method of partitioning point cloud data according to embodiments.

FIG. 19 illustrates an embodiment of the method for the partitioning operation illustrated in FIG. 18. The operations of FIG. 19 may be performed by the partitioner 17001 of FIG. 17, the data characteristics checker 16000 of FIG. 16, the data characteristics based partitioner & refiner 16001 of FIG. 16, or the space partitioner 15001 of FIG. 15.

Some or all of the operations illustrated in FIG. 19 may be combined and performed by the XR device 1430 of FIG. 14 or the like.

FIG. 19 illustrates timestamp partitioning according to embodiments. The operations of FIG. 19 represent partitioning based on a time attribute among the attributes of point cloud data. The time attribute of the point clad data according to the embodiments is attribute data obtainable by the acquisition unit according to the embodiments. Accordingly, where the time attribute is present, the illustrated method may be used.

Referring to FIG. 19(B), the point cloud data includes a time attribute. A point according to the embodiments may include a time attribute of a float type as shown in the figure.

Referring to FIG. 19(A), the point cloud data transmission device may determine the temporal order of points based on the time attributes shown on the right side in FIG. 19. For example, the point cloud data transmission device may sort the time attributes to determine the direction and order in which the point cloud data is generated.

The point cloud data transmission device may partition the points into a plurality of slices by sorting the time attributes in ascending or descending order.

Figure 20:
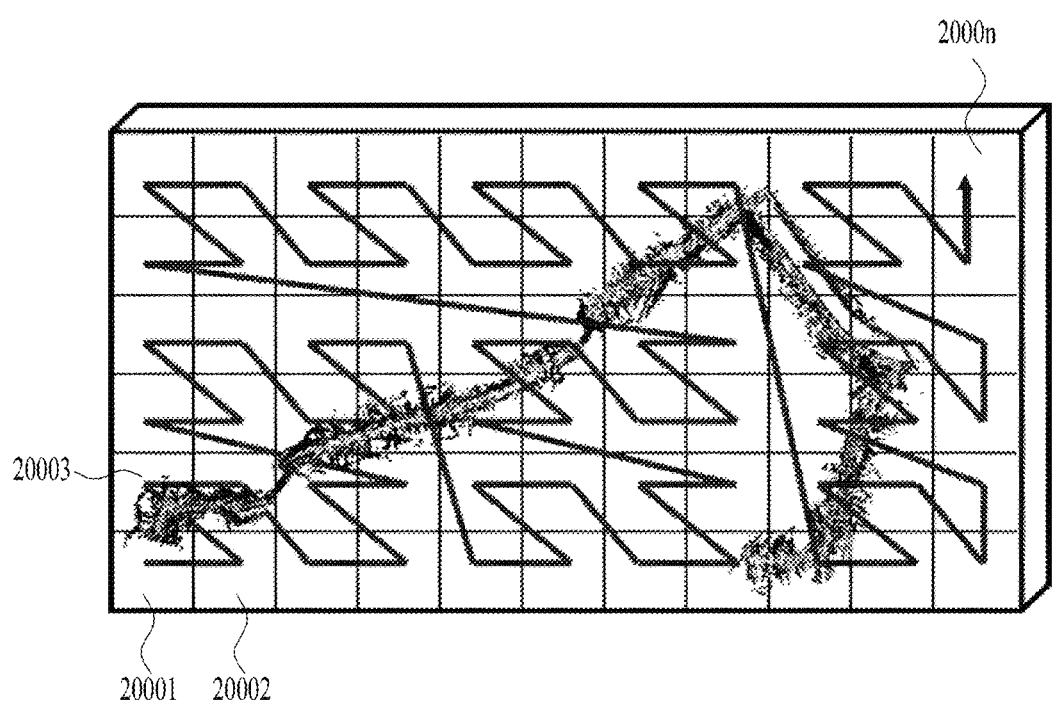
FIG. 20 illustrates an embodiment of a method of partitioning and refining point cloud data according to embodiments.

FIG. 20 illustrates an embodiment of a method of partitioning and refining point cloud data according to embodiments.

FIG. 20 illustrates an embodiment of the method of the partitioning operation and the refining method illustrated in FIGS. 17 and 18. The operations of FIG. 20 may be performed by the partitioner 17001 and/or refiner 17002 of FIG. 17, the data characteristics checker 16000 of FIG. 16, the data characteristics based partitioner & refiner 16001 of FIG. 16, or the partitioner 15001 of FIG. 15.

Some or all of the operations illustrated in FIG. 20 may be combined and performed by the XR device 1430 of FIG. 14 or the like.

FIG. 20 illustrates Morton order partitioning and Morton order refining. The operations of FIG. 20 partition the points of the point cloud data into a plurality of slices based on the Morton codes of the points.

The Morton code refers to a code generated by interleaving coordinate values (e.g., x coordinate value, y coordinate value, and z coordinate value) of the position information about a point in bit units. Morton codes may be expressed as binary or decimal real numbers. The point cloud data transmission device according to the embodiments may determine an order of the partitioning/refinement operations and/or the encoding operation according to the embodiments based on the partitioned slices.

Referring to FIG. 20, the partitioner according to embodiments partitions a three-dimensional space (e.g., a bounding box) including point cloud data according to a specific criterion. The specific criterion may be a criterion according to the partitioning methods illustrated in FIGS. 19, 20, and 22 to 26. For example, the partitioner partitions the 3D space including point cloud data into a plurality of slices according to the axial length-based partitioning illustrated in FIG. 26 or the uniform square partitioning illustrated in FIG. 22. The partitioner may perform partitioning based on the number of points of the point cloud data, the maximum number of points in the partitioned slices, and/or the minimum number of points.

Referring to FIG. 20, the refiner according to the embodiments may generate a Morton code for each of the partitioned slices based on the positions of the partitioned slices, and perform the refinement according to the embodiments (e.g., the method illustrated in FIGS. 23 and 24) in ascending order of the generated Morton codes of the slices.

According to embodiments, the partitioned slices may be divided into slices with points and slices without any point. When the slices with points are sorted based on the Morton codes, the slices may be sorted from the bottom-left-front slice to the top-right-back slice.

For example, among slices, the slice having the smallest code in order of Morton code is slice 20001. Since the slice 20001 has a small number of points, the refiner according to the embodiments may determine whether to merge the slice with slice 20002, which is the next slice in Morton code order or merge the slice with slice 20002. Next, slice 20002, which is a slice merged with the 20001, may still have a small number of points (e.g., the number of points may be less than mimPointNum). Accordingly, the refiner may determine whether to merge slice 20002 with slice 20003, which is the next slice in Morton code order, and/or merge slice 20002 with slice 20003.

For example, when the refiner merges slice 20002 with slice 20003, the number of entire points in the merged slice may be large (e.g., the number of points may be greater than maxPointNum). Thus, the refiner may split the merged slice 20003. The refiner may split the slice 20003 toward slice 20004, which is the next slice in Morton code order, slice 20002, or slice 20001.

The refiner may merge and/or split slices up to 2000$n$ slices according to embodiments in the same manner as above.

The point cloud data transmission device according to the embodiments may generate slices according to the above-described method. Accordingly, as the device is allowed to generate slices without querying the attributes of individual points, a delay occurring in the slice generation process may be reduced.

Figure 21:
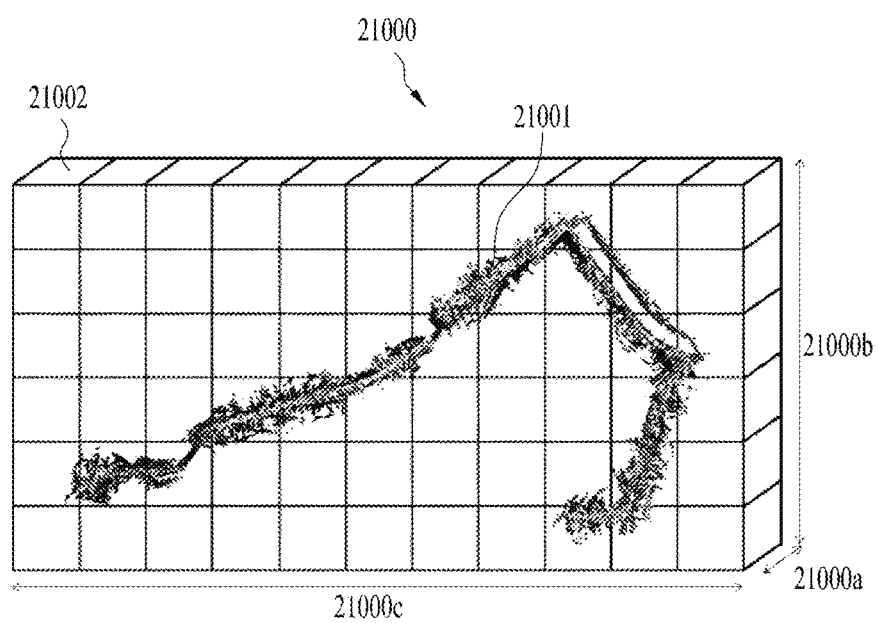
FIG. 21 illustrates an embodiment of a method of partitioning point cloud data according to embodiments.

FIG. 21 illustrates an embodiment of a method of partitioning point cloud data according to embodiments.

FIG. 21 illustrates an embodiment of the method of the partitioning operation illustrated in FIG. 18. The operations of FIG. 21 may be performed by the partitioner 17001 of FIG. 17, the data characteristics checker 16000 of FIG. 16, or the data characteristics based partitioner & refiner 17001.

Some or all of the operations illustrated in FIG. 21 may be combined and performed by the XR device 1430 of FIG. 14 or the like.

FIG. 21 illustrates uniform square partitioning. The operations of FIG. 21 represent partitioning points of point cloud data into slices having the shape of a uniform square 21002. The uniform square 21002 may mean, for example, a cube shape having at least one face of a square shape. A uniform square-shaped slice may be referred to as a checkerboard-shaped slice.

Point cloud data 21001 represents data including points described with reference to FIGS. 1 to 20.

The slices 21002 having a uniform square shape may be slices constituting the bounding box 21000 of point cloud data.

The point cloud data transmission device according to the embodiments may generate a plurality of uniform square-shaped slices 21002 by segmenting the longest axis and the middle-length axis of the bounding box of the point cloud data 21001 by the length of the shortest axis.

For example, referring to FIG. 21, the bounding box of the point cloud data includes a first axis (maxAxis) 21000c, which is the longest axis, a second axis (midAxis) 21000b, which is a middle-length axis, and a third axis (minAxis) 21000a, which is the shortest axis. The point cloud data transmission device may generate (segment) the uniform square-shaped slices 21002 by dividing the first axis (e.g., maxAxis) and the second axis (e.g., midAxis) by the length of the third axis.

After partitioning the point cloud data into a plurality of slices based on the method of uniform square partitioning, the point cloud data transmission device according to the embodiments may further refine the plurality of slices. The process in which the point cloud data transmission device further refines the plurality of slices will be described in detail with reference to FIGS. 22, 23, 26 and 27.

The point cloud data transmission device according to the embodiments may generate slices according to the above-described method. Accordingly, as the device is allowed to generate slices without querying the attributes of individual points, a delay occurring in the slice generation process may be reduced.

FIG. 22 illustrates an embodiment of a method of refining slices according to embodiments.

The operation of refining the slices according to the embodiments illustrated in FIG. 22 may be performed by the space partitioner 15001 of FIG. 15, the data characteristics based partitioner & refiner 16001 of FIG. 16, or the refiner 17002 of FIG. 17.

FIG. 22(A) illustrates that points of point cloud data are partitioned into a plurality of slices (22000). According to the embodiments, a slice may be distinguished from other slices by a slice identifier. For example, the identifier of the slice indicated by 22001 may be N (slice N).

Some or all of the operations illustrated in FIG. 22 may be combined and performed by the XR device 1430 of FIG. 14 or the like.

According to embodiments, slice N 22001 may be adjacent to other slices. For example, slice N 22001 may have a plurality of adjacent slices. For example, referring to FIG. 22(A), slice N may be adjacent to slice N+1, slice N−M, slice N+M, and slice N−1.

Referring to FIG. 22, slice N+1 may be an adjacent slice at the up side of slice N 22001, and slice N−1 may be an adjacent slice at the down side of slice N 22001. Slice N+M may be an adjacent slice at the right side of slice N 22001, and slice N-M may be an adjacent slice at the left side of slice N 22001.

The point cloud data transmission device according to embodiments may refine a specific slice (e.g., slice N).

FIG. 22(B) illustrates the operation of a point cloud data transmission device according to embodiments of partitioning point cloud data into a plurality of slices and refining some of the partitioned slices.

The operation of the point cloud data transmission device according to the embodiments may include an operation 22002a of partitioning point cloud data, an operation 22002b of deriving information on slices adjacent to a specific slice, and/or an operation 22002c of refining the slices by merging and/or splitting slices.

In the operation 22002a of partitioning the point cloud data, the point cloud data is partitioned into a plurality of slices. In the operation 22002a of partitioning the point cloud data, the operation of the space partitioner 15001 of FIG. 15, a part of the operations of the data characteristics checker 16000 and the data characteristics based partitioner 16001 of FIG. 16, the operation of the partitioner 17001 of FIG. 17, or the operations of FIGS. 18 to 21. For example, in the operation 22002a of partitioning the point cloud data, the point cloud data may be partitioned according to the method of uniform square partitioning illustrated in FIG. 21. A partitioned slice (e.g., the current slice in the figure) may have adjacent slices (e.g., a top slice, a bottom slice, a left slice, and a right slice) according to the illustration of FIG. 22(A).

In the operation 22002b of deriving the information on the slices adjacent to the specific slice, information on a partitioned slice (e.g., a current slice) and adjacent slices may be derived.

For example, slice 0 may be a slice positioned at the bottom leftmost corner. In this case, adjacent slices are slices 1 and 3, and the point cloud data transmission device checks the number of points in each of the adjacent slices (e.g., 100 for slice 1, and 200 for slice 3). The point cloud data transmission device may not redundantly check the number of points in a slice that is already checked.

In the operation 22002c of refining the slices by merging and/or splitting the slices, the partitioned slices are refined.

When the number of points in a partitioned slice (e.g., the current slice) is less than the minimum number of points (minNumPoint), the point cloud data transmission device may merge the partitioned slice with one of the adjacent slices according to embodiments. Accordingly, the merged slice is a slice including both the points included in the partitioned slice and the points included in the one of the adjacent slices. The one of the adjacent slices may be, for example, a slice with the smallest number of points among the adjacent slices.

For example, when the current slice has points the number of which is less than minNumPoint, the point cloud data transmission device may perform the merging operation according to the embodiments. When the adjacent slices (4 slices) adjacent to the current slice have 20, 100, 50, and 80 points, respectively, a slice having 20 points may be merged with the current slice.

When the number of points in a partitioned slice (e.g., the current slice) is greater than the maximum number of points (maxNumPoint), the point cloud data transmission device may split the partitioned slice. Accordingly, the point cloud data transmission device may allow two or more slices to include the points included in the partitioned slice (the current slice).

For example, when the current slice has points the number of which is greater than maxNumPoint, the point cloud data transmission device may perform the splitting operation according to the embodiments. When the number of points in the current slice is 150 (for example, maxNumPoint is 100), the point cloud data transmission device may generate two slices by splitting the current slice.

For example, the point cloud data transmission device may distribute 100 points among the 150 points of the current slice (slice N) to slice N, and the other 50 points to an adjacent slice (e.g., slice N+1). In this case, the boundary of slice N+1 may be widened. For example, the point cloud data transmission device may reset the boundary of slice N+1 such that points positioned close to slice N+1 among the points included in slice N are included in slice N+1.

In embodiments, the point cloud data transmission device may redistribute points to be redistributed in the current slice to a slice having a next index and readjust the boundary of the slice having the next index.

The point cloud data transmission device according to the embodiments may generate slices according to the above-described method. Accordingly, as the slices are generated without querying the attributes of individual points, a delay occurring in the slice generation process may be reduced.

According to the configuration described above, the point cloud data transmission device according to the embodiments may equally or appropriately distribute or determine the number of points in the slices, thereby increasing the parallel encoding efficiency of the transmission device.

In addition, according to the configuration described above, the number of points in slices may be set such that the number of points does not greatly vary among the slices, and accordingly the point cloud data reception device according to the embodiments may reduce a delay in encoding each slice independently.

Figure 23:
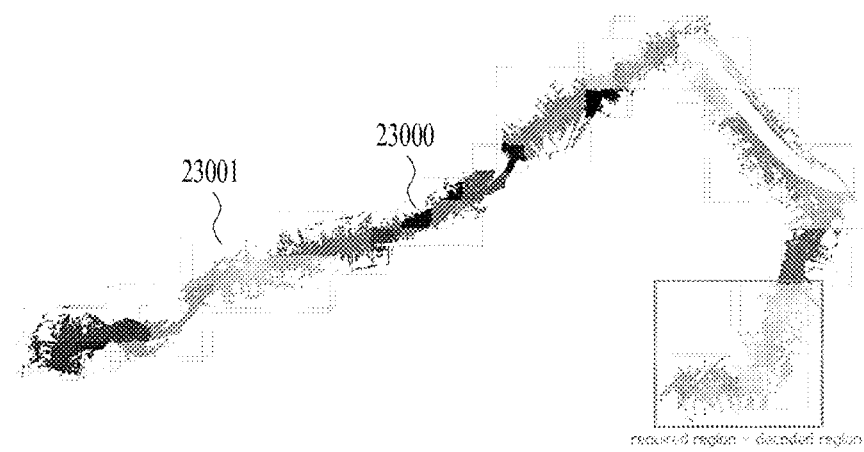
FIG. 23 shows an example of a result of partitioning point cloud data into a plurality of slices and/or refining the same according to embodiments.

FIG. 23 shows an example of a result of partitioning point cloud data into a plurality of slices and/or refining the same according to embodiments.

The operations of FIG. 23 are performed by the partitioner 17001 of FIG. 17, the data characteristics checker 16000 of FIG. 16, the data characteristics based partitioner & refiner 17001, or the space partitioner 15001 of FIG. 15.

Some or all of the operations illustrated in FIG. 23 may be combined and performed by the XR device 1430 of FIG. 14 or the like.

The point cloud data transmission device according to the embodiments generates a plurality of slices by partitioning the point cloud data, and refines the generated slices.

The point cloud data transmission device according to the embodiments may perform the partitioning operation according to the embodiments, and then perform the following operations.

1) Generating Adjacent Information

Each partitioned slice (unrefined slice) generates adjacent information including information on at least one adjacent slice. According to embodiments, the adjacent slice may be one of the adjacent slices at the bottom, left, top, and right sides of the partitioned slice (the current slice). According to embodiments, the adjacent slice may be one of the adjacent slices at the bottom, left, top, right, front, and back sides of the partitioned slice (the current slice).

The adjacent information includes information on an adjacent slice at the bottom of the current slice, an adjacent slice at the left side of the current slice, an adjacent slice at the top of the current slice, and/or an adjacent slice at the right side of the current slice (e.g., slice identifier information, information on the number of points included in the slices, etc.). The adjacent information may include information on the adjacent slice at the bottom of the current slice, the adjacent slice at the left side of the current slice, the adjacent slice at the top of the current slice, the adjacent slice at the front side of the current slice, and the adjacent slice at the back side of the current slice.

2) Merging

The merging operation according to embodiments is performed to merge a specific slice (the current slice) with one of adjacent slices thereof. The merging operation may be performed when the number of points in the current slice is less than the minimum number of points (minNumPoint).

One of the adjacent slices according to the embodiments may be the adjacent slice at the bottom of the specific slice (the current slice), the adjacent slice at the left side of the specific slice, the adjacent slice at the top of the specific slice, the adjacent slice at the front side of the specific slice, and the adjacent slice at the back side of the specific slice.

3) Splitting

Splitting according to the embodiments refers to splitting the specific slice (the current slice) into a plurality of slices or redistributing points to a slice having a next index. The splitting operation may be performed when the number of points in the specific slice is less than the minimum number of points (minNumPoint).

FIG. 23 illustrates slices obtained after a merging operation and/or a splitting operation is performed by the point cloud data transmission device according to the embodiments. When the point cloud data transmission device performs the merging and/or splitting operation, the slices may be arranged adapted to a distribution or region of points. That is, slices on which the merging and/or splitting operation is performed according to the embodiments are optimized for encoding or decoding and include a number of points.

According to the configuration described above, the point cloud data transmission device according to the embodiments may equally or appropriately distribute or determine the number of points in the slices, thereby increasing the parallel encoding efficiency of the transmission device.

In addition, according to the configuration described above, the number of points in slices may be set such that the number of points does not greatly vary among the slices, and accordingly the point cloud data reception device according to the embodiments may reduce a delay in encoding each slice independently.

Figure 24:
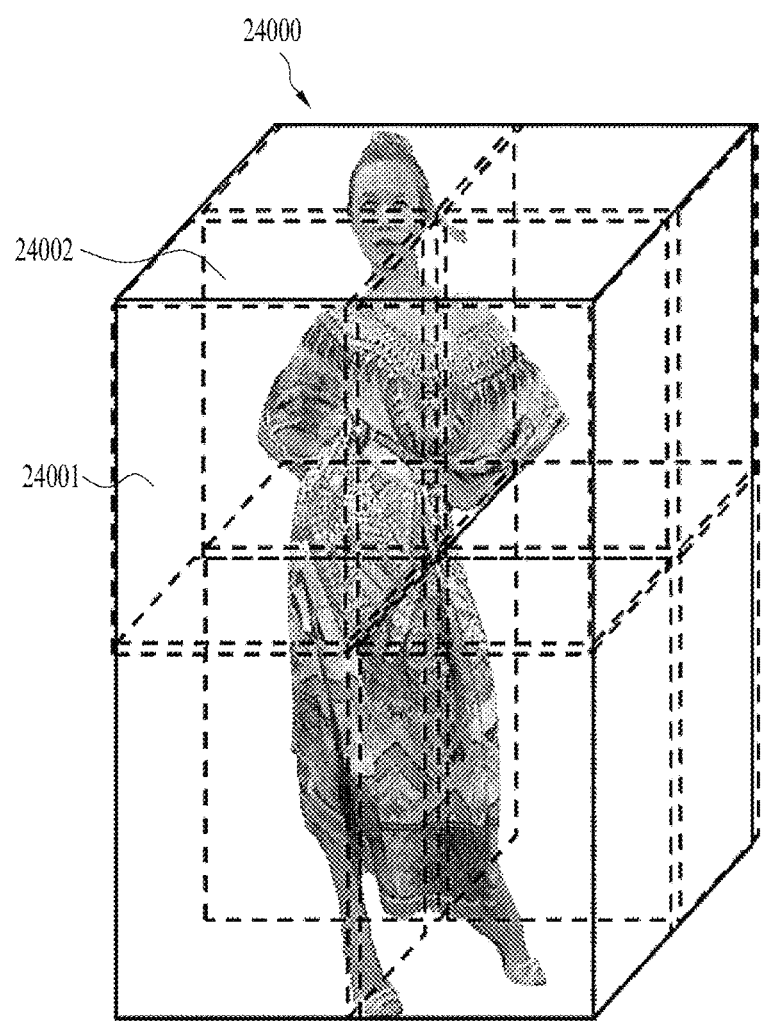
FIG. 24 illustrates an embodiment of a method of partitioning point cloud data according to embodiments.

FIG. 24 illustrates an embodiment of a method of partitioning point cloud data according to embodiments.

FIG. 24 illustrates an embodiment of the method for the partitioning operation shown in FIG. 18. The operations of FIG. 24 may be performed by the partitioner 17001 of FIG. 17, the data characteristics checker 16000 of FIG. 16, the data characteristics based partitioner & refiner 17001, or the space partitioner 15001 of FIG. 15.

The operations according to the partitioning method illustrated in FIG. 24 may be combined and performed by the transmission device 1000 of FIG. 1, the transmitter 10003 of FIG. 1, the point cloud video encoder 10002 of FIG. 1, the encoding 18001 of FIG. 2, the transmission unit 18002 of FIG. 2, the encoder of FIG. 4, the transmission device of FIG. 12, the XR device 1430 of FIG. 14, or the like.

Some or all of the operations illustrated in FIG. 24 may be combined and performed by the XR device 1430 of FIG. 14 or the like.

FIG. 24 illustrates the method of octree partitioning. The operations of FIG. 24 represent partitioning points of point cloud data into a plurality of slices based on an octree for a bounding box 24000.

In the octree partitioning, the entire space (the bounding box including point cloud data according to the embodiments) is partitioned into eight equal spaces to recursively partition the spaces.

The point cloud data transmission device according to the embodiments may set the longest length L as a bounding box (LXLXL), and generate 8 to the power of 1 spaces each time the octree level is lowered by one level. The level 1 of the octree according to embodiments may be preset or set by a user. For example, when the value of the octree level (i.e., 1) is set to 3, the transmission device may partition the bounding box into 512 (=8^3) spaces. The transmission device according to the embodiments may transmit the value of the level according to the embodiments to the reception device through signaling information.

The level value according to the embodiments may be a value received as an input or may be determined based on the number of points that may be present in the bounding box (space) (for example, 1 is the number of points and may be determined as a threshold).

For example, when the number of slices which have 1 to 100,000 points is 50% of the total number of slices when the level for slice partitioning is x, the transmission device according to the embodiments may stop octree partitioning. In this case, the octree partitioning may be stopped based on a density, a threshold, a slice length, or the like.

The octree partitioning may be referred to as uniform-geometry partition using octree. The partitioning method of uniform-geometry partition using octree may include, for example, the following operations.

1) Set the depth (level) of octree partition depOctree=1 by default.

2) Divide the input point cloud into 8^depOctree slices by Octree partition scheme.

3) Evaluate the proportion ratio of points smaller than the maxPointNum in all slices. Set a ratio threshold thres. If ratio is bigger than thres, go to the next step. Otherwise, back to procedure 1) and set depOctree+=1.

After slice partition, the point cloud of a slice whose point count is greater than MaxPointNum may be split, and the point cloud of slice whose point count is less than MinPointNum may be merged.

The splitting operation according to the embodiments represents the splitting operation described with reference to FIGS. 18 to 23. In the splitting operation, when the number of points (Asize) is greater than MaxPointNum, the corresponding slice may be split into n slices. Here, n may be, for example, ceil (Asize/MaxPointNum).

The merging operation according to the embodiments represents the merging operation described with reference to FIGS. 18 to 23. In the merging operation, if the point count of the current slice is less than MinPointNum, the slice is merged with either the prior slice or the next one.

In order to determine a slice to be merged, the point cloud data transmission device according to the embodiments may determine a direction of merging as follows.

If the slice is the first slice, the merging may be directed toward the next slice.

If the slice is the last slice (at the end), the merging may be directed toward a prior slice.

If the slice is neither the first slice nor the last slice, the operation may be performed as follows. When the number of points of slice created by merging the current slice with the prior slice is SumFront, and the number of points in a slice created by merging the current slice with the next slice is SumNext, the merging operation may be performed as follows.

If SumFront>MaxPointNum and SumNext>MaxPointNum, a slice with a larger number of points may be selected between the prior slice and the next slice.

If SumFront<MaxPointNum and SumNext<MaxPointNum, a slice with a larger number of points may be selected between the prior slice and the next slice.

Otherwise, if one of SumFront and SumNext is greater than MaxPointNum and the other is less than MaxPointNum, the current slice is merged with the slice having the smaller number of points between the prior slice and the next slice.

All slices created after the merging operation may be checked one by one(traveled) and SumMerged may be compared with MaxPointNum. SumMerged is the number of points in the merged slice.

If SumMerged<MinPointNum, the current slice may be merged further with another slice.

If SumMerged>MaxPointNum, the merged slice may be split.

If MinPointNum<SumMerged<MaxPointNum, the current slice is maintained.

According to the configuration described above, the point cloud data transmission device according to the embodiments may equally or appropriately distribute or determine the number of points in slices, thereby increasing the parallel encoding efficiency of the transmission device.

In addition, according to the configuration described above, the number of points in slices may be set such that the number of points does not greatly vary among the slices, and accordingly the point cloud data reception device according to the embodiments may reduce a delay in encoding each slice independently.

Figure 25:
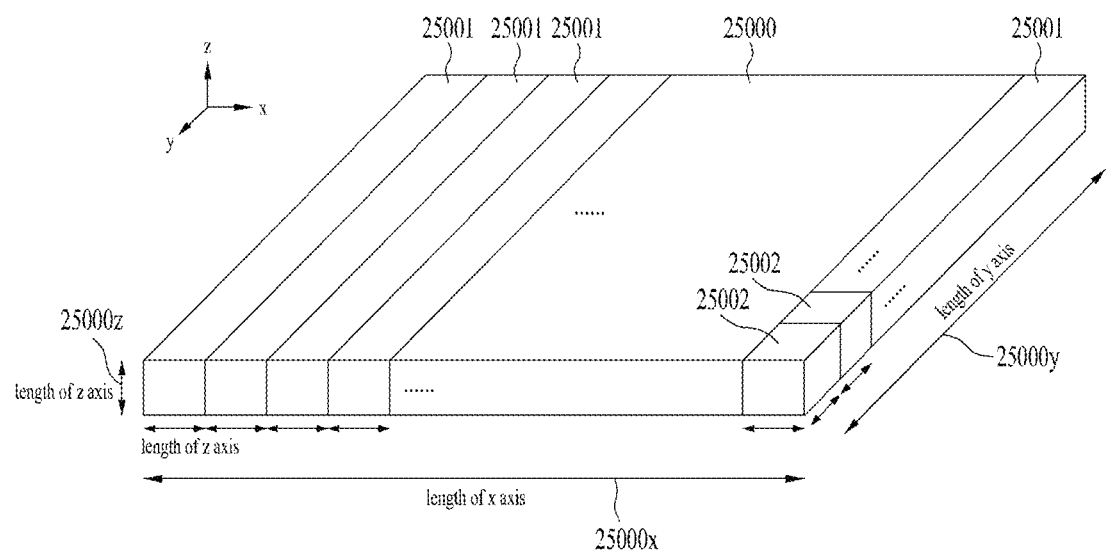
FIG. 25 illustrates an embodiment of a method of partitioning point cloud data according to embodiments.

FIG. 25 illustrates an embodiment of a method of partitioning point cloud data according to embodiments.

FIG. 25 illustrates an embodiment of the method of the partitioning operation illustrated in FIG. 18. The operations of FIG. 25 may be performed by the partitioner 17001 of FIG. 17, the data characteristics checker 16000 of FIG. 16, the data characteristics based partitioner & refiner 16001 of FIG. 16, or the space partitioner 15001 of FIG. 15.

The operations according to the partitioning method illustrated in FIG. 25 may be combined and performed by the transmission device 1000 of FIG. 1, the transmitter 10003 of FIG. 1, the point cloud video encoder 10002 of FIG. 1, the encoding 18001 of FIG. 2, the transmitter 18002 of FIG. 2, the encoder of FIG. 4, the transmission device of FIG. 12, the XR device 1430 of FIG. 14, or the like.

FIG. 25 illustrates that the point cloud data transmission device partitions point cloud data 25000 or a 3D space occupied by the point cloud data into regions 25001 and 25002 based on the lengths of the axes of the bounding box. The point cloud data transmission device according to the embodiments may encode the point cloud data for each of the partitioned regions 25001 and 25002 based on one or more of the lengths of the axes of the bounding box. According to embodiments, the operation of partitioning the data into the partitioned regions 25001 and 25002 (for example, slices) based on the lengths of the axes of the bounding box may be referred to as adaptive axial length-based slice tiling (or axial length-based slice partitioning). The operation illustrated in FIG. 25 may be performed by, for example, the data input unit 12000 of FIG. 12.

The point cloud data 25000 may contain one or more points. The point cloud data may be contained in a 3D space (e.g., a bounding box). A 3D space (e.g., a bounding box) according to embodiments may be represented as an x-axis, a y-axis, and a z-axis.

For the point cloud data 25000, for example, the length of one of the x-axis, y-axis and z-axis may be shorter or significantly shorter than the lengths of the other two axes. For example, there may be point cloud data that expresses a terrain that is widely distributed along two axes except one axis. If the point cloud data transmission device performs encoding on the points in the bounding box regardless of the lengths of the axes, encoding efficiency may be degraded. Accordingly, the point cloud data transmission device needs to partition the data into one or more regions in adaptation to the lengths of the axes of the 3D space. Therefore, the point cloud data transmission device according to the embodiments may calculate the relative lengths of the x-axis, y-axis, and z-axis, and partition the point cloud data into one or more regions based on the calculated relative lengths.

The point cloud data transmission device (for example, the tile partitioner 16000 of FIG. 16) according to the embodiments may configure one or more slices 25001 by partitioning the longest axis (e.g., the x-axis) among the a length of an x-axis 25000x, a length of a y-axis 25000y, and a length of the z-axis 25000z into units of the length of the shortest axis (e.g., the z-axis). The data partitioned into the one or more slices may be units that may be encoded and decoded in parallel.

The point cloud data transmission device according to the embodiments (for example, the tile partitioner 18000 of FIG. 18 or the tiling unit 19001 of FIG. 19) may re-partition some slices 25001. In the re-partitioning according to the embodiments, one or more sub-slices (or second slices) may be configured by partitioning the longest axis of some slices (that is, the y-axis 25000y in the case of the slice 25001 of FIG. 25) into units of the length of the shortest axis (e.g., the x-axis or the z-axis). The data partitioned into the one or more sub-slices (or second slices) 25002 may be units that may be encoded and decoded in parallel.

The point cloud data transmission device according to the embodiments may perform partitioning based on min/max information about points without conforming to a spatial data distribution with a maximum number and a minimum number (maxPointNum, minPointNum) of points in the first slices.

The point cloud data transmission device according to the embodiments may determine whether to re-partition the first slices or the second slices, based on the number of points in the regions, the size of the space allocated by each of the regions, and the density of points included in the regions. According to embodiments, spatial re-partitioning may be space-adaptively performed, and may include partitioning slices based on a specific axis and re-partitioning slices based on a middle-length axis.

The point cloud data transmission device according to the embodiments may adopt the adaptive axial length-based region tiling according to the embodiments, thereby effectively performing encoding in a sequence associated with a spatial unit within one frame of point cloud data including a large terrain feature. The point cloud data reception device according to embodiments may effectively decode the point cloud data including the large terrain feature.

For example, one slice may be configured by segmenting the longest axis (e.g., X axis) by the shortest axis (e.g., Z axis). Slices partitioned by a specific axis may be partitioned again. By applying the method of partitioning the longest axis by the smallest axis to the re-partition, the partitioning may be performed recursively. The shortest axis of the slice to be re-partitioned may become the Z axis, and the slice may be re-partitioned into slices each having a space of (Z-axis length×Z-axis length) along the Y axis, which is the longest unpartitioned axis in the slice.

The axial length-based slice partitioning according to the embodiments may be referred to as uniform-geometry partition along the longest edge.

The uniform-geometry partition along the longest edge may be performed, for example, as follows:

1) Partition the point cloud data using the slice partitioning method according to the embodiments; and 2) Perform the merging operation and/or the splitting operation according to the embodiments based on the maximum number of points in the slice (e.g., MaxPointNum according to the embodiments) and/or the minimum number of points in the slice (e.g., MinPointNum according to the embodiments).

According to the configuration described above, the point cloud data transmission device according to the embodiments may equally or appropriately distribute or determine the number of points in the slices even without additional signaling information and parameters, thereby increasing the parallel encoding efficiency of the transmission device.

The method of axial length-based slice partitioning according to embodiments may be effective for partitioning point cloud data having a terrain that is widely spread along two axes except one axis in the point cloud data.

Figure 26:
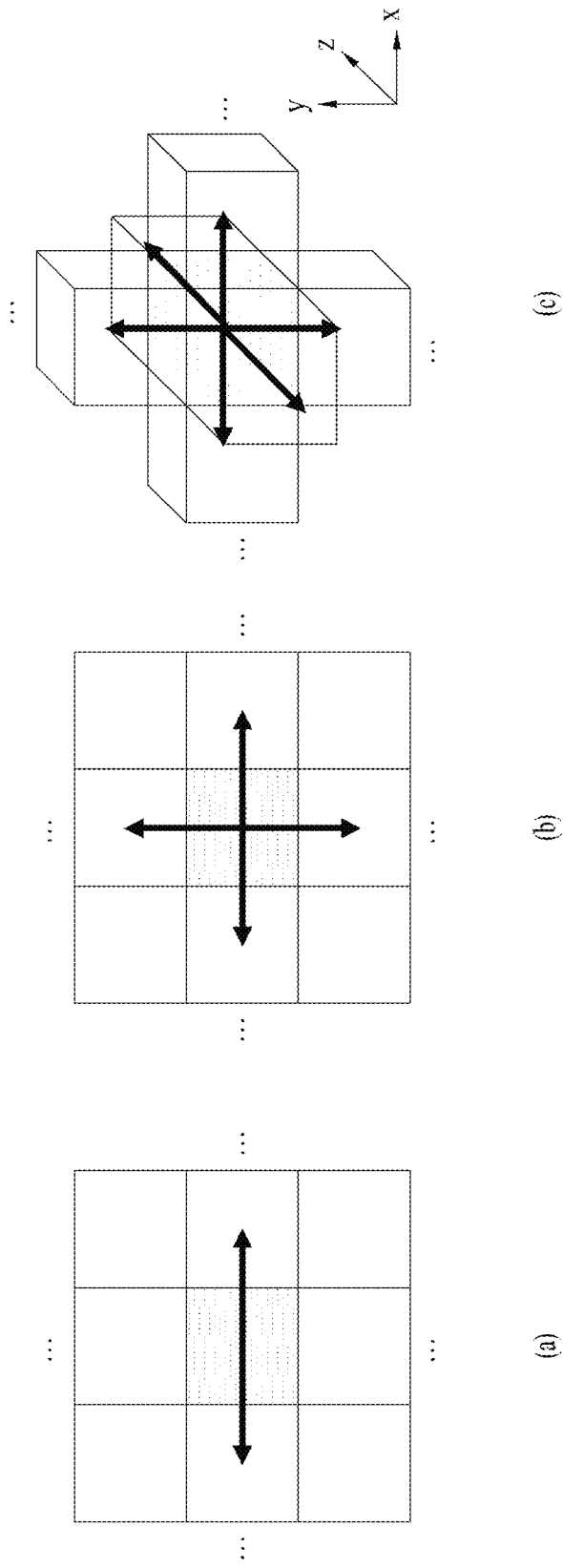
FIG. 26 shows an example of adjacent slices according to embodiments.

FIG. 26 shows an example of adjacent slices according to embodiments.

FIG. 26 illustrates a method of determining a specific slice and adjacent slices in the refinement operation according to the embodiments illustrated in FIG. 22. For example, the operations illustrated in FIG. 26 represent a method of finding slice N 22001 of FIG. 22 and adjacent slices thereof.

The operations of FIG. 26 may be performed by the refiner 17002 of FIG. 17, the data characteristics checker 16000 of FIG. 16, the data characteristics based partitioner & refiner 16001 of FIG. 16, or the space partitioner 15001 of FIG. 15.

The operations according to the partitioning method illustrated in FIG. 26 may be combined and performed by the transmission device 1000 of FIG. 1, the transmitter 10003 of FIG. 1, the point cloud video encoder 10002 of FIG. 1, the encoding 18001 of FIG. 2, the transmitter 18002 of FIG. 2, the encoder of FIG. 4, the transmission device of FIG. 12, the XR device 1430 of FIG. 14, and the like.

The refiner may perform the merging operation and/or splitting operation according to the embodiments. The refiner performs the refining operation based on the distance-based refinement and/or 2/4/6-way refinement, which is determined according to a refining criterion.

FIGS. 26(A) to 26(C) illustrate two-way refinement, four-way refinement, and six-way refinement, respectively.

The point cloud data transmission device according to the embodiments may search for adjacent slices that are present on 2 sides (left and right), 4 sides (left, right, top, and bottom), or 6 sides (left, right, top, bottom front, back), depending on the positions of partitioned slices or a partitioning method.

FIG. 26(A) illustrates the method of 2-way refinement.

The 2-way refinement is a refining method for a partitioning method in which the one-dimensionally long axis is segmented by a short axis, and may include a merging operation or a splitting operation. For example, in the two-way refinement, the point cloud data transmission device searches for adjacent slices in one dimension to perform the merging operation and/or the splitting operation on a specific slice. For example, the point cloud data transmission device performs the merging and/or splitting operation using an adjacent slice on the left side of the specific slice and an adjacent slice on the right side of the specific slice according to the method of two-way refinement.

FIG. 26(B) illustrates the method of 4-way refinement.

The 4-way refinement is a method of performing the merging or splitting operation based on the positions of the slices positioned at the top, bottom, left, and right of a current slice. For example, in the 4-way refinement, the point cloud data transmission device searches for adjacent slices in two dimensions to perform the merging operation and/or splitting operation on a specific slice. For example, according to the method of 4-way refinement, the point cloud data transmission device performs the merging operation and/or splitting operation based on an adjacent slice on the left side of the specific slice, an adjacent slice on the right side of the specific slice, an adjacent slice at the top of the specific slice, and an adjacent slice at the bottom of the specific slice.

FIG. 26(C) illustrates the method of 6-way refinement.

The 6-way refinement is applied to a space-based partitioning method such as the octree partitioning. For example, in the method of 6-way refinement, the point cloud data transmission device searches for adjacent slices in three dimensions to perform the merging operation and/or splitting operation on a specific slice. For example, according to the method of 6-way refinement, the point cloud data transmission device performs the merging operation and/or splitting operation based on an adjacent slice on the left side of the specific slice, an adjacent slice on the right side of the specific slice, an adjacent slice at the top of the specific slice, an adjacent slice at the bottom of the specific slice, a slice in front of the specific slice, and a slice on the back of the specific slice.

The method of merging and/or splitting the slices partitioned by the point cloud data transmission device in 2, 4, or 6 directions may be performed based on a data structure of a one-dimensional list type and/or a data structure of a tree type. An operation of merging and/or splitting by the point cloud data transmission device based on the data structure of the one-dimensional list type and/or the data structure of the tree type will be described in detail with reference to FIG. 27.

In the method of distance-based refining, the refiner may calculate or measure adaptive distances of slices partitioned by the partitioner, and perform the merging operation and/or splitting operation based on the calculated or measured distances. The distance-based refinement is expressed as, for example, a pseudo code as follows.

for(slice N)
All distances from slice 0 to slices 1 to N
Store slice X at the nearest distance as slice 1, which is a slice following slice 0 in order
slice++

For example, the point cloud data transmission device may measure or calculate the distance of a slice that is closest to a current slice (i.e., a slice having a minimum distance from the current slice), the distance of a slice at a distance corresponding to an median value of the distances of all slices to the current slice, and the distance of the slices that are farthest from the current slice (that is, slices having the maximum distance from the current slice), and rearrange the slice at the closest distance among the distances of all slices as the next slice.

In the case where the nearest slice, the middle slice, and/or the farthest slices are calculated and measured, the point cloud data transmission device may skip a slice that has already been inquired. For example, in the second slice, the distances from the remaining slices 3 to N excluding the first slice may be measured or calculated to determine the nearest slice as the next slice. The above-described operation may be repeatedly performed for all slices.

The point cloud data transmission device may perform the merging operation and/or splitting operation in order of slices arranged based on distance. The merging operation may be an operation of merging a slice with the next slice when the number of points in the slice is less than minPointNum. In the splitting operation, when the number of points in a slice is greater than maxPointNum, points belonging to a position close to the next slice may be divided into the two slices.

The point cloud data transmission device according to the embodiments may apply, in common, the distance-based refinement operation and/or the 2/4/6-way refinement operation to slices to which the partitioning method described with reference to FIGS. 18 to 25 is applied.

According to the configuration described above, the point cloud data transmission device according to the embodiments may equally or appropriately distribute or determine the number of points in slices, thereby increasing the parallel encoding efficiency of the transmission device.

In addition, according to the configuration described above, the number of points in slices may be set such that the number of points does not greatly vary among the slices, and accordingly the point cloud data reception device according to the embodiments may reduce a delay in encoding each slice independently.

FIG. 27 illustrates an example of a method of refining slices using adjacent slices according to embodiments.

FIG. 27 shows data structures for refining slices using adjacent slices. The method of merging and/or splitting the slices partitioned by the point cloud data transmission device in 2, 4, or 6 directions may be performed based on a data structure of the one-dimensional list type and/or a data structure of the tree type.

The operations of FIG. 27 represent the operations of determining adjacent slices around a slice and refining the same according to the embodiments in the refinement operation according to the embodiments illustrated in FIG. 22. For example, the operations illustrated in FIG. 27 represent a method of finding adjacent slices adjacent to slice N 22001 of FIG. 22 and refining the adjacent slices.

The operations of FIG. 27 may be performed by the refiner 17002 of FIG. 17, the data characteristics checker 16000 of FIG. 16, the data characteristic based partitioner & refiner 16001 of FIG. 16, or the space partitioner 15001 of FIG. 15.

The operations according to the partitioning method illustrated in FIG. 27 may be combined and performed by the transmission device 1000 of FIG. 1, the transmitter 10003 of FIG. 1, the point cloud video encoder 10002 of FIG. 1, the encoding 18001 of FIG. 2, the transmitter 18002 of FIG. 2, the encoder of FIG. 4, the transmission device of FIG. 12, the XR device 1430 of FIG. 14, or the like.

FIG. 27(A) illustrates a refinement operation performed based on a data structure of the one-dimensional list type.

For example, the transmission device sorts N slices, which are generated by partitioning the point cloud data, based on the number of points included in each slice. A sorted slice stores the adjacent slices positioned at the top, bottom, left, and right of the slice before the sorting as indexes. The transmission device performs the merging and splitting operations on the slices sorted by the number of points, starting with a slice having the smallest number of points. In this case, the transmission device checks the indexes of the slices positioned at the top, bottom, left, and right of a slice that can be merged, and performs the merging operation, starting with a slice having the smallest number of points among the four slices. If the points in the merged slice is still less than minPointNum, the transmission device merges the slice with a slice having the next smallest number of points among the 2/4/6 adjacent slices. When the number of points in a slice is greater than maxPointNum, the transmission device performs the splitting operation to a direction which is headed to the slice where smallest number of points is included.

For example, in FIG. 27(A), a data structure of the one-dimensional list type may be configured as shown in the right part of FIG. 27(A). The data structure of the one-dimensional list type may be constructed by distinguishing slices by rows and linking a slice corresponding to each row with adjacent slices. Each row may link the corresponding slice to adjacent slices in ascending order of the number of points. For example, slice 2 is positioned in row [2], and is adjacent to slices 0, 3 and 4. Since the number of points increases among the adjacent slices in order of slice 0 (10 points), slice 3 (30 points), and slice 4 (100 points), [0], [3], and [4] may be linked to row [2] in this order. Here, in the data structure, the first column (the part represented by [0] to [5]) may be referred to as a head, and the second column or the last column may be referred to as a node.

For example, referring to FIG. 27(A), the operation may be performed as follows.

The refinement operation may be performed on the slices in order, starting with slice 0. Slice 0 has 10 points, and is adjacent to slices 1 and 2, which are at the top and right side of slice 0, respectively. The refiner may determine whether to perform the merging operation on the adjacent slices (slices 1 and 2), staring with the slice having the smaller number of points between the adjacent slices. For example, the refiner may merge slice 0 with slice 1, which has a smaller number of points between slices 1 and 2. When the number of points in a slice formed by merging slice 0 with slice 1 is still less than minPointNum, the refiner may merge the merged slice with slice 2 again. In FIG. 27(A), it is assumed that minPointNum is 60, and the merged slice formed by merging slices 0 and 1 has 50 points. Accordingly, the refiner may merge the merged slice with slice 2 again, thereby forming a slice having 100 points. Since the number of points in the slices 0 to 2 merged with each other is 100, which is less than maxPointNum, the splitting operation is not performed. Accordingly, the refiner determines whether to perform the merging and splitting operations on the next slice (slice 3).

Slice 3 has 30 points. Accordingly, the refiner may merge the slice with a slice having the smallest number of points among the adjacent slices. Referring to the data structure, the merging operation may be performed on the adjacent slices in order of slice 1, slice 2, and slice 5. Slice 1, is a slice merged with slice 0 to 3, includes 100 points. Accordingly, slice 3 may be merged with slices 0 to 2, thereby having 130 points. The merged slice may be included as slices 0 to 2 or 3. Since the number of points of merged slices 0 to 3 is greater than maxPointNum, they may be split into two slices.

The number of points in slice 4 is greater than minPointNum and less than or equal to maxPointNum, and therefore slice 4 is not refined.

The number of points in slice 5, which is 180, is greater than maxPointNum, and therefore the refiner may split slice 5. The refiner may split slice 5 into two slices having 90 points toward, for example, slice 4.

FIG. 27(B) illustrates a refinement operation performed based on a data structure of the tree type.

When the refiner according to the embodiments performs a refinement operation based on a tree-type data structure, the refiner may be referred to as a tree-type refiner.

The tree-type refiner according to the embodiments may present position information about slices including point cloud data in a tree-type data structure. FIG. 27(B) shows an example of the data structure of the tree type.

For example, referring to FIG. 27(B), the data structure of the tree type may be configured as shown in the right part of FIG. 27(B). The data structure of the tree type indicates that (one or more) child nodes are adjacent slices of a parent node. For example, slice 0 is adjacent to slices 1 and 2. Accordingly, slice 0 may be a parent node, and slices 1 and 2 may be child nodes of slice 0. Furthermore, since slice 1 is adjacent to slice 3, the child node of slice 1 may be slice 3. Furthermore, since slice 2 is adjacent further to slice 4, the child node of the second slice may be slice 4. Furthermore, since slice 4 is adjacent further to slice 5, the child node of slice 4 may be slice 5. In other words, the refiner creates a tree-type data structure including tree-type adjacency information based on the indexes of the slices and the number of points in the slices.

The refiner may check the number of points by performing, for example, a depth-first search (DFS) on the completed tree.

For example, the refiner may perform the DFS to check whether the number of points in the slices is between minPointNum and maxPointNum, starting with slice 5, which is at the leaf node. For example, slice 5 has 150 points, and therefore the refiner splits slice 5 into two slices. For example, the refiner may split slice 5 to generate two or more slices. The two or more slices may be generated as child nodes of slice 4. Also, for example, the refiner may split slice 5 and incorporate (or redistribute) some of the points thereof into slice 4, which is a parent node, and distribute the remaining points to one or more slices to be generated as child nodes of slice 4.

The refiner performs the refinement operation on slice 4, which is the next sequence, using the DFS. If, in the process of refining slice 5, no part of the points in slice 5 is incorporated into slice 4, the number of points in slice 4 is 100. Therefore, the refinement operation is not performed (because the number of points is between minPointNum and maxPointNum).

The refiner determines whether to perform the refinement operation on slice 2, which is the next slice. The refinement operation is not performed on slice 2 (because the number of points in slice 2 is between minPointNum and maxPointNum).

The refiner determines whether to perform the refinement operation on slice 3, which is the next slice. Slice 3 has 30 points, and thus the merging operation is performed thereon (because the number of points is less than or equal to minPointNum). The refiner may generate a slice having 70 slices by merging slice 3 with slice 1, which is the parent node of slice 3. The slice generated by merging slices 1 and 3 may be a child node of slice 0. The refiner does not perform the splitting operation on the slice generated by merging slices 1 and 3.

The refiner determines whether to perform the refinement operation on slice 0, which is the next slice. Since slice 0 has 10 points, it is merged with a slice having a smaller number of points (i.e., the slice generated by merging slices 1 and 3) between the child nodes to generate a slice having 80 points.

According to the configuration described above, the point cloud data transmission device according to the embodiments may equally or appropriately distribute or determine the number of points in slices, thereby increasing the parallel encoding efficiency of the transmission device.

By performing the refinement operation based on the data structure described above, the point cloud data transmission device according to the embodiments may maximize memory efficiency and minimize unnecessary delays and errors in the refinement process.

In addition, according to the configuration described above, the number of points in slices may be set such that the number of points does not greatly vary among the slices, and accordingly the point cloud data reception device according to the embodiments may reduce a delay in encoding each slice independently.

Figure 28:
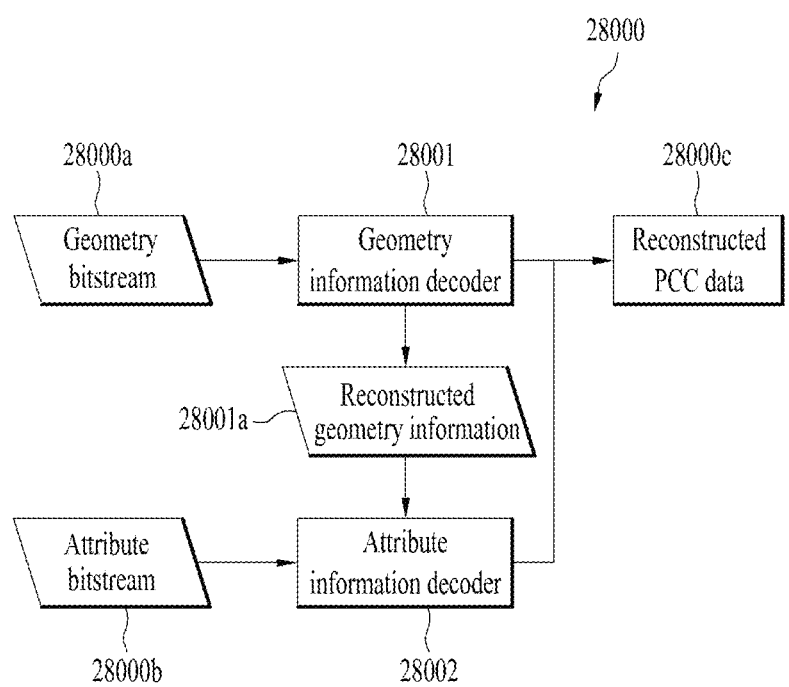
FIG. 28 shows an example of a point cloud data reception device according to embodiments.

FIG. 28 shows an example of a point cloud data reception device according to embodiments.

The operations for partitioning illustrated in FIG. 28 may be combined and performed by the reception device 10004 of FIG. 1, the receiving unit 10005 of FIG. 1, the point cloud video decoder 10006 of FIG. 1, the decoding 18003 of FIG. 2, the transmitter 18002 of FIG. 2, the decoders of FIGS. 10 and 11, the reception device of FIG. 13, the XR device 1430 of FIG. 14, and the like.

A point cloud reception device (or decoder) 28000 according to the embodiments may include a geometry information decoder 28001 and/or an attribute information decoder 28002. According to embodiments, the point cloud decoder may be referred to as a PCC decoding device, a PCC decoding unit, a point cloud device, a point cloud decoding unit, a PCC decoder, or the like.

The geometry information decoder 28001 receives a geometry information bitstream 28000a of point cloud data. The geometry information decoder 28001 may decode the geometry information bitstream 28000a of the point cloud data and output attribute information about the restored point cloud data 28000c. The geometry information decoder 28001 may reconstruct the geometry information bitstream into geometry information and output the reconstructed geometry information. The geometry information bitstream 28000a may be the geometry information bitstream or geometry bitstream of FIG. 15. The attribute information bitstream 28000b may be the attribute information bitstream or attribute bitstream of FIG. 15.

The geometry information decoder 28001 restores the geometry information by decoding the received geometry information bitstream. The restored geometry information may be input to the attribute information decoder. The attribute information decoder 28002 restores the attribute information from an attribute information bitstream input thereto and the restored geometry information received from the geometry information decoder. The restored geometry information may be the geometry reconstructed by the geometry reconstructor (Reconstruct geometry) 11003 described with reference to FIG. 11. The restored geometry information may be an octree occupancy code reconstructed by the occupancy code-based octree reconstruction processor 13003 described with reference to FIG. 13.

The geometry information decoder 28001 receives the geometry information bitstream received by the reception device according to the embodiments. The geometry information decoder 28001 may decode the geometry information bitstream.

The geometry information decoder 28001 may perform all/part of the operations of the point cloud video decoder of FIG. 1, the decoding 20003 of FIG. 2, the geometry decoder of FIG. 10, the arithmetic decoder 11000 of FIG. 11, the octree synthesizer 11001 of FIG. 11, the surface approximation synthesizer 11002 of FIG. 11, the geometry reconstructor 11003 of FIG. 11, and/or the coordinate inverse transformer 11004 of FIG. 11.

The attribute information decoder 28002 receives the attribute information bitstream 28000b of point cloud data. The attribute information decoder 28002 may decode the attribute information bitstream 28000b of the point cloud data and output attribute information about the restored point cloud data 28000c. The attribute information decoder 28002 may decode the attribute information bitstream based on the restored geometry information 28001a generated by the geometry information decoder 28001.

The attribute information decoder 28002 receives the attribute information bitstream received by the reception device according to the embodiments. The attribute information decoder may decode the attribute information in the attribute information bitstream based on the restored geometry information. The geometry information and/or attribute information contained in the point cloud data may be decoded and restored PCC data.

The attribute information decoder 28002 may perform all/part of the operation of the point cloud video decoder of FIG. 1, the operation of the decoding 20003 of FIG. 2, the operation of the attribute decoder of FIG. 10, the operations of the inverse quantizer 11006, the RAHT 11007, the LOD generator 11008, the inverse lifter 11009, and/or the color inverse transformer 11010 of FIG. 11, and the operations of the arithmetic decoder 13007, the inverse quantization processor 13008, the prediction/lifting/RAHT inverse transform processor 13009, the color inverse transform processor 13010, and/or the renderer 13011 of FIG. 13.

Figure 29:
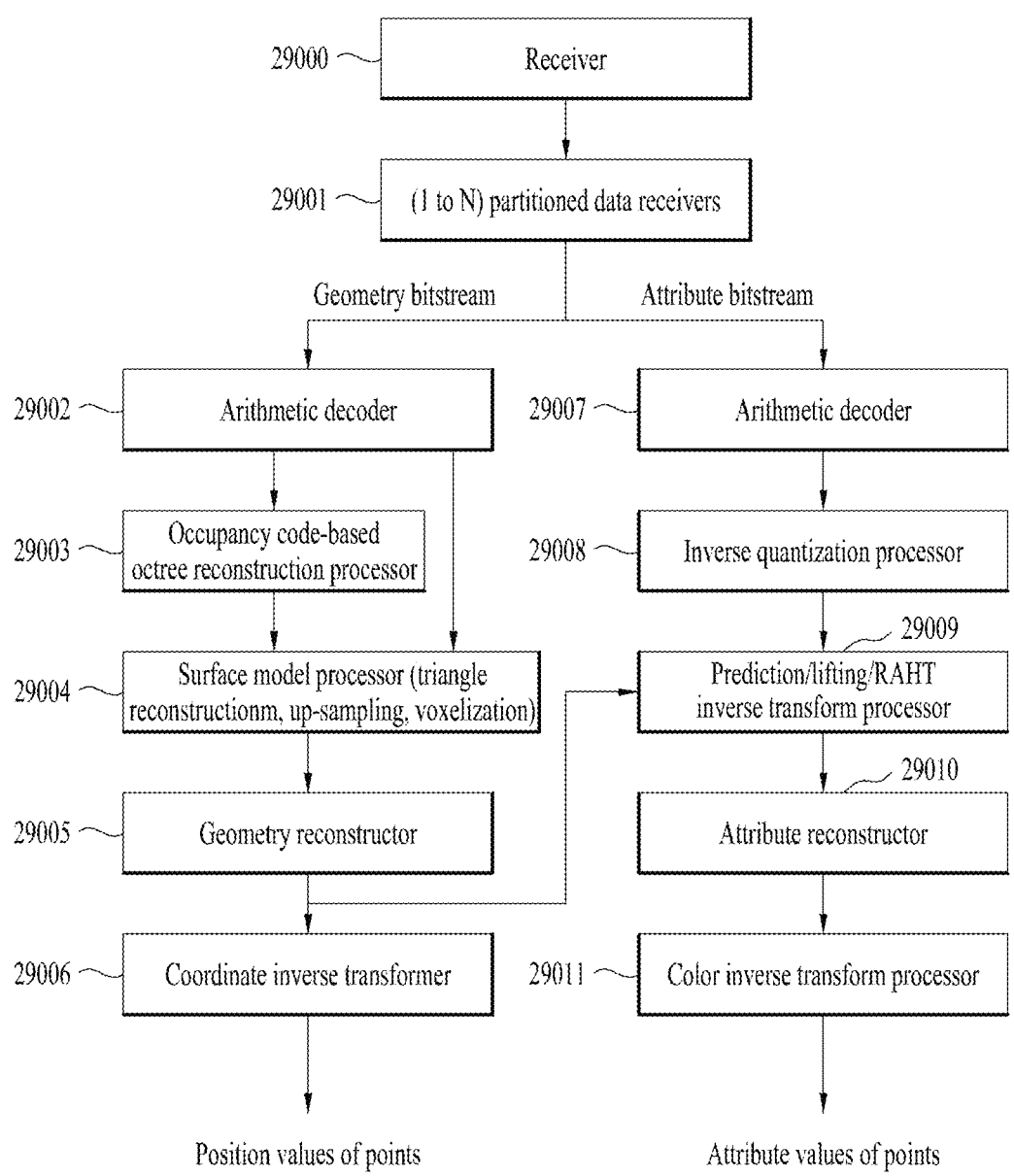
FIG. 29 shows a point cloud data reception device according to embodiments.

FIG. 29 illustrates a point cloud data reception device according to embodiments.

All or part of the operations of the point cloud data decoder according to the embodiments illustrated in FIG. 29 may be combined and performed by the reception device 10004 of FIG. 1, the receiver 10005 of FIG. 1, the point cloud video decoder 10006 of FIG. 1, the decoding 18003 of FIG. 2, the transmitter 18002 of FIG. 2, the decoders of FIGS. 10 and 11, the reception device of FIG. 13, the XR device 1430 of FIG. 14, or the like.

The point cloud decoder according to the embodiments of FIG. 29 may be the point cloud data decoder 28000 according to the embodiments of FIG. 28. The point cloud decoder according to the embodiments may include a receiver 29000, a partitioned data input unit 29001, a first arithmetic decoder 29002, an occupancy code-based octree reconstruction processor 29003, a surface model processor 29004, a geometry reconstructor 29005, a coordinate inverse transformer 29006, a second arithmetic decoder 29007, an inverse quantization processor 29008, a prediction/lifting/RAHT inverse transform processor 29009, an attribute reconstructor 29010, a color inverse transformer 29011, and/or a point combiner.

The operations of the components of the point cloud data decoder according to the embodiments shown in FIG. 29 may be performed on a brick-by-brick basis or may be independently performed on a brick-by-brick basis.

The receiver 29000 may receive a bitstream containing point cloud data according to embodiments. The receiver 29000 may transmit the received bitstream to the partitioned data input unit 29001. The receiver 29000 may perform the operations of the receiver 10007 of FIG. 1, the transmission 20002 of FIG. 2, and the receiver 13000 of FIG. 13.

The partitioned data input unit 29001 receives a bitstream containing point cloud data according to embodiments on a brick-by-brick basis, and outputs a geometry bitstream and an attribute bitstream of the point cloud data on the brick-by-brick basis to perform decoding on the brick-by-brick basis. The partitioned data input unit 29001 may transmit the geometric bitstream in a brick unit to the first arithmetic decoder 29002 and transmit the attribute bitstream in a brick unit to the second arithmetic decoder 29002.

When the bitstream received by the receiver 29000 contains signaling information (e.g., bistream_brick_decoding_flag) indicating that encoding has been performed on a brick-by-brick basis (or indicates that encoding has been performed on a brick-by-brick basis), the point cloud data reception device (the partitioned data input unit 29001) according to the embodiments may perform decoding on the received bitstream N times. The partitioned data input unit 29001 may perform the operations of the receiver 10007 of FIG. 1, the transmission 20002 of FIG. 2, and the reception processor 13001 of FIG. 13.

The first arithmetic decoder 29002 receives a geometry bitstream on a brick-by-brick basis. The first arithmetic decoder 29002 may decode the geometry bitstream. The first arithmetic decoder 29002 outputs the decoded geometry information.

The first arithmetic decoder 29002 may perform the operations of the point cloud video decoder 10006 of FIG. 1, the decoding 20003 of FIG. 2, the arithmetic decoder 11000 of FIG. 11, and the arithmetic decoder 13002 of FIG. 13.

The occupancy code-based octree reconstruction processor 29003 receives the decoded geometry information. The occupancy code-based octree reconstruction processor 29003 may reconstruct an occupancy-based octree based on the geometry bitstream in a brick unit. The occupancy code-based octree reconstruction processor 29003 may transmit the reconstructed octree to the surface model processor 29004.

The occupancy code-based octree reconstruction processor 29003 may perform the operations of the point cloud video decoder 10006 of FIG. 1, the decoding 20003 of FIG. 2, the octree analyzer 11001 of FIG. 11, and the occupancy code-based octree reconstruction processor 13003 of FIG. 13.

The surface model processor 29004 may perform surface model processing on the geometry information based on the geometry information decoded by the first arithmetic decoder 29002 and/or the octree reconstructed by the occupancy code-based octree reconstruction processor 29003. The surface model processing of the geometry information may include, for example, triangle reconstruction, up-sampling, and voxelization.

The surface model processor 29004 may perform the operations of the point cloud video decoder 10006 of FIG. 1, the decoding 20003 of FIG. 2, the surface approximation analyzer 11002 of FIG. 11, and the surface model processor 13004 of FIG. 13.

The geometry reconstructor 29005 receives the geometry information processed by the surface model processor 29004. The geometry reconstructor reconstructs the surface model-processed geometry information. The geometry reconstructor 29005 may transmit the reconstructed geometry information to the prediction/lifting/RAHT inverse transform processor 29009 and/or the coordinate inverse transformer 29006.

The geometry reconstructor 29005 may perform the operations of the point cloud video decoder 10006 of FIG. 1, the decoding 20003 of FIG. 2, and the geometry reconstructor 11003 of FIG. 11.

The coordinate inverse transformer 29006 inversely transforms the coordinate information about the geometry information generated by the geometry reconstructor 29005. The coordinate inverse transformer 29006 inversely transforms the geometry information and outputs position information about the points of the point cloud data. The coordinate inverse transformer 29006 may transmit the position information about the points to the point combiner 29012.

The coordinate inverse transformer 29006 may transmit information indicating that geometry decoding has been performed on bricks corresponding to the points to the partitioned data input unit 29001.

The coordinate inverse transformer 29006 may perform the operations of the point cloud video decoder 10006 of FIG. 1, the decoding 20003 of FIG. 2, and the coordinate inverse transformer 11004 of FIG. 11.

The second arithmetic decoder 29007 receives a geometry bitstream on a brick-by-brick basis. The second arithmetic decoder 29007 may decode the attribute bitstream. The second arithmetic decoder 29007 outputs the decoded attribute information.

The second arithmetic decoder 29007 may perform the operations of the point cloud video decoder 10006 of FIG. 1, the decoding 20003 of FIG. 2, the arithmetic decoding 11005 of FIG. 11, and the arithmetic decoder 13007 of FIG. 13.

The inverse quantization processor 29008 receives the decoded attribute information generated by the second arithmetic decoder 29007. The inverse quantization processor 29008 inversely quantizes the received decoded attribute information. The inverse quantization processor 29008 may output inversely quantized attribute information and transmit the inversely quantized attribute information to the prediction/lifting/RAHT inverse transform processor 29009.

The inverse quantization processor 29008 may perform the operations of the point cloud video decoder 10006 of FIG. 1, the decoding 20003 of FIG. 2, the inverse quantizer 11006 of FIG. 11, and the arithmetic decoder 13007 of FIG. 13.

The prediction/lifting/RAHT inverse transform processor 29009 receives the geometry information inversely quantized by the inverse quantization processor 29008, and inversely transforms the same. The prediction/lifting/RAHT inverse transform processor 29009 may inversely transform the inversely quantized attribute information based on at least one of a prediction method, a lifting method, and a RAHT method. The prediction/lifting/RAHT inverse transform processor 29009 may inversely transform the attribute information based on the geometry information (or restored geometry information) reconstructed by the geometry reconstructor 29005.

The prediction/lifting/RAHT inverse transform processor 29009 may perform the operations of the point cloud video decoder 10006 of FIG. 1, the decoding 20003 of FIG. 2, the RAHT 11007 of FIG. 11, the LOD generator 11008 of FIG. 11, and the inverse lifter 11009 of FIG. 11.

The attribute reconstructor 29010 reconstructs the attribute information based on the attribute information inversely transformed by the prediction/lifting/RAHT inverse transform processor 29009. The attribute reconstructor outputs the reconstructed attribute information and transmits the same to the color inverse transform processor 29011.

The attribute reconstructor 29010 may perform the operations of the point cloud video decoder 10006 of FIG. 1, the decoding 20003 of FIG. 2, the color inverse transformer 11010 of FIG. 11, and the color inverse transform processor 13010 of FIG. 13.

The color inverse transformer 29011 receives the geometry information reconstructed by the attribute reconstructor 29010. The color inverse transformer 29011 may perform inverse color transform on the reconstructed geometry information. The color inverse transformer 29011 outputs the attribute information about the points of the point cloud data.

The color inverse transformer 29006 may transmit, to the partitioned data input unit 29001, information indicating that attribute decoding has been performed on bricks corresponding to the points. The attribute reconfiguration unit 29010 may perform the operations of the point cloud video decoder 10006 of FIG. 1, the decoding 20003 of FIG. 2, the color inverse transformer 11010 of FIG. 11, and the color inverse transform processor 13010 of FIG. 13.

The point combiner receives the geometry information (position information) about the points of the point cloud data and/or the attribute information about the points according to embodiments. The point combiner receives the geometry information (position information) about the points of the point cloud data and/or the attribute information about the points in a brick unit, and combines the same on a brick-by-brick basis. The point combiner outputs the point cloud data in a brick unit containing the position information and attribute information about the points.

Figure 30:
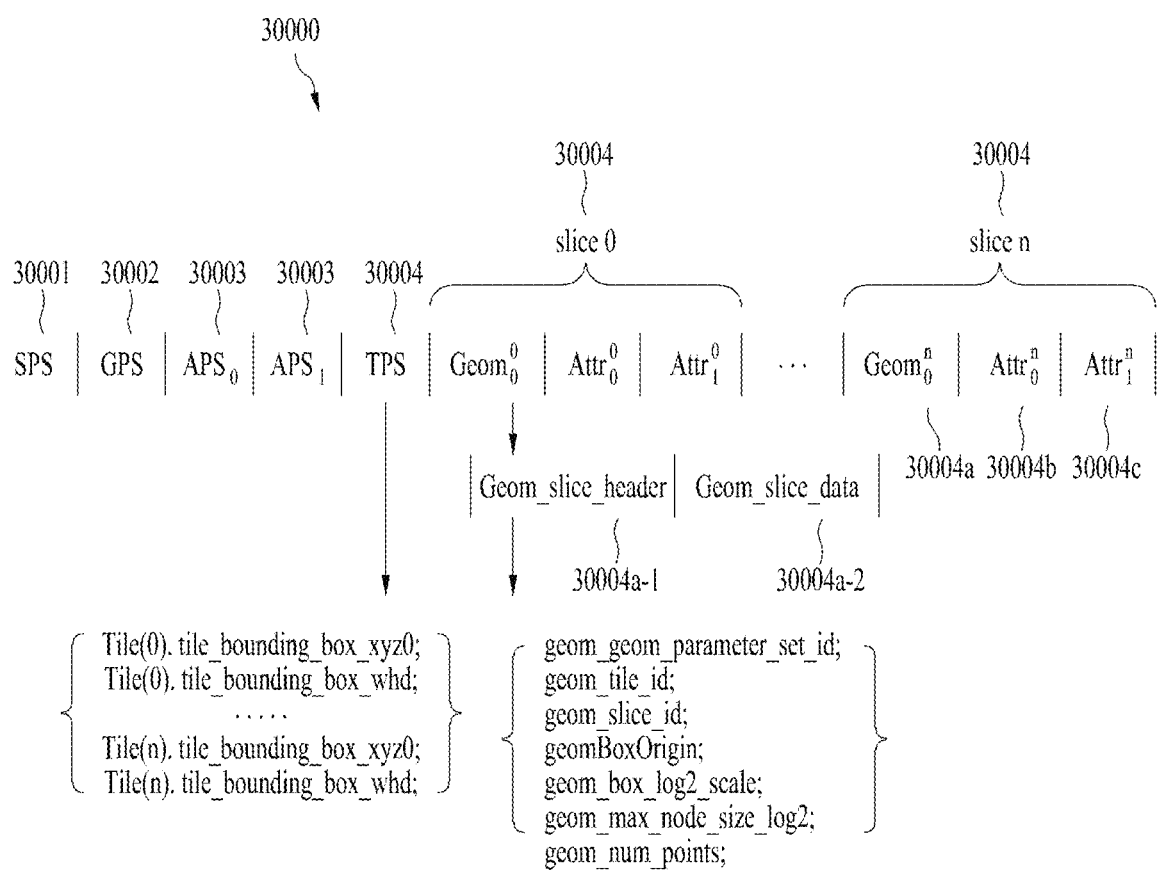
FIG. 30 illustrates an example of a bitstream structure of point cloud data according to embodiments.

FIG. 30 illustrates an example of a bitstream structure of point cloud data according to embodiments.

FIG. 30 illustrates an example of a bitstream structure 30000 of point cloud data according to embodiments. The bitstream structure 30000 of the point cloud data illustrated in FIG. 30 may be generated by the transmitter 10003 of FIG. 1, the transmitter 18002 of FIG. 2, the transmission processor 12012 of FIG. 12, the bitstream combiner 16014 of FIG. 16, and the bitstream combiner 17000 of FIG. 17.

The transmission device according to the embodiments may signal filtering information to add/implement a partitioner and a refiner.

Parameters (which may be referred to as metadata, signaling information, or the like) according to embodiments may be generated in the process of a transmitter according to embodiments, which will be described later, and be transmitted to a receiver according to embodiments so as to be used in a reconstruction process.

For example, the parameters according to the embodiments may be generated by a metadata processor (or metadata generator) of a transmission device according to embodiments, which will be described later, and may be obtained by a metadata parser of a reception device according to embodiments.

The bitstream structure 30000 of the point cloud data illustrated in FIG. 30 may be a bitstream received by the receiver 10005 of FIG. 1, the decoder 18003 of FIG. 2, the receiver 13000 of FIG. 13, and the receiver 29000 of FIG. 29 in the reception device according to the embodiments. The bitstream structure 30000 of the point cloud data illustrated in FIG. 30 may be the geometry and attribute bitstream 36001 for each slice of FIG. 36.

A part of the entirety of the bitstream structure 30000 according to the embodiments illustrated in FIG. 30 may be generated by the XR device 1430 of FIG. 14. The bricks illustrated in this figure may correspond to slices, and vice versa. In this document, a brick may be referred to as a slice.

The point cloud data transmission device according to the embodiments may transmit the bitstream 30000 having the bitstream structure illustrated in FIG. 30. The bitstream 30000 of the point cloud data may contain a sequential parameter set (SPS) 30001, a geometry parameter set (GPS) 30002, an attribute parameter set (APS) 30003, a tile parameter set (TPS) 30004, and one or more slices (slice 0, slice 1, . . . , slice n) 30004. The bitstream 30000 of the point cloud data may contain one or more tiles. A tile according to embodiments may be a group of slices including one or more slices. The bitstream 30000 according to the embodiments provides the tiles or slices such that the point cloud data may be partitioned and processed by regions. Each region of the bitstream 30000 according to the embodiments may have a different importance. Accordingly, when the point cloud data is partitioned into tiles, different filters (encoding methods) and different filter units may be applied to the respective tiles. When the point cloud is partitioned into slices, different filters and different filter units may be applied to the respective slices.

By transmitting the point cloud data according to the structure of the bitstream 30000 illustrated in FIG. 30, the point cloud data transmission device according to the embodiments may allow the encoding operation to be applied differently according to the importance, and allow a good-quality encoding method to be used in an important region.

The point cloud data reception device according to the embodiments may be allowed to apply different filtering (decoding methods) to the respective regions (partitioned into tiles or partitioned into slices) according to the processing capacity of the reception device, rather than using a complex decoding (filtering) method to the entire point cloud data. Thereby, a better image quality may be ensured for regions important to the user and appropriate latency may be ensured in the system.

The SPS 30001 is a syntax structure containing syntax elements that apply to zero or more entire CVSs as determined by the content of a syntax element found in the PPS referred to by a syntax element found in each slice segment header. The SPS may include sequence information about the point cloud data bitstream according to the embodiments.

The GPS 30002 may be a syntax structure containing syntax elements that apply to zero or more entire geometry (or encoded geometry). The GPS 30002 according to embodiments may include information about a method of encoding attribute information of the point cloud data contained in the one or more slices 30004. The GPS 30002 may include SPS identifier information indicating the SPS 30001 to which the included geometry parameter is related according to embodiments, and GPS identifier information for identifying the GPS.

The APS 30003 may be a syntax structure containing syntax elements that apply to zero or more entire attributes (or encoded attributes). The APS 30003 according to the embodiments may include information about a method of encoding attribute information of the point cloud data contained in the one or more slices 30004. The APS 30003 may include SPS identifier information indicating the SPS 30001 to which the included geometry parameter is related according to embodiments, and APS identifier information for identifying the APS.

The TPS 30004 may be a syntax structure containing syntax elements that apply to zero or more entire tiles (or encoded tiles). A tile inventory includes information about zero or more tiles contained in the point cloud data bitstream according to the embodiments. The tile inventory may be referred to as a tile parameter set (TPS) according to embodiments.

The TPS 30004 may include identifier information for identifying one or more tiles and information indicating a range of the one or more tiles (i.e., a bounding box of the tiles). The information indicating the range of the one or more tiles (i.e., a bounding box of the tiles) may include coordinate information about a point that is a reference of a bounding box represented by a corresponding tile (e.g., Tile(n).tile_bounding_box_xyz0) and information about the width, height, and depth of the bounding box (e.g., Tile(n).tile_bounding_box_whd). When a plurality of tiles is given, the tile inventory 33004 may include information indicating a bounding box for each of the tiles. For example, when each tile is indicated as 0 to n by the identifier information for the tiles, the information indicating the bounding box of each tile may be expressed as Tile(0).tile_bounding_box_xyz0, Tile(0).tile_bounding_box_whd, Tile(1).tile_bounding_box_xyz0, Tile(1).tile_bounding_box_whd, and so on.

The slice 30004 may be a unit for encoding point cloud data by a point cloud data transmission device according to embodiments. The slice 30004 according to the embodiments may be a unit including one geometry bitstream (Geom00) 30004*a* and one or more attribute bitstreams (Attr00, Attr10) 30004*b*.

The slice 30004 may include a geometry slice (Geom) 30004*a* representing geometry information about the point cloud data contained in the slice, and one or more attribute slices (Attr) 30004*b* and 30004*c* representing attribute information about the point cloud data contained in the slice.

The geometry slice (Geom) 30004*a* includes geometry slice data (Geom_slice_data) 30004*a*-2 containing geometry information about the point cloud data, and a geometry slice header (GSH) (Geom_slice_header) 30004*a*-1 containing information about the geometry slice data.

The GSH 30004*a*-1 contains information about the geometry slice data 30004*a*-2 in the slice. For example, the GSH 30004*a*-1 may contain a geometry parameter set identifier (geom_geom_parameter_set_id) for identifying the GPS 30002 representing the geometry information about the slice, and a geometry slice identifier (geom_slice_id) for identifying the geometry slice, geometry box origin information (geomBoxOrigin) indicating the origin of the box of the geometry slice data, information (geom_box_log2_scale) indicating a logarithmic scale of the geometry slice, and information (geom_num_points) related to the number of points in the geometry slice.

When the point cloud data bitstream according to the embodiments contains one or more tiles, the header of the geometry bitstream according to the embodiments may further contain information (geom_tile_id) for identifying a tile including the geometry bitstream.

The attribute slice (Attr) 30004*b*, 30004*c* includes attribute slice data (Attr_slice_data) containing attribute information about the point cloud data and an attribute slice header (ASH, Attr_slice_header) 33005*c* containing information about the attribute slice data.

According to embodiments, parameters needed to encode a point cloud may be newly defined as a parameter set and header information for the point cloud. For example, the parameters may be added to attribute parameter set RBSP syntax in encoding attribute information, and be added to tile_header syntax in performing tile-based encoding.

According to embodiments, the transmission device may generate a different slice configuration header unit for each tile or each slice in order to signal the configuration of an overlapping slice according to the embodiments.

As the point cloud data transmission/reception method according to the embodiments provides the above-described bitstream structure, it may increase the decoding performance of the receiver for the attribute information for the point cloud data.

FIG. 31 illustrates an example of a sequence parameter set (SPS) in a bitstream according to embodiments.

The parameters shown in FIG. 31 may be included in the SPS illustrated in FIG. 30. The SPS according to the embodiments may contain signaling information related to a method of partitioning of a slice (slice partitioning) or slice tiling according to the embodiments, and/or related signaling information.

profile_idc may indicate a profile to which the bitstream conforms as specified in Annex A. Bitstreams shall not contain values of profile_idc other than those specified in Annex A. Other values of profile_idc may be reserved for future use by ISO/IEC.

profile_compatibility_flags equal to 1 may indicate that the bitstream conforms to the profile indicated by profile_idc equal to j as specified in Annex A. The value of profile_compatibility_flag[j] may be equal to 0 for any value of j that is not specified as an allowed value of profile_idc in Annex A.

level_idc indicates a level to which the bitstream conforms as specified in Annex A. Bitstreams may not contain values of level_idc other than those specified in Annex A. Other values of level_idc are reserved for future use by ISO/IEC.

sps_bounding_box_present_flag equal to 1 may specify that the bounding box offset and size information is signaled.

When the value of sps_bounding_box_present_flag is 'true', the SPS according to the embodiments further includes sps_bounding_box_offset_x, sps_bounding_box_offset_y, sps_bounding_box_offset_z, sps_bounding_box_scale_factor, sps_bounding_box_size_width, sps_bounding_box_size_height, and sps_bounding_box_size_depth.

sps_bounding_box_offset_x indicates the x offset of the source bounding box in the Cartesian coordinates. When not present, the value of sps_bounding_box_offset_x may be inferred to be 0.

sps_bounding_box_offset_y indicates the y offset of the source bounding box in the Cartesian coordinates. When not present, the value of sps_bounding_box_offset_y may be inferred to be 0.

sps_bounding_box_offset_z indicates the z offset of the source bounding box in the Cartesian coordinates. When not present, the value of sps_bounding_box_offset_z may be inferred to be 0.

sps_bounding_box_scale_factor indicates the scale factor the source bounding box in the Cartesian coordinates. When not present, the value of sps_bounding_box_scale_factor may be inferred to be 1. When not present, the value of sps_bounding_box_scale_factor may be inferred to be 0.

sps_bounding_box_size_width indicates the width of the source bounding box in the Cartesian coordinates. When not present, the value of sps_bounding_box_size_width may be inferred to be a specific value such as 10.

sps_bounding_box_size_height indicates the height of the source bounding box in the Cartesian coordinates. When not present, the value of sps_bounding_box_size_height may be inferred to be 1. When not present, the value of sps_bounding_box_size_height may be inferred to be 0.

sps_bounding_box_size_depth indicates the depth of the source bounding box in the Cartesian coordinates. When not present, the value of sps_bounding_box_size_depth may be inferred to be 1. When not present, the value of sps_bounding_box_size_depth may be inferred to be 0.

sps_source_scale_factor indicates the scale factor of the source point cloud.

sps_seq_parameter_set_id provides an identifier for the SPS for reference by other syntax elements. The value of sps_seq_parameter_set_id may be in the range of 0 to 15, inclusive in bitstreams conforming to the version of this Specification. The value other than 0 for sps_seq_parameter_set_id may be reserved for future use by ISO/IEC.

sps_num_attribute_sets indicates the number of coded attributes in the bitstream. The value of sps_num_attribute_sets may be in the range of 0 to 64.

According to embodiments, the SPS may include attribute_dimension[i], attribute_instance_id[i], attribute_bitdepth[i], attribute_cicp_colour_primaries[i], attribute_cicp_transfer_characteristics [i], attribute_cicp_matrix_coeffs [i], attribute_cicp_video_full_range_flag[i], and/or known_attribute_label_flag[i] as many as sps_num_attribute_sets.

attribute_dimension[i] specifies the number of components of the i-th attribute.

attribute_instance_id[i] specifies attribute instance id.

attribute_bitdepth[i] specifies the bitdepth of the i-th attribute signal(s).

attribute_cicp_colour_primaries[i] indicates the chromaticity coordinates of the color attribute source primaries.

attribute_cicp_transfer_characteristic[i] may either indicate the reference opto-electronic transfer characteristic function of the colour attribute as a function of a source input linear optical intensity Lc with a nominal real-valued range of 0 to 1 or indicate the inverse of the reference electro-optical transfer characteristic function as a function of an output linear optical intensity Lo with a nominal real-valued range of 0 to 1.

attribute_cicp_matrix_coeffs[i] describes the matrix coefficients used in deriving luma and chroma signals from the green, blue, and red, or Y, Z, and X primaries.

attribute_cicp_video_full_range_flag[i] specifies the black level and range of the luma and chroma signals as derived from E'Y, E'PB, and E'PR or E'R, E'G, and E'B real-valued component signals.

known_attribute_label[i] equal to 0 specifies that the attribute is color. known_attribute_label[i] equal to 1 specifies that the attribute is reflectance. known_attribute_label[i] equal to 2 specifies that the attribute is frame index.

According to embodiments, the SPS may further include partitioning_enabling_flag.

partitioning_enabling_flag represents information indicating whether to perform the slice partitioning operation according to the embodiments. For example, partitioning_enabling_flag equal to 0 indicates that the point cloud data transmission device does not partition the point cloud data according to the embodiments into one or more slices. partitioning_enabling_flag equal to 1 indicates that the point cloud data transmission device partitions the point cloud data into one or more slices.

When the value of the partitioning enable flag is 1, the SPS according to embodiments may further include Partitioning_method.

Partitioning_method is information indicating a method of partitioning point cloud data by the point cloud data transmission device according to the embodiments.

For example, when Partitioning_method is equal to 0, the parameter indicates that the transmission device performs the partitioning operation based on Timestamp_partitioning_method (slice partitioning based on the time attribute) according to embodiments. As the partitioning method, one or more partitioning methods may be used (partitioning methods used for respective slices are signaled).

For example, when Partitioning_method is equal to 1, the parameter indicates that the transmission device performs slice partitioning based on Morton_order_partitioning_method (slice partitioning based on Morton order).

For example, when Partitioning_method is equal to 2, the parameter indicates that the transmission device performs slice partitioning based on Uniform_square_partitioning_method (uniform square partitioning).

For example, Partitioning_method equal to 3 indicates that partitioning is performed according to another slice partitioning method illustrated in FIGS. 18 to 27.

refine_slice_method_flag is information indicating whether the point cloud data transmission device according to the embodiments is to refine partitioned slices. For example, refine_slice_method_flag equal to 0 indicates that the transmission device does not perform the refinement operation according to the embodiments on the slices. For example, refine_slice_method_flag equal to 1 indicates that the transmission device performs the refinement operation according to embodiments on the slices.

For example, when the value of refine_slice_method_flag is 1, the SPS according to the embodiments may further include refine_method.

The refine_method is information indicating in a method (or type) of refinement of partitioned slices to be performed by the transmission device. For example, refine_method equal to 0 (or a first value) may indicate that the transmission device uses the method of list-based slice refinement according to the embodiments (list_refine_method: Use the method of list-based slice refinement). For example, refine_method equal to 1 (or a second value) may indicate that the transmission device uses the method of tree-based slice refinement according to the embodiments (tree_refine_method: Use the method of tree-based slice refinement).

The information of refine_method_condition indicates whether the refining method to be performed by the transmission device is the distance-based refinement, the 2/4/6-way refinement, and/or another refining method.

For example, when the value of refine_method_condition is 0, the parameter indicates that the transmission device uses the distance-based refinement (distance_refine_method) according to the embodiments. When the value of refine_method_condition is 0, the TPS may further include distance_point_to_point_location.

For example, when the value of refine_method_condition is 1, the parameter indicates that the transmission device uses the method of the 2/4/6-way refinement based on neighboring slices according to the embodiments (distance_refine_method). When the value of refine_method_condition is 1, the TPS may further include neighbours_order_to_merge (2way_neighbour_refine_mehod).

For example, when the value of refine_method_condition information is 2, the parameter indicates that the transmission device uses other refinement methods.

distance_point_to_point_location indicates a reference for measuring the distance of each slice when the transmission device according to the embodiments performs the refinement using the distance-based refinement method.

For example, based on distance_point_to_point_location, the transmission device may use the nearest slice in the bounding box, a slice at a distance corresponding to the median value, or the farthest slice as a reference for distance measurement.

distance_point_to_point_location equal to 0 indicates that the transmission device uses the nearest slice among the slices as a reference for distance measurement. distance_point_to_point_location equal to 1 indicates that the transmission device uses a slice at a distance corresponding to the median value among the slices as a reference for distance measurement. distance_point_to_point_location equal to 2 indicates that the transmission device uses the farthest slice among the slices as a reference for distance measurement.

neighbours_order_to_merge may indicate the merging operation and/or splitting operation performed on 2/4/6 adjacent slices (the top adjacent slice, the bottom adjacent slice, the left adjacent slice, and the right adjacent slice around a specific slice) in order defined as exemplarily described below.

neighbors_order_to_merge equal to 0 indicates that the slice including the smallest number of points among the slices adjacent to the specific slice is first merged and/or split. neighbors_order_to_merge equal to 1 indicates that the slice including the largest number of points among the slices adjacent to the specific slice is first merged and/or split. neighbors_order_to_merge equal to 2 indicates that a separately defined slice among the slices adjacent to the specific slice is first merged and/or split.

sps_extension_present_flag equal to 1 specifies that the sps_extension_data syntax structure is present in the SPS RBSP syntax structure. sps_extension_present_flag equal to 0 specifies that this syntax structure is not present. When not present, the value of sps_extension_present_flag may be inferred to be equal to 0.

sps_extension_data_flag may have any value. Its presence and value do not affect decoder conformance to profiles specified in Annex A Decoders conforming to a profile specified in Annex A.

The SPS according to the embodiments may further include sequential_input_slice_configuration_in_tile_flag, overlapping_slice_compose_flag, and overlapping_slice_compose_method[i].

FIG. 32 illustrates an example of a tile parameter set (TPS) in a bitstream according to embodiments.

The parameters shown in FIG. 32 may be included in the TPS described with reference to FIG. 30. The TPS according to the embodiments may include signaling information related to a slice partitioning or slice tiling method according to the embodiments, and/or related signaling information.

num_tiles represents the number of tiles signaled for the bitstream. When not present, num_tiles may be inferred to be 0.

The TPS according to the embodiments may include the following pieces of signaling information as many as a value indicated by num_tiles.

tile_bounding_box_offset_x[i] indicates the x offset of the i-th tile in the Cartesian coordinates. When not present, the value of tile_bounding_box_offset_x[0] may be inferred to be sps_bounding_box_offset_x.

tile_bounding_box_offset_y[i] indicates the y offset of the i-th tile in the Cartesian coordinates. When not present, the value of tile_bounding_box_offset_y[0] may be inferred to be sps_bounding_box_offset_y.

tile_bounding_box_offset_z[i] indicates the z offset of the i-th tile in the Cartesian coordinates. When not present, the value of tile_bounding_box_offset_z[0] may be inferred to be sps_bounding_box_offset_z.

tile_bounding_box_scale_factor[i] indicates the scale factor related to the i-th tile in the Cartesian coordinates. When not present, the value of tile_bounding_box_scale_factor[0] may be inferred to be sps_bounding_box_scale_factor.

tile_bounding_box_size_width[i] indicates the width of the i-th tile in the Cartesian coordinates. When not present, the value of tile_bounding_box_size_width[0] may be inferred to be sps_bounding_box_size_width.

tile_bounding_box_size_height[i] indicates the height of the i-th tile in the Cartesian coordinates. When not present, the value of tile_bounding_box_size_height[0] may be inferred to be sps_bounding_box_size_height.

tile_bounding_box_size_depth[i] indicates the depth of the i-th tile in the Cartesian coordinates. When not present, the value of tile_bounding_box_size_depth[0] may be inferred to be sps_bounding_box_size_depth.

The TPS according to the embodiments may include partitioning_enable_flag.

partitioning_enabling_flag may be a parameter indicating the same operation as partitioning_enabling_flag included in the SPS described with reference to FIG. 31. When the value of the partitioning enable flag is 1, the TPS according to the embodiments may further include information of Partitioning_method.

Partitioning_method may be a parameter indicating the same operation as Partitioning_method included in the SPS described with reference to FIG. 31.

refine_slice_method_flag may be a parameter indicating the same operation as refine_slice_method_flag included in the SPS described with reference to FIG. 31. For example, when the value of refine_slice_method_flag is 1, the TPS according to the embodiments may further include information of refine_method.

refine_method may be a parameter indicating the same operation as refine_method included in the SPS described with reference to FIG. 31.

refine_method_condition may be a parameter indicating the same operation as refine_method_condition included in the SPS described with reference to FIG. 31.

For example, when the value of refine_method_condition is 0, this parameter indicates that the transmission device uses the distance-based refinement (distance_refine_method) according to embodiments. When the value of refine_method_condition is 0, the TPS may further include information of distance_point_to_point_location.

For example, when the value of refine_method_condition is 1, the parameter indicates that the transmission device uses the method of 2-way/4-way/6-way refinement based on neighboring slices according to the embodiments. When the value of refine_method_condition is 1, the TPS may further include information of neighbours_order_to_merge.

distance_point_to_point_location and neighbours_order_to_merge may be parameters indicating the same operations as distance_point_to_point_location and neighbours_order_to_merge included in the SPS described with reference to FIG. 31.

FIG. 33 illustrates an example of a geometry parameter set (GPS) in a bitstream according to embodiments.

The parameters shown in FIG. 33 may be included in the GPS described with reference to FIG. 30. The GPS according to the embodiments may include signaling information related to a slice partitioning or slice tiling method according to the embodiments, and/or related signaling information.

gps_geom_parameter_set_id provides an identifier for the GPS for reference by other syntax elements. The value of gps_seq_parameter_set_id may be in the range of 0 to 15, inclusive.

gps_seq_parameter_set_id specifies the value of sps_seq_parameter_set_id for the active SPS. The value of gps_seq_parameter_set_id may be in the range of 0 to 15, inclusive.

gps_box_present_flag equal to 1 equal to 1 specifies that additional bounding box information is provided in a geometry header that references the current GPS. gps_ bounding_box_present_flag equal to 0 specifies that additional bounding box information is not signaled in the geometry header.

unique_geometry_points_flag equal to 1 indicates that all output points have unique positions. unique_geometry_points_flag equal to 0 indicates that the output points may have same positions.

neighbour_context_restriction_flag equal to 0 indicates that octree occupancy coding uses contexts determined from six neighboring parent nodes. neighbour_context_restriction_flag equal to 1 indicates that octree coding uses contexts determined from sibling nodes only inferred_direct_coding_mode_enabled_flag equal to 0 indicates that the octree coding uses inferred_direct_coding_mode. inferred_direct_coding_mode_enabled_flag equal to 1 indicates the octree coding uses multiple contexts determined from sibling neighboring nodes.

log2_neighbour_avail_boundary specifies the value of the variable NeighbAvailBoundary that is used in the decoding process as follows:

NeighbAvailBoundary=2
log2_neighbour_avail_boundary.

log2_trisoup_node_size specifies the variable TrisoupNodeSize as the size of the triangle nodes as follows.

TrisoupNodeSize=2 log2_trisoup_node_size

The value of log2_trisoup_node_size may be greater than or equal to 0. When log2_trisoup_node_size is equal to 0, the geometry bitstream may include only the octree coding syntax.

The TPS according to the embodiments may include partitioning_enable_flag.

partitioning_enabling_flag may be a parameter indicating the same operation as partitioning_enabling_flag included in the SPS described with reference to FIG. 31. When the value of partitioning_enabling_flag is 1, the GPS according to embodiments may further include information of Partitioning_method.

Partitioning_method may be a parameter indicating the same operation as Partitioning_method included in the SPS described with reference to FIG. 31.

refine_slice_method_flag may be a parameter indicating the same operation as refine_slice_method_flag included in the SPS described with reference to FIG. 31. For example, when the value of refine_slice_method_flag is 1, the GPS according to the embodiments may further include information of refine_method.

refine_method may be a parameter indicating the same operation as refine_method included in the SPS described with reference to FIG. 31.

refine_method_condition may be a parameter indicating the same operation as refine_method_condition included in the SPS described with reference to FIG. 31.

For example, when the value of refine_method_condition information is 0, this parameter indicates that the transmission device uses the method of distance-based refinement (distance_refine_method) according to the embodiments. When the value of refine_method_condition information is 0, the TPS may further include information of distance_point_to_point_location.

For example, when the value of refine_method_condition is 1, the parameter indicates that the transmission device uses the method of 2-way/4-way/6-way refinement based on neighboring slices according to the embodiments. When the value of refine_method_condition is 1, the TPS may further include information of neighbours_order_to_merge.

distance_point_to_point_location and neighbours_order_to_merge may be parameters indicating the same operations as distance_point_to_point_location and neighbours_order_to_merge included in the SPS described with reference to FIG. 31.

gps_extension_present_flag equal to 1 specifies that the gps_extension_data syntax structure is present in the GPS RBSP syntax structure. gps_extension_present_flag equal to 0 specifies that this syntax structure is not present. When not present, the value of gps_extension_present_flag is inferred to be equal to 0.

gps_extension_data_flag may have any value. Its presence and value do not affect decoder conformance to specified profiles.

FIG. 34 illustrates an example of an SPS in a bitstream according to embodiments.

The parameters shown in FIG. 34 may be included in the SPS described with reference to FIG. 30. The SPS according to the embodiments may include, signaling information related to a slice partitioning or slice tiling method, and/or related signaling information.

The SPS according to the embodiments may profile_idc, profile_compatibility_flags, level_idc, sps_bounding_box_present_flag, sps_bounding_box_offset_x, sps_bounding_box_offset_y, sps_bounding_box_offset_z, sps_bounding_box_scale_factor, sps_bounding_box_size_width, sps_bounding_box_size_height, sps_bounding_box_size_depth, sps_source_scale_factor, sps_seq_parameter_set_id, sps_num_attribute_sets, attribute_dimension [i], attribute_instance_id[i], attribute_bitdepth[i], attribute_cicp_colour_primaries[i], attribute_cicp_transfer_characteristics [i], attribute_cicp_matrix_coeffs [i], attribute_cicp_video_full_range_flag[i], known_attribute_label [i], partitioning_enabling_flag, Partitioning_method, refine_slice_method_flag, refine_method, refine_method_condition, distance_point_to_point_location, neighbours_order_to_merge, sps_extension_present_flag, and/or sps_extension_data_flag described with reference to FIG. 31. For the definition of the elements of FIG. 34 included in FIG. 31, reference may be made to the description of FIG. 31.

When the value of refine_method_condition is 1, the SPS according to the embodiments may further include information of neighbor_num and/or information of neighbor_search_method.

The transmission device (refiner) according to the embodiments signals the number of slices adjacent to a slice through neighbor_num. For example, in the case of the 2-way refining method, the value of neighbor_num may be 2 for a specific slice.

neighbor_search_method indicates the direction of selection of adjacent neighbor slices when the transmission device performs the refinement operation based on N (2-way/4-way/6-way) slices.

FIG. 35 illustrates an example of a TPS in a bitstream according to embodiments.

The parameters shown in FIG. 35 may be included in the TPS described with reference to FIG. 30. The TPS according to the embodiments may include signaling information related to a slice partitioning or slice tiling method) according to the embodiments, and/or related signaling information.

The TPS according to the embodiments may include information such as num_tiles, tile_bounding_box_offset_x [i], tile_bounding_box_offset_y[i], tile_bounding_box_offset_z[i], tile_bounding_box_scale_factor 1, tile_bounding_box_size_width[i], tile_bounding_box_size_height[i], tile_bounding_box_size_depth[i], partitioning_enabling_flag, Partitioning_method, refine_slice_m- ethod_flag, refine_method, refine_method_condition, distance_point_to_point_location, and neighbours_order_to_merge described with reference to FIG. 32. For definitions of elements of FIG. 35 included in FIG. 32, reference may be made to the description of FIG. 32

When the value of refine_method_condition is 1, the TPS according to the embodiments may further include information of neighbor_num and/or information of neighbor_search_method.

The neighbor_num information and the neighbor_search_method information may perform the same or similar operations as the neighbor_num information and the neighbor_search_method information described with reference to FIG. 34, respectively. The TPS may include neighbor_num and/or neighbor_search_method for tiles as many as num_tiles.

FIG. 36 illustrates an example of a GPS in a bitstream according to embodiments.

The parameters shown in FIG. 36 may be included in the GPS described with reference to FIG. 30. The GPS according to the embodiments may include signaling information related to a slice partitioning or slice tiling method according to the embodiments, and/or related signaling information.

The GPS according to the embodiments may include information such as gps_geom_parameter_set_id, gps_seq_parameter_set_id, gps_box_present_flag, unique_geometry_points_flag, neighbour_context_restriction_flag, inferred_direct_coding_mode_enabled_flag, bitwise_occupancy_coding_flag, child_neighbours_enabled_flag, geom_occupancy_ctx_reduction_factor, log2_neighbour_avail_boundary, log2_intra_pred_max_node_size, log2_trisoup_node_size, partitioning_enabling_flag, Partitioning_method, refine_slice_method_flag, refine_method, refine_method_condition, distance_point_to_point_location, neighbours_order_to_merge, gps_extension_present_flag, and gps_extension_data_flag described with reference to FIG. 33. For definitions of elements of FIG. 36 included in FIG. 33, reference may be made to the description of FIG.

When the value of refine_method_condition is 1, the GPS according to the embodiments may further include neighbor_num and/or neighbor_search_method.

The neighbor_num information and the neighbor_search_method information may perform the same or similar operations as the neighbor_num information and the neighbor_search_method information described with reference to FIG. 34, respectively. The GPS may include neighbor_num and/or neighbor_search_method for each of tiles as many as num_tiles.

FIG. 37 illustrates an example of a geometry slice header (GSH) of a bitstream according to embodiments.

The parameters shown in FIG. 37 may be included in the GSH 30004a-1 described with reference to FIG. 30. The GSH according to the embodiments may include signaling information related to a slice partitioning or slice tiling method according to the embodiments, and/or related signaling information.

gsh_geometry_parameter_set_id specifies the value of gps_geom_parameter_set_id of the active GPS.

gsh_tile_id specifies ID of a tile.

gsh_slice_id specifies ID of a slice.

When GPS_box_present_flag according to the embodiments has a value of 1 or 'true', the GSH may further include gsh_box_log2_scale, gsh_box_origin_x, gsh_box_origin_y, and gsh_box_origin_z.

gsh_box_log2_scale specifies a scale value.

gsh_box_origin_x specifies an x coordinate of the source bounding box in the Cartesian coordinate system.

gsh_box_origin_y specifies a y coordinate of the source bounding box in the Cartesian coordinate system.

gsh_box_origin_z specifies a z coordinate of the source bounding box in the Cartesian coordinate system.

gsh_log2_max_nodesize specifies the value of the variable MaxNodeSize that is used in the decoding process as follows:

MaxNodeSize=2 (gbh_log2_max_nodesize)

gsh_points_number specifies the number of coded points in the slice.

The GSH according to the embodiments may further include partitioning_enabling_flag, Partitioning_method, refine_slice_method_flag, refine_method, refine_method_condition, distance_point_to_point_location, and/or neighbours_order_to_merge according to the embodiments described with reference to FIGS. 31 to 36.

When the value of refine_method_condition is 1, the GSH according to the embodiments may further include neighbor_num and/or neighbor_search_method.

The neighbor_num information and the neighbor_search_method information may perform the same or similar operations as the neighbor_num information and the neighbor_search_method information described with reference to FIG. 34, respectively.

FIG. 38 illustrates an example of an attribute slice header (ASH) of a bitstream according to embodiments.

The parameters shown in FIG. 38 may be included in Attrs 30004b and 30004c described with reference to FIG. 30. The ASH according to the embodiments may include signaling information related to a slice partitioning or slice tiling method according to the embodiments, and/or related signaling information.

abh_attr_parameter_set_id specifies the value of the aps_attr_parameter_set_id of the active APS.

abh_attr_sps_attr_idx specifies the attribute set in the active SPS. The value of abh_attr_sps_attr_idx may be in the range of 0 to sps_num_attribute_sets in the active SPS.

abh_attr_geom_slice_id specifies the value of geom slice ID.

TheASH according to the embodiments may further include partitioning_enabling_flag, Partitioning_method, refine_slice_method_flag, refine_method, refine_method_condition, distance_point_to_point_location, and/or neighbours_order_to_merge according to the embodiments described with reference to FIGS. 31 to 37.

When the value of refine_method_condition is 1, the ASH according to the embodiments may further include neighbor_num and/or neighbor_search_method.

The neighbor_num information and the neighbor_search_method information may perform the same or similar operations as the neighbor_num information and the neighbor_search_method information described with reference to FIG. 34, respectively.

Figure 39:
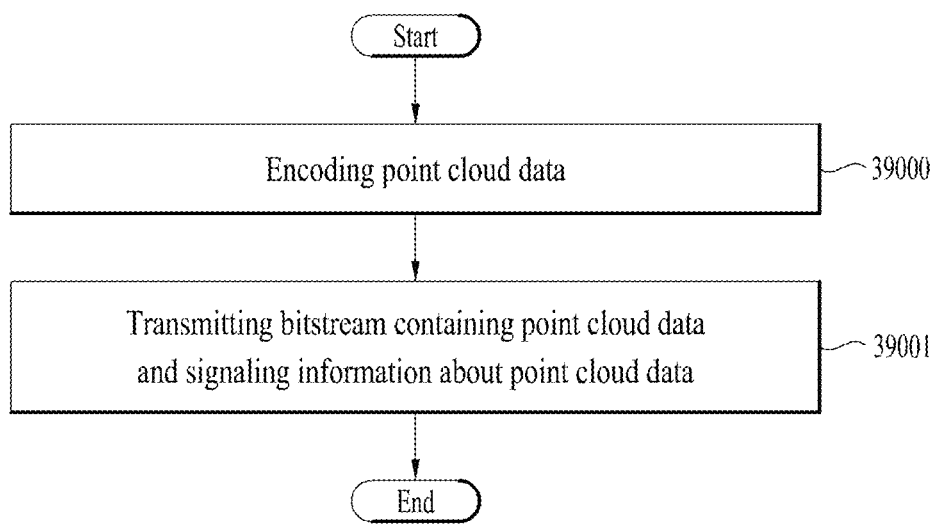
FIG. 39 is a flowchart illustrating a method of transmitting point cloud data according to embodiments.

FIG. 39 is a flowchart illustrating a method of transmitting point cloud data according to embodiments.

The point cloud data transmission method according to the embodiments includes encoding point cloud data (39000) and/or transmitting a bitstream containing the point cloud data and signaling information about the point cloud data (39001).

Some or all of the operations disclosed in FIG. 39 may be combined and performed by the XR device 1430 of FIG. 14 or the like.

In the encoding (39000) of the point cloud data, the point cloud data transmission device acquires point cloud data, and encodes the acquired point cloud data. The encoding represents the operation of the point cloud video encoder 10002 of FIG. 1, the encoding 18001 of FIG. 2, some or all of the operations described with reference to FIG. 4, some or all of the operations described with reference to FIGS. 5 to 9, and/or some or all of the operations described with reference to FIG. 12.

In the encoding (39000) of the point cloud data, some or all of the operation of the space partitioner 15001 of FIG. 15, the operation of the geometry information encoder 15002 of FIG. 15, the operation of the attribute information encoder 15003 of FIG. 15, and the operations illustrated in FIGS. 16 to 28 may be performed.

In the transmitting (39001) of the bitstream containing the point cloud data and the signaling information about the point cloud data, the point cloud data transmission device transmits the encoded point cloud data and/or the signaling information. The transmitting (39001) represents the operation of the transmitter 10003 of FIG. 1, the transmission unit 18002 of FIG. 2, and the transmission processor 12012 of FIG. 12. In this operation 39001, the geometry information bitstream 15000b and the attribute information bitstream 15000c in FIG. 15 are transmitted. In this operation 39001, the geometry information bitstream 15000b and the attribute information bitstream 15000c are combined into one bitstream and transmitted.

The signaling information may also be referred to as metadata.

The point cloud data may represent, for example, geometry slice data contained in the slice shown in FIG. 30 and/or attribute slice data contained in each Attr. The metadata may include, for example, the SPS 30001, GPS 30002, APS 30003, and TPS 30004 of FIG. 30. The metadata may represent, for example, the geometry slice header 30004a-1 included in the slice and/or the attribute slice header (ASH) included in each Attr.

That is, the metadata may include, for example, the SPS, TPS, GPS, GSH, and/or ASH according to the embodiments described with reference to FIGS. 31 to 37.

The point cloud data transmission method according to the embodiments may further include partitioning the point cloud data based on slices. The partitioning of the point cloud data based on slices may be performed before the encoding (39000) of the point cloud data. In the point cloud data transmission method according to the embodiments, the encoding (39000) of the point cloud data may be independently performed on each of the partitioned slices.

The point cloud data transmission method according to the embodiments may further include merging a slice with an adjacent slice when the number of points in the slice is less than a minimum number of points. The partitioning according to the embodiments may be performed based on based on at least one of uniform-geometry partition using octree according to embodiments, uniform-geometry partition along the longest edge according to embodiments, and/or uniform square partitioning according to embodiments.

The uniform-geometry partition using octree according to the embodiments refers to the partitioning method described with reference to FIG. 24. The uniform-geometry partition along the longest edge according to the embodiments refers to the partitioning method described with reference to FIG. 25. The uniform square partitioning according to the embodiments refers to the partitioning method described with reference to FIG. 21.

The point cloud data transmission method according to the embodiments may further include splitting a slice into two or more slices when the number of points in the slice is greater than a maximum number of points.

The adjacent slice according to the embodiments may be one of a left slice of the slice, a right slice of the slice, a top slice of the slice, or a bottom slice of the slice based on a 4-way refinement method. The adjacent slice according to the embodiments may be one of a left slice of the slice, a right slice of the slice, a top slice of the slice, a bottom slice of the slice, a front slice of the slice, and/or a back slice of the slice based on a six-way refinement method.

Figure 40:
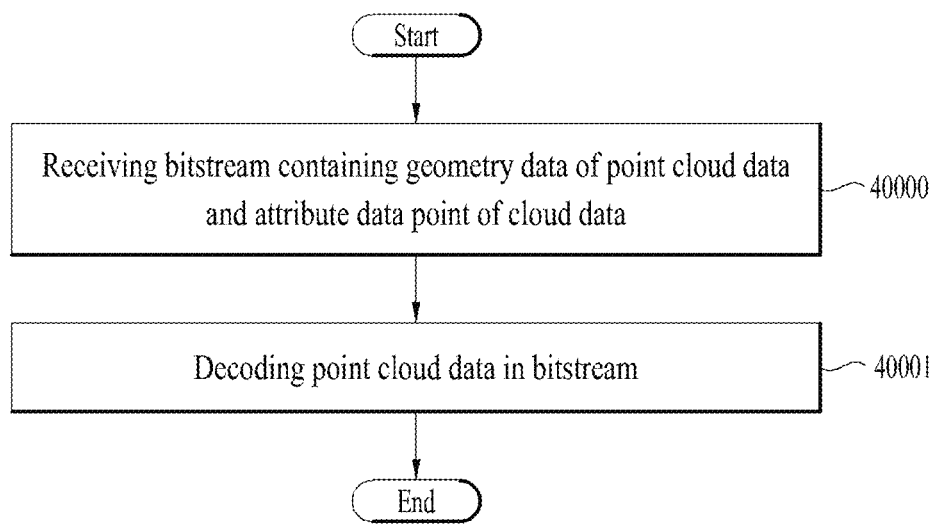
FIG. 40 is a flowchart illustrating a method of receiving point cloud data according to embodiments.

FIG. 40 is a flowchart illustrating a method of receiving point cloud data according to embodiments.

The point cloud data reception method according to the embodiments includes receiving a bitstream containing point cloud data and/or signaling information about the point cloud data (40000), and/or decoding the point cloud data in the bitstream (40001).

Some or all of the operations disclosed in FIG. 40 may be combined and performed by the XR device 1430 of FIG. 14 or the like.

The operation 40000 of receiving the bitstream represents the operation of the receiver 10005 of FIG. 1, the operation of receiving a bitstream transmitted from the transmission unit of FIG. 2, the operation of receiving a bitstream in FIG. 10, the operation of the data input unit 12000 of FIG. 12, the operation of the receiver 13000 of FIG. 13, and the reception processor 13001 of FIG. 13.

The bitstream may include the geometry information bitstream 28000a and the attribute information bitstream 28000b of FIG. 28. The bitstream includes point cloud data and/or signaling information about the point cloud data. The signaling information may also be referred to as metadata.

The point cloud data may represent, for example, geometry slice data contained in the slice shown in FIG. 30 and/or attribute slice data contained in each Attr. The metadata may include, for example, the SPS 30001, GPS 30002, APS 30003, and TPS 30004 of FIG. 30. The metadata may represent, for example, the geometry slice header 30004a-1 included in the slice and/or the ASH included in each Attr.

That is, the metadata may include, for example, the SPS, TPS, GPS, GSH, and/or ASH according to the embodiments described with reference to FIGS. 31 to 37.

The bitstream (or point cloud data) according to the embodiments may be carried in one or more slices or one or more tiles. Each slice includes point cloud data that is partitioned based on a point cloud data partitioning method according to embodiments or refined based on a point cloud data refining method according to embodiments.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for Disclosure

As described above, related details have been described in the best mode for carrying out the embodiments.

INDUSTRIAL APPLICABILITY

It is apparent to those skilled in the art that various changes and modifications are possible in the present invention without departing from the spirit or scope of the present invention. Accordingly, the present invention is intended to cover modifications and variations of the present invention provided within the appended claims and their equivalents.

What is claimed is:
1. A method for transmitting point cloud data by an apparatus, the method comprising:
partitioning slices including point cloud data into uniform squares by segmenting a maximum axis and a middle axis by a length of a minimum axis of the point cloud data;
generating adjacent information for each slice of the partitioned slices, wherein the adjacent information includes a number of points in adjacent slices in four directions including a bottom adjacent slice, a left adjacent slice, a top adjacent slice, and a right adjacent slice for each of the slice of the partitioned slices;

merging a first slice of the partitioned slices with one of the adjacent slices having a smallest number of points among the four adjacent slices of the first slice when a number of points in the first slice is less than a minimum number of points;

splitting a second slice of the partitioned slices in a direction of one of the adjacent slices among the four adjacent slices of the second slice when the number of points in the second slice is greater than a maximum number of points, encoding geometry data of the point cloud data including the merged or split slices;

reconstructing the geometry data of the point cloud data including the merged or split slices;

encoding attribute data of the point cloud data based on the reconstructed geometry data; and transmitting a bitstream including the encoded geometry data and the encoded attribute data.

2. The method of claim 1,
wherein the merging or the splitting are performed based on a data structure to represent an adjacency between the slices,
the data structure is tree-based data structure or list-based data structure.

3. The method of claim 1,
wherein the bitstream includes signaling information representing a method of the partitioning the point cloud data.

4. An apparatus for transmitting point cloud data, the apparatus comprising:
a partitioner configured to partition slices including point cloud data into uniform squares by segmenting a maximum axis and a middle axis by a length of a minimum axis of the point cloud data and generate adjacent information for each slice of the partitioned slices, wherein the adjacent information includes a number of points in adjacent slices in four directions including a bottom adjacent slice, a left adjacent slice, a top adjacent slice, and a right adjacent slice for each of the slice of the partitioned slices;

a refiner configured to merge a first slice of the partitioned slices with one of the adjacent slices having a smallest number of points among the four adjacent slices of the first slice when the number of points in the first slice is less than a minimum number of points;

split a second slice of the partitioned slices in a direction of one of the adjacent slices among the four adjacent slices of the second slice when the number of points in the second slice is greater than a maximum number of points, a geometry encoder configured to encode geometry data of the point cloud data including the merged or split slices;

a reconstructer configured to reconstruct the geometry data of the point cloud data including the merged or split slices;

an attribute encoder configured to encode attribute data of the point cloud data based on the reconstructed geometry data; and a transmitter configured to transmit a bitstream including the encoded geometry data and the encoded attribute.

5. The apparatus of claim 4,
wherein the merging or the splitting by the refiner are performed based on a data structure to represent an adjacency between the slices,
the data structure is tree-based data structure or list-based data structure.

6. The apparatus of claim 4,
wherein the bitstream includes signaling information representing a method of the partitioning the point cloud data.

7. An apparatus for receiving point cloud data, the apparatus comprising:
a receiver configured to receive a bitstream including encoded geometric data and encoded attribute data,
wherein the point cloud data is included in slices in which the point cloud data is partitioned into uniform squares by segmenting a maximum axis and a middle axis by a length of a minimum axis of the point cloud data,
wherein adjacent information for each slice of the partitioned slices is generated, wherein the adjacent information includes a number of points in adjacent slices in four directions including a bottom adjacent slice, a left adjacent slice, a top adjacent slice, and a right adjacent slice for each of the slice of the partitioned slices,
wherein the partitioned slices include a first slice merged with one of the adjacent slices having a smallest number of points among the four adjacent slices of the first slice when the number of points is less than a minimum number of points, and a second slice that is split in a direction of one of the adjacent slices among the four adjacent slices of the second slice when the number of points is greater than a maximum number of points,
wherein geometry data of the point cloud data including the merged or split slices is encoded,
wherein the geometry data of the point cloud data including the merged or split slices is reconstructed,
wherein attribute data of the point cloud data based on the reconstructed geometry data is encoded; and
a decoder configured to decode the encoded geometric data and encoded attribute data.

8. A method for receiving point cloud data by an apparatus, the method comprising:
receiving a bitstream including encoded geometry data and encoded attribute data,
wherein the point cloud data is included in slices in which the point cloud data is partitioned into uniform squares by segmenting a maximum axis and a middle axis by a length of a minimum axis of the point cloud data,
wherein adjacent information for the partitioned slices is generated, wherein the adjacent information includes a number of points in adjacent slices in four directions including a bottom adjacent slice, a left adjacent slice, a top adjacent slice, and a right adjacent slice for each of the slice of the partitioned slices,
wherein the partitioned slices include a first slice merged with one of the adjacent slices having a smallest number of points among the four adjacent slices of the first slice when the number of points in the first slice is less than a minimum number of points, and a second slice that is split in a direction of one of the adjacent slices among the four adjacent slices of the second slice when the number of points in the second slice is greater than a maximum number of points,
wherein geometry data of the point cloud data including the merged or split slices is encoded,
wherein the geometry data of the point cloud data including the merged or split slices is reconstructed,
wherein attribute data of the point cloud data based on the reconstructed geometry data is encoded; and
decoding the encoded geometric data and encoded attribute data.

9. The method of claim 1, wherein the second slice retains one split slice and the one of the adjacent slices retains another split slice.

10. The apparatus of claim 4, wherein the second slice retains one split slice and the one of the adjacent slices retains another split slice.

11. The apparatus of claim 7, wherein the second slice retains one split slice and the one of the adjacent slices retains another split slice.

12. The method of claim 8, wherein the second slice retains one split slice and the one of the adjacent slices retains another split slice.

* * * * *